US012811687B2

(12) United States Patent
Hiller

(10) Patent No.: US 12,811,687 B2
(45) Date of Patent: Nov. 24, 2026

(54) HONEYCOMB-LIKE LASER BEAM SCAN PATTERN

(71) Applicant: The Boeing Company, Arlington, VA (US)

(72) Inventor: Nathan D. Hiller, Irvine, CA (US)

(73) Assignee: The Boeing Company, Arlington, VA (US)

( * ) Notice: Subject to any disclaimer, the term of this patent is extended or adjusted under 35 U.S.C. 154(b) by 139 days.

(21) Appl. No.: 18/829,853

(22) Filed: Sep. 10, 2024

(65) Prior Publication Data

US 2025/0266908 A1 Aug. 21, 2025

Related U.S. Application Data

(63) Continuation-in-part of application No. 18/442,914, filed on Feb. 15, 2024.

(51) Int. Cl.
*H04B 10/118* (2013.01)
*H04B 10/112* (2013.01)
(Continued)

(52) U.S. Cl.
CPC ....... *H04B 10/118* (2013.01); *H04B 10/1129* (2013.01); *H04W 64/003* (2013.01); *H04W 84/06* (2013.01)

(58) Field of Classification Search
CPC .... H04B 10/112; H04B 10/118; H04B 10/50; H04B 1/02; H04B 1/06; H04B 1/03;
(Continued)

(56) References Cited

U.S. PATENT DOCUMENTS 4,279,036 A * 7/1981 Pfund .................... H04B 7/185 250/203.1
4,359,640 A 11/1982 Geiger
(Continued)

FOREIGN PATENT DOCUMENTS

CN 108347279 A * 7/2018 ............. H04B 10/27
CN 113489540 A * 10/2021 ........... H04B 10/118
(Continued)

OTHER PUBLICATIONS

Simon Kim et al.,"Analysis of Space Debris Orbit Prediction Using Angle and Laser Ranging Data from Two Tracking Sites under Limited Observation Environment," Mar. 31, 2020, Sensor,2020, 20, 1950,pp. 1-13.*

(Continued)

*Primary Examiner* — Omar S Ismail
(74) *Attorney, Agent, or Firm* — Yee & Associates, P.C.

(57) ABSTRACT

A method for pointing a laser beam. The laser beam is directed at a central location in a search area in which a satellite is expected to be located. The laser beam is moved to a next location that is a nearest neighbor to the central location in response to not receiving a confirmation that the satellite is at the central location. The next location becomes a current location for the laser beam. A number of scan parameters is adjusted during a movement of the laser beam to scan the search area. The laser beam is continued to be moved from the current location to the next location that is the nearest neighbor to the current location in response to not receiving the confirmation that the object has received the laser beam.

20 Claims, 39 Drawing Sheets

(51) Int. Cl.
*H04W 64/00* (2009.01)
*H04W 84/06* (2009.01)

(58) Field of Classification Search
CPC ... H04B 1/10; H04B 1/16; H04B 1/38; H04B 1/3816; H04B 1/3827; H04B 1/40; H04B 1/62; H04B 1/707; H04B 1/713; H04B 1/7163; H04B 1/69; H04B 3/02; H04B 3/54; H04B 5/20; H04B 5/40; H04B 5/70; H04B 7/02; H04B 7/022; H04B 7/04; H04B 7/15; H04B 7/14; H04B 7/24; H04B 10/03; H04B 10/07; H04B 10/11; H04B 10/25; H04B 10/2507; H04B 10/27; H04B 10/291; H04B 10/29; H04B 10/40; H04B 10/60; H04B 10/80; H04B 10/516; H04B 10/58; H04B 10/61; H04B 10/66; H04B 14/02; H04B 15/02; H04B 17/10; H04B 17/20; H04B 17/30
See application file for complete search history.

(56) References Cited

U.S. PATENT DOCUMENTS

| | | | | |
|---|---|---|---|---|
| 4,836,672 | A * | 6/1989 | Naiman | G01S 7/495<br>353/3 |
| 5,216,477 | A | 6/1993 | Korb | |
| 5,465,142 | A | 11/1995 | Krumes et al. | |
| 6,839,520 | B1 * | 1/2005 | Dreischer | H04B 7/18521<br>398/121 |
| 8,693,947 | B2 * | 4/2014 | Silny | H04B 7/195<br>455/12.1 |
| 11,488,046 | B2 * | 11/2022 | McCormick | H04B 10/118 |
| 11,522,607 | B2 * | 12/2022 | Boroson | H04L 1/1835 |
| 11,799,548 | B2 * | 10/2023 | McCormick | H04B 10/118 |
| 12,025,982 | B2 | 7/2024 | Ray et al. | |
| 12,505,753 | B2 * | 12/2025 | Hiller | G08G 5/80 |
| 2001/0012142 | A1 * | 8/2001 | Carlson | H04B 10/118<br>398/121 |
| 2005/0158059 | A1 * | 7/2005 | Vaananen | H04B 10/1123<br>398/183 |
| 2005/0180753 | A1 * | 8/2005 | Wirth | G02B 26/06<br>398/118 |
| 2005/0238356 | A1 * | 10/2005 | Gilbert | H04L 9/0852<br>398/118 |
| 2006/0024061 | A1 * | 2/2006 | Wirth | H04B 10/1125<br>398/129 |
| 2006/0109573 | A1 * | 5/2006 | Jackson | G02B 26/105<br>359/872 |
| 2007/0052950 | A1 * | 3/2007 | Taylor | G01S 17/86<br>356/622 |
| 2007/0058161 | A1 * | 3/2007 | Nichols | G01S 19/46<br>342/357.29 |
| 2008/0158044 | A1 * | 7/2008 | Talbot | G01C 15/004<br>342/54 |
| 2008/0247758 | A1 * | 10/2008 | Nichols | G01S 19/11<br>342/357.29 |
| 2009/0030551 | A1 * | 1/2009 | Hein | G05D 1/024<br>340/541 |
| 2009/0222153 | A1 * | 9/2009 | Johnson | B64G 1/281<br>701/13 |
| 2009/0324236 | A1 * | 12/2009 | Wu | H04B 10/118<br>398/122 |
| 2012/0039599 | A1 * | 2/2012 | Von Schwake | G01S 3/42<br>398/25 |
| 2015/0106047 | A1 * | 4/2015 | Lukashin | B64G 1/1021<br>702/104 |
| 2015/0125157 | A1 * | 5/2015 | Chao | H04B 10/118<br>398/122 |
| 2015/0303646 | A1 * | 10/2015 | Levy | G01S 7/484<br>359/334 |
| 2016/0065308 | A1 * | 3/2016 | Coleman | H04B 10/1129<br>398/79 |
| 2017/0026122 | A1 * | 1/2017 | Everett | H04B 10/503 |
| 2017/0034250 | A1 * | 2/2017 | Sobhani | H04W 84/06 |
| 2017/0205534 | A1 * | 7/2017 | Prikryl | E01C 19/006 |
| 2017/0302377 | A1 * | 10/2017 | Boroson | H04B 10/5161 |
| 2017/0366264 | A1 * | 12/2017 | Riesing | H04B 10/615 |
| 2019/0025423 | A1 * | 1/2019 | Sajwaj | E03B 7/003 |
| 2019/0154439 | A1 * | 5/2019 | Binder | G01S 15/42 |
| 2019/0291720 | A1 * | 9/2019 | Xiao | G06V 10/82 |
| 2019/0372669 | A1 * | 12/2019 | Ziegler | H04B 10/503 |
| 2020/0005656 | A1 | 1/2020 | Saunamaeki | |
| 2020/0007232 | A1 * | 1/2020 | Cahoy | B64G 1/2221 |
| 2020/0172265 | A1 | 6/2020 | Kestler et al. | |
| 2020/0207389 | A1 * | 7/2020 | Moth | B61L 25/025 |
| 2020/0209394 | A1 * | 7/2020 | Mark | G01S 17/89 |
| 2020/0277087 | A1 * | 9/2020 | Kaen | B64G 1/1021 |
| 2020/0341117 | A1 * | 10/2020 | Sandford | G01S 17/93 |
| 2020/0389232 | A1 * | 12/2020 | Danesh | H04B 10/1123 |
| 2021/0112647 | A1 * | 4/2021 | Coleman | F21V 14/02 |
| 2021/0162912 | A1 * | 6/2021 | Spero | F21S 41/153 |
| 2021/0293659 | A1 | 9/2021 | Ray et al. | |
| 2021/0372793 | A1 * | 12/2021 | Nikulin | B64C 39/024 |
| 2021/0396888 | A1 * | 12/2021 | Mccormick | G01S 17/89 |
| 2022/0026195 | A1 * | 1/2022 | Fertig | H04B 10/29 |
| 2022/0155452 | A1 * | 5/2022 | Rawat | G01S 17/88 |
| 2022/0380023 | A1 | 12/2022 | Takahashi et al. | |
| 2023/0040954 | A1 * | 2/2023 | Hayashi | B64G 1/28 |
| 2023/0057677 | A1 | 2/2023 | Beuschel et al. | |
| 2023/0421244 | A1 * | 12/2023 | Tsunemachi | H04B 7/18513 |
| 2024/0171275 | A1 * | 5/2024 | Iqbal | H04B 10/112 |
| 2025/0070875 | A1 * | 2/2025 | Sonoda | H04B 10/118 |
| 2025/0266908 | A1 * | 8/2025 | Hiller | H04W 64/003 |

FOREIGN PATENT DOCUMENTS

| | | | | |
|---|---|---|---|---|
| CN | 113507579 | A | 10/2021 | |
| CN | 113489540 | B * | 12/2021 | H04B 10/118 |
| CN | 116318394 | B | 6/2023 | |
| CN | 116886178 | A * | 10/2023 | H04B 7/18519 |
| CN | 117811656 | A | 4/2024 | |
| CN | 118131181 | A | 6/2024 | |
| JP | H1065620 | A * | 3/1998 | |
| KR | 20230131378 | A | 9/2023 | |
| KR | 102689477 | B1 * | 7/2024 | H04B 10/503 |
| WO | WO-2016097832 | A1 * | 6/2016 | H04B 7/18584 |
| WO | 2018110788 | A1 | 6/2018 | |

OTHER PUBLICATIONS

Yunjie Teng et al.,“The Optimization Design of Sub-Regions Scanning and Vibration Analysis for Beaconless Spatial Acquisition in the Inter-Satellite Laser Communication System,” Dec. 13, 2018,IEEE Photonica Journal,vol. 10,No. 6,Dec. 2018,pp. 1-6.*

Xin Li et al.,“Analytical expression and optimization of spatial acquisition for intersatellite optical communications,” Jan. 25, 2011, Optics Express,vol. 19, No. 3,Jan. 31, 2011,pp. 1-7.*

Bing Jia et al.,“Improved Target Laser Capture Technology for Hexagonal Honeycomb Scanning,” May 6, 2023,photonics,2023, 10, 541,pp. 1-13.*

Keith E. wilson et al.,“Development of Laser Beam Transmission Strategies for Future Ground-to-Space Optical Communications,” May 4, 2007,Proc. of SPIE vol. 6551,pp. 65510B-1-65510B-12.*

W. A. Coles et al.,“A Radio System for Avoiding Illuminating Aircraft with a Laser Beam,” Jan. 6, 2012, Publications of the Astronomical Society of the Pacific, 124:42-50, Jan. 2012,pp. 42-48.*

Morio Toyoshima et al., “Optimum divergence angle of a Gaussian beam wave in the presence of random jitter in free-space laser communication systems,” Aug. 24, 2001, J. Opt. Soc. Am. A,Mar. 2002, vol. 19, No. 3, pp. 567-570.*

Yunjie Teng et al.,“The Optimization Design of Sub-Regions Scanning and Vibration Analysis for Beaconless Spatial Acquisition in the Inter-Satellite Laser Communication System,” Dec. 13, 2018, IEEE Photonics Journal, vol. 10, No. 6, Dec. 2018, pp. 2-10.*

Dominicus, Jacco. “New generation of counter UAS systems to defeat of low slow and small (LSS) air threats.” (Year: 2021).

(56) References Cited

OTHER PUBLICATIONS

Hu, S. G., et al. “Efficiency analysis of intercepting UAV swarm by various air defense methods.” Journal of Physics: Conference Series. vol. 2472. No. 1. IOP Publishing, (Year: 2023).
Liao, Longwen, Xiaoliang Huang, and Fengyu Xie. “Development status and operation analysis of laser weapon in anti-drone warfare.” 2023 IEEE International Conference on Unmanned Systems (ICUS). IEEE, (Year: 2023).
Office Action, dated Jul. 30, 2025, regarding U.S. Appl. No. 18/442,984, 20 pages.
Office Action, dated Feb. 3, 2026, regarding U.S. Appl. No. 18/442,914, 51 pages.
Office Action, dated Jan. 7, 2026, regarding U.S. Appl. No. 18/791,615, 13 pages.
Yunjie Teng et al.,“The Optimization Design of Sub-Regions Scanning and Vibration Analysis for Beaconless Spatial Acquisition in the Inter-Satellite Laser Communication System,” Dec. 13, 2018,IEEE Photonica Joumal,vol. 10,No. 6,Dec. 2018,pp. 1-6.
Edstrom, Marten. “Laser Power Beaming for in-Flight Charging of Unmanned Aerial Vehicles-a Viability Study.” (2025).
Kiehn, Daniel, et al. “Adaptive Wind Field Estimation Using an Empirical Bayesian Approach.” Journal of Guidance, Control, and Dynamics 47.11 (2024): 2386-2396. (Year: 2024).
Notice of Allowance, dated Sep. 11, 2025, regarding U.S. Appl. No. 18/442,984, 8 pages.
Satat, Guy, Matthew Tancik, and Ramesh Raskar. “Towards photography through realistic fog.” 2018 IEEE International Conference on Computational Photography (ICCP). IEEE, 2018. (Year: 2018).
Zheng, Jianhua, et al. “Review on Security Range Perception Methods and Path-Planning Techniques for Substation Mobile Robots” Energies 17.16 (2024): 4106. (Year: 2024).
Notice of Allowance, dated Apr. 13, 2026, regarding U.S. Appl. No. 18/791,615, 7 pages.
Notice of Allowance, dated Apr. 15, 2026, regarding U.S. Appl. No. 18/442,914, 16 pages.
Bloom et al., Understanding the performance of free-space optics [Invited], Journal of Optical Networking, Jun. 2003, vol. 2, Issue 6, pp. 178-200.
Friederichs et al., “Vibration Influence on Hit Probability During Beaconless Spatial Acquisition,” Journal of Lightwave Technology, vol. 34, No. 10, pp. 2500-2509, https://ieeexplore.ieee.org/document/7434577.
Hiller et al., “Laser Beam Based Flight Path Clearing System,” U.S. Appl. No. 18/442,984, filed Feb. 15, 2024, 49 pages.
Hiller et al., “Laser Scanning for Spatial Acquisition of a Satellite Receiver,” U.S. Appl. No. 18/442,914, filed Feb. 15, 2024, 97 pages.
Hiller et al., “Laser Sensor System With Pattern Scanning,” U.S. Appl. No. 18/442,953, filed Feb. 15, 2024, 51 pages.
Hiller, “Changing Laser Scan for Satellite Acquisition,” U.S. Appl. No. 18/791,572, filed Aug. 1, 2024, 74 pages.
Hiller, “Nonlinear Laser Beam Scan Pattern,” U.S. Appl. No. 18/829,945, filed Sep. 10, 2024, 145 pages.
Hiller, “Nonuniform Laser Beam Scan Based Flight Path Clearing System,” U.S. Appl. No. 18/791,615, 56 pages.
Hiller, “Variable Scan Parameter Based Laser Sensor System,” U.S. Appl. No. 18/791,594, filed Aug. 1, 2024, 59 pages.
Jia et al., “Improved Target Laser Capture Technology for Hexagonal Honeycomb Scanning,” Photonics 2023, May 6, 2023, pp. 1-17, vol. 10, Issue. 5, MDPI, Basel, Switzerland, accessed Dec. 22, 2023, https://www.mdpi.com/2304-6732/10/5/541.
Li et al., Analytical expression and optimization of spatial acquisition for intersatellite optical communications, Optics Express, Jan. 31, 2011, vol. 19, Issue 3, pp. 2381-2390.
Runkel, et al., “An Overview of Raster Scanning for ICF-Class Laser Optics,” Boulder Damage Symposium XXXIV: Annual Symposium on Optical materials for High Power Lasers, Oct. 30, 2002, 13 pages, U.S. Department of Energy, accessed Dec. 27, 2023, https://www.osti.gov/servlets/purl/15004028.
Toyoshima et al., Optimum divergence angle of a Gaussian beam wave in the presence of random jitter in free-space laser communication systems, Journal of the Optical Society of America A, Mar. 2002, vol. 19, Issue 3, pp. 567-571.
Office Action, dated Jun. 5, 2026, regarding U.S. Appl. No. 18/442,953, 56 pages.

* cited by examiner

HONEYCOMB-LIKE LASER BEAM SCAN PATTERN

CROSS-REFERENCE TO RELATED APPLICATION

This application is a Continuation-In-Part (CIP) and claims the benefit of U.S. patent application Ser. No. 18/442,914, filed Feb. 15, 2024, and entitled "Laser Scanning for Spatial Acquisition of a Satellite Receiver," which is incorporated herein by reference in its entirety.

This application is related to the following: U.S. patent application entitled "Laser Sensor System With Pattern Scanning," Ser. No. 18/442,953, filed Feb. 15, 2024; U.S. patent application entitled "Laser Beam Based Flight Path Clearing System," Ser. No. 18/442,984, filed Feb. 15, 2024; U.S. patent application entitled "Changing Laser Scan for Satellite Acquisition," Ser. No. 18/791,572, filed Aug. 1, 2024; U.S. patent application entitled "Variable Scan Parameter Based Laser Sensor System," Ser. No. 18/791,594, filed Aug. 1, 2024; U.S. patent application entitled "Nonuniform Laser Beam Scan Based Flight Path Clearing System," Ser. No. 18/791,615, filed Aug. 1, 2024; and U.S. patent application entitled "Nonlinear Laser Beam Scan Pattern," Ser. No. 18/829,945, filed Sep. 10, 2024, all of which are assigned to the same assignee and incorporated herein by reference in their entirety.

STATEMENT OF GOVERNMENT SUPPORT

This invention was made with Government support under DFARS 252.227-7038 awarded by the Department of Defense. The government has certain rights in this invention.

BACKGROUND INFORMATION

1. Field

The present disclosure relates generally to communications using electromagnetic signals and in particular, to a method, apparatus, and system for directing electromagnetic beam transmitters at receivers and pointing receivers at electromagnetic signal sources.

2. Background

Satellites can send information to each other using laser beams. With satellite communications, data can be transmitted as laser beams that are encoded with information. The laser beams can carry digital data in the form of on-and-off patterns when laser beam pulses are used. In other cases, the intensity or phase of laser beams can be changed to encode data.

In establishing satellite communications between two satellites, a laser beam is transmitted from one satellite to another satellite to establish a communications link. Establishing the communications link involves one satellite directing a laser beam at another satellite. This pointing of the laser beam is over great distances and requires precision to properly point the laser beam to establish the communications link.

SUMMARY

An example of the present disclosure provides a laser beam transmission system comprising a laser beam system and a controller. The laser beam system is configured to transmit a laser beam. The controller is configured to control the laser beam system to direct the laser beam at a central location in a search area in which a satellite is expected to be located and move the laser beam to a next location that is a nearest neighbor to the central location in response to not receiving a confirmation that the satellite is at the central location. The next location becomes a current location for the laser beam. The controller is configured to control the laser beam system to adjust a number of scan parameters during a movement of the laser beam to scan the search area. The controller is configured to control the laser beam system to continue to move the laser beam from the current location to the next location that is the nearest neighbor to the current location in response to not receiving the confirmation that the satellite has received the laser beam.

Another example of the present disclosure provides an electromagnetic beam transmission system comprising an electromagnetic beam system and a controller. The electromagnetic beam system is configured to transmit an electromagnetic beam. The controller is configured to control the electromagnetic beam system to direct the electromagnetic beam at a central location in a search area in which an object is expected to be located and move the electromagnetic beam to a next location that is a nearest neighbor to the central location in response to not receiving a confirmation that the object is at the central location. The next location becomes a current location for the laser beam. The controller is configured to control the electromagnetic beam system to adjust a number of scan parameters during a movement of the electromagnetic beam to scan the search area. The controller is configured to control the electromagnetic beam system to continue to move the electromagnetic beam from the current location to the next location that is the nearest neighbor to the current location in response to not receiving the confirmation that the object has received the electromagnetic beam.

Yet another example of the present disclosure provides a method for pointing a laser beam. The laser beam is directed at a central location in a search area in which a satellite is expected to be located. The laser beam is moved to a next location that is a nearest neighbor to the central location in response to not receiving a confirmation that the satellite is at the central location. The next location becomes a current location for the laser beam. A number of scan parameters is adjusted during a movement of the laser beam to scan the search area. The laser beam is continued to be moved from the current location to the next location that is the nearest neighbor to the current location in response to not receiving the confirmation that the object has received the laser beam.

Still another example of the present disclosure provides an electromagnetic beam receiver system comprising an electromagnetic signal receiver and a controller. The magnetic signal receiver is configured to receive electromagnetic signals. The controller is configured to control the electromagnetic signal receiver to move a field of view of electromagnetic signal receiver to a central location in a search area in which an electromagnetic signal source is expected to be located and move the field of view to a next location that is a nearest neighbor to the central location in response to not detecting the electromagnetic signals from the electromagnetic signal source at the central location. The next location becomes a current location for the field of view. The controller is configured to control the electromagnetic signal receiver to adjust a number of scan parameters during a movement of the field of view to scan the search area. The controller is configured to control the electromagnetic signal receiver to continue to move the field of view from the current location to the next location that is the nearest neighbor to the current location in response to not detecting electromagnetic signals from the electromagnetic signal source.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
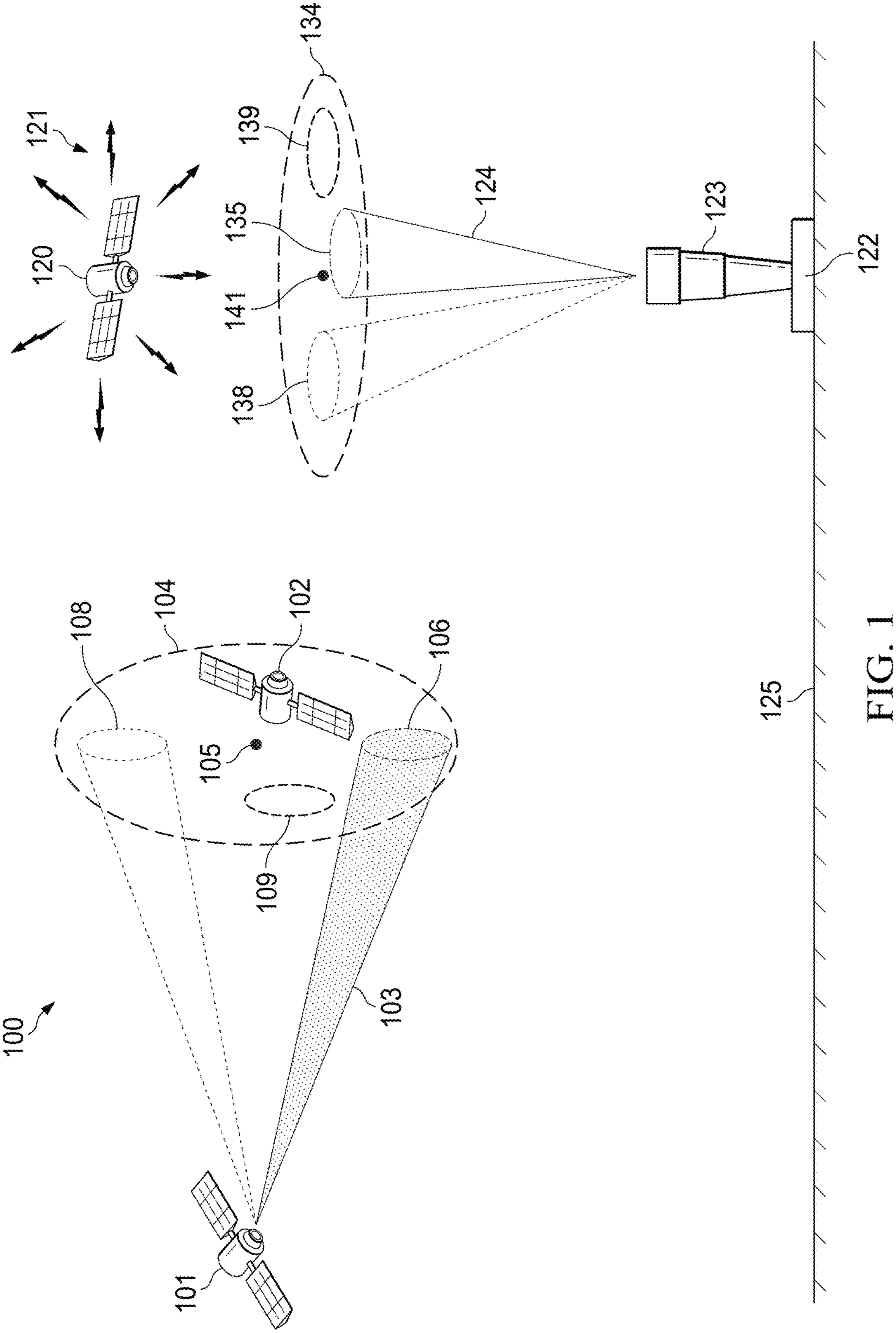
FIG. 1 is a pictorial illustration of a satellite communications environment in which illustrative examples may be implemented.

The illustrative examples recognize and take into account one or more different considerations as described herein. During the initial acquisition in establishing the communications link, a time efficient scanning method for pointing laser beams at satellites is desired. Various scanning methods can be used to point a laser beam from a transmitting satellite to a receiving satellite. In satellite communications, lasers beams can different wavelengths such as, for example, a wavelength of about 1064 nm in the near infrared wavelength range, 1550 nm in the visible wavelength range, and 532 in the visible wavelength range. Current laser scanning methods include a continuous spiral scan, a step spiral scan, a segment scan, and a raster scan. These types of scans for establishing the communications link may not be fast enough to meet various requirements.

In one illustrative example, rather than simply scanning a laser beam from location to location, the laser beam can be moved between points in a step-like fashion using a pattern that is the most efficient packing density for the area being scanned.

Further, one illustrative example takes advantage of the Gaussian probability distribution of the satellite location in the area. For example, the laser beam can be moved to a location nearest to the maximum of the uncertainty area using the Gaussian probability distribution. This type of movement can result in skipping locations in the beam pattern in contrast to the current scanning techniques that move the laser beam from one location to another location. This type of movement of the laser beam can be more difficult than moving to neighboring locations.

For example, a laser beam transmission system comprises a laser beam system configured to transmit a laser beam and a controller. The controller can be configured to control the laser beam transmission system to direct the laser beam at a location nearest to a center of an area in which the satellite is expected to be located. The controller can be configured to control the laser beam transmission system to move the laser beam from the location to a next location nearest to the maximum of the uncertainty area in response to not receiving a confirmation that the satellite is at the location, wherein the next location becomes a current location for the laser beam. The controller can be configured to control the laser beam transmission system to continue to move the laser beam from the current location to the next location nearest to the maximum of the uncertainty area from the current location in response to not receiving the confirmation that the satellite has received the laser beam.

In another illustrative example, the laser beam changes from moving the laser beam from the current location to the next location nearest to the maximum of the uncertainty area to moving the laser beam to neighboring locations at the cost of not fully taking advantage of the Gaussian distribution of the satellite in the uncertainty area. This type of movement of the laser beam to the nearest neighbor location can be used when moving the laser beam to the next location that is nearest to the maximum of the uncertainty area being scanned takes more time than moving the laser into the neighboring location or is greater than some other threshold. As a result, a hybrid scan can be performed in the illustrative example.

For example, the controller is configured to control the laser beam system to move the laser beam to a neighbor location of a nearest neighbor in response to a time for moving the laser beam from the current location to the next location using the location nearest to the maximum of the uncertainty area being greater than a threshold. The controller is configured to control the laser beam system to continue to move the laser beam from the current location to a subsequent neighbor location of the nearest neighbor from the current location in response to a time for moving the laser beam from the current location to the next location using the location nearest to the maximum of the uncertainty area being greater than the threshold and in response to not receiving a confirmation that the satellite has received the laser beam.

With reference now to the figures and, in particular, with reference to FIG. 1, a pictorial illustration of a satellite communications environment is depicted in which illustrative examples may be implemented. As depicted, satellite communications environment 100 is an environment in which electromagnetic signals can be transmitted for satellite communications.

For example, satellite 101 transmits laser beam 103 to satellite 102 to establish a communications link with satellite 102. With the establishment of a communications link, satellite 101 and satellite 102 can communicate information using laser beams. The transmission data using laser beams can be unidirectional from satellite 101 to satellite 102 or from satellite 102 to satellite 101. In another example, the communication of data using laser beams can be bidirectional between satellite 101 and satellite 102.

In this illustrative example, satellite 102 is expected to be located somewhere in area 104. In this example, area 134 is an area in satellite 134 can be located. This area can be determined based on an estimated location of satellite 134. This estimate has uncertainty that can also be used to determine area 134. The uncertainty in the location of a satellite can be a range of possible positions wherein the satellite may be located. For example, the location uncertainty for a satellite is a result of the satellite navigation system's attitude and ephemeris uncertainties (~ hundreds of mrad), which are expressed as azimuth and elevation uncertainties. The probability distribution function for satellite position can be described by a Gaussian distribution for both azimuth and elevation uncertainties.

In this illustrative example, the laser beam 103 is transmitted at locations in area 104 using a pattern that provides for a faster locating of satellite 102 as compared to current scanning techniques.

In one illustrative example, satellite 101 transmits laser beam 103 from location 106 to location 108 within area 104. In this example, selecting location 108 after directing laser beam 103 at location 106 is made by selecting the location that is nearest to maximum 105 of area 104 in which satellite 102 is expected to be located. Location 108 is a location that has not yet been selected for transmitting laser beam 103. In this illustrative example, the next location is not necessarily the nearest neighbor to location 106.

This type of movement of laser beam 103 can continue until satellite 102 is located. In this illustrative example, a confirmation can be received from satellite 102 or some other source that laser beam 103 is directed at satellite 102 in a manner such that communications can be established.

Additionally, if the amount of time from location 106 to the next location, location 108, that is nearest to maximum 105 of area 104 is greater than some threshold, then satellite 101 can direct laser beam 103 to the next nearest neighbor from location 106. In this example, the next nearest neighbor to location 106 is location 109. This change provides for hybrid scanning that also enables finding the location of satellite 102 within area 104 more quickly as compared to current techniques.

Further, within satellite communications environment 100, satellite 120 broadcasts information in electromagnetic signals 121 that can be received by receiver 122. Electromagnetic signals 121 can be at least one of the electric or magnetic fields that carrier information. At least one of amplitude, frequency, or face can modulated to encode information in electromagnetic signals 121. In this illustrative example, telescope 123 is a component for receiver 122. As depicted in this example, these components are located on ground 125.

Telescope 123 is a physical device that can be used to transmit and receive signals. For example, telescope 123 includes optics and other components that can be used to collect and focus incoming electromagnetic signals such as light waves or radio waves.

In this illustrative example, satellite 120 is expected to be within area 134.

Telescope 123 has field of view (FOV) 124 that can be pointed at different locations in area 134. In other words, telescope 123 has optics for other components that define field of view 124.

Field of view 124 for telescope 123 can be pointed at location 135 in area 134. The selection of location 135 is based on a location nearest to maximum 141 of area 134.

Field of view 124 can be moved from location 135 to location 138 within area 134. As with transmitting laser beam 103, the movement of field of view 124 may be to another location if the next location nearest to maximum 141 of area 134 in which satellite 120 is expected to be located. In this example, the next location is location 138, which is not the nearest neighbor to location 135.

This movement of the field of view 124 can continue to occur until receiver 122 detects electromagnetic signals 121 from satellite 120. In other illustrative examples, this process can be halted when some threshold amount of time occurs without detecting electromagnetic signals 121 or if the entire area is searched without detecting electromagnetic signals 121. Directional amount of time can be user set in one illustrative example.

In this illustrative example, electromagnetic signals 121 may be considered to be detected when receiver 122 is able to extract for identifying information within electromagnetic signals 121. In another example, electromagnetic signals 121 can be considered to be detected when electromagnetic signals above a noise level are detected.

If the amount of time to move field of view 124 from location 135 to the next location is greater than some threshold, then field of view 124 can be moved to the next nearest neighbor from location 136, such as location 139. The next location is location 138 that is nearest to maximum 141 of area 134 in this example. This threshold can be, for example, thematic time to move the field of view from location to a neighboring or adjacent location. This change provides for hybrid scanning that also enables finding the location of satellite 102 within area 104 more quickly as compared to current techniques.

The illustration of satellite communications environment 100 is provided as one example and is not meant to limit the manner in which other illustrative examples can be implemented. Although the areas are shown as circular, the areas in which the satellites can be located can take other shapes. For example, the areas can be elliptical, hexagonal, or some other shape in the different examples. These areas can also be referred to as uncertainty areas in which a satellite or other object may be located.

In another illustrative example, laser beam 103 can take another form. For example, a microwave beam can be used in place of laser beam 103.

In yet another illustrative example, receiver 122 and telescope 123 can be located in another location other than on ground 125. For example, receiver 122 and telescope 123 can be located on a platform such as a vehicle, a ship, an aircraft, a building, or some other suitable location.

Figure 2:
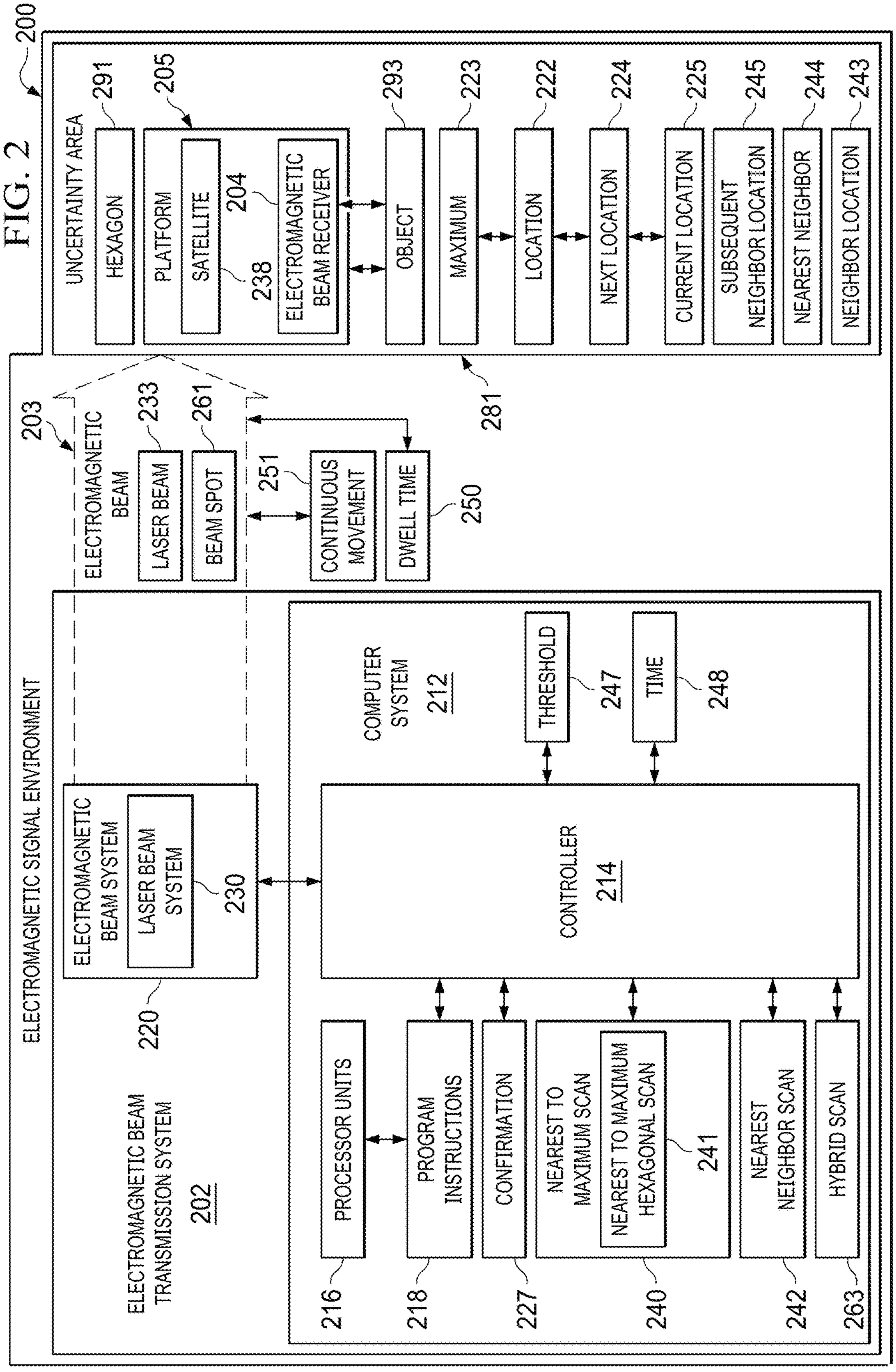
FIG. 2 is an illustration of a block diagram of an electromagnetic signal environment in accordance with an illustrative example.

With reference now to FIG. 2, an illustration of a block diagram of an electromagnetic signal environment is depicted in accordance with an illustrative example. In this illustrative example, electromagnetic signal environment 200 includes components that can be implemented in hardware such as the hardware in satellite 101 and satellite 102 in FIG. 1.

In this illustrative example, electromagnetic beam transmission system 202 can point the transmission of electromagnetic beam 203 at object 293. In this example, object 293 can be electromagnetic beam receiver 204. Object 293 can also be platform 205 with which electromagnetic beam receiver 204 is connected in this example.

In this illustrative example, electromagnetic beam transmission system 202 comprises electromagnetic beam system 220 and controller 214. In this example, controller 214 is located in computer system 212. As depicted, computer system 212 is also part of electromagnetic beam transmission system 202.

Electromagnetic beam system 220 is a physical hardware system. This hardware system is configured to transmit electromagnetic beam 203.

Controller 214 can be implemented in software, hardware, firmware, or a combination thereof. When software is used, the operations performed by controller 214 can be implemented in program instructions configured to run on hardware, such as a processor unit. When firmware is used, the operations performed by controller 214 can be implemented in program instructions and data can be stored in persistent memory to run on a processor unit. When hardware is employed, the hardware can include circuits that operate to perform the operations in controller 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, controller 214 controls electromagnetic beam transmission system 202 to direct electromagnetic beam 203 at location 222 nearest to maximum 223 of uncertainty area 281 in which object 293 is expected to be located. In other words, uncertainty area 281 is an area in which object 293 is thought to be present. However, object 293 may not actually be in uncertainty area 281. In some cases, uncertainty area 281 can be selected as an area for searching with the hope of locating object 293.

Further in this example, maximum 223 represents a probability that object 293 is at a location (laser spot) covered by laser beam system 230. Maximum 223 does not need to be 100 percent but can be some lower percentage.

As depicted, electromagnetic beam 203 has beam spot 261. In this example, beam spot 261 is a diameter of electromagnetic beam 203 at a location in uncertainty area 281. In this example, beam spots can correspond to locations in uncertainty area 281. For example, location 222 in uncertainty area 281 can have a size and shape that corresponds to beam spot 261 when the electromagnetic beam 203 is directed at location 222.

In one illustrative example when object 193 is electromagnetic beam receiver 204, the size of beam spot 261 can affect the ability of electromagnetic beam receiver 204 to detect electromagnetic beam 203. For example, as the spot size of electromagnetic beam 203 increases the divergence of electromagnetic beam 203 increases. This increase results in a faster scan time to point to where electromagnetic beam receiver 204 is located. However, the increase in the size of beam spot 261 can have a divergence in electromagnetic beam 203 that results in an intensity of these signals being too weak for electromagnetic beam receiver 204 to detect.

In another example, as the size of beam spot 261 decreases, the divergence of electromagnetic beam 203 also decreases. With this lower level divergence, electromagnetic beam receiver 204 can more easily detect electromagnetic beam 203. However, the scan time to locate electromagnetic beam receiver 204 may become slower than desired.

In another example, the size of beam spot 261 can be set such that the divergence of electromagnetic beam 203 is such that electromagnetic beam 203 can be just barely detected by electromagnetic beam receiver 204. This type of divergence may result in locating electromagnetic beam receiver 204 in a time that is faster than current techniques such as techniques that scan from location to location in which the locations are adjacent to each other.

Location 222 nearest to maximum 223 of uncertainty area 281 can be determined using a probability density function (PDF) that shows what location is likely to be closest to maximum 223. The probability density function can be used to identify the probability that an object is present in a particular location in an area.

The probabilities for the location of an object can be generated using the probability density function with the expected location for the object. The probability density function can also be referred to as a type of probability distribution function. The probability density function can be, for example, a Gaussian function, analytical distribution, a skewed distribution, or other type of probability density function.

For example, the location uncertainty for the receiving satellite is a result of the satellite navigation system's attitude and ephemeris uncertainties (~ hundreds of mrad), which are expressed as azimuth and elevation uncertainties. The probability distribution function for satellite position can be described by a Gaussian distribution for both azimuth and elevation uncertainties using currently known techniques.

Thus, information can be identified as to the expected location of a satellite based on the satellite orbit information. This expected location may not be the actual location of the satellite. As result, the probabilities that an object is present in different locations within the area of interest can be determined and used for scanning for the object.

In this example, the area of interest is uncertainty area 281. Maximum 223 is the peak of the probability density function when the probability density function has a single peak.

In this example, controller 214 controls electromagnetic beam system 220 to move electromagnetic beam 203 from location 222 to next location 224 nearest to maximum 223 of uncertainty area 281 in response to not receiving confirmation 227 that object 293 such as electromagnetic beam receiver 204 is at location 222. In this example, next location 224 becomes current location 225 for electromagnetic beam 203.

Controller 214 controls electromagnetic beam system 220 to continue to move electromagnetic beam 203 from current location 225 to next location 224 nearest to maximum 223 of uncertainty area 281 from current location 225 in response to not receiving a confirmation 227 that electromagnetic beam 203 has encountered object 293, such as electromagnetic beam receiver 204 receiving electromagnetic beam 203. This type of movement of electromagnetic beam 203 is nearest to maximum scan 240.

In this illustrative example, confirmation 227 can take a number of different forms. For example, confirmation 227 can be a reply or acknowledgment sent in a return electromagnetic beam to electromagnetic beam system 220. In this example, electromagnetic beam system 220 can also receive electromagnetic beams. In another illustrative example, confirmation can be sent through another transmission to controller 214 through another device such as a radiofrequency receiver or other type of receiver.

In one illustrative example, electromagnetic beam 203 can take the form of laser beam 233. Further, laser beam 233 can be selected from a group comprising a continuous laser beam and a pulsed laser beam. Electromagnetic beam system 220 can be laser beam system 230 and platform 205 can take the form of satellite 238.

In this example, controller 214 controls laser beam system 230 to direct laser beam 233 at location 222 nearest to maximum 223 of uncertainty area 281 in which satellite 238 is expected to be located. Controller 214 also controls laser beam system 230 to move laser beam 233 from location 222 to next location 224 nearest to maximum 223 of uncertainty area 234 in response to not receiving confirmation 227 that satellite 238 is at location 222. In this example, next location 224 becomes current location 225 for laser beam 233. Controller 214 controls laser beam system 230 to continue to move laser beam 233 from current location 225 to next location 224 nearest to maximum 223 of uncertainty area 281 from current location 225 in response to not receiving confirmation 227 that satellite 238 has received laser beam 233. The moving or directing of laser beam 233 can also be referred to as pointing laser beam 233. Further, laser beam 233 can be selected from one of unidirectional communications and bidirectional communications.

In continuing to continue to move laser beam 233, controller 214 can control laser beam system 232 to move laser beam 233 from current location 225 to next location 224 nearest to maximum 223 of uncertainty area 281 from current location 225 with dwell time 250 at each location in response to not receiving confirmation 227 that satellite 238 has received laser beam 233. In this example, dwell time 250 is the amount of time that laser beam 233 is pointed at a particular location in uncertainty area 281.

In another illustrative example, in continuing to move laser beam 233, controller 214 can control laser beam system 232 to move laser beam 233 from current location 225 to next location 224 nearest to maximum 223 of uncertainty area 281 from current location 225 with continuous movement 251 from one location to another location in response to not receiving confirmation 227 that satellite 238 has received laser beam 233. In this example, laser beam 233 moves from one location to another location without pausing or waiting. In other words, dwell time 250 is not present with this type of movement of laser beam 233.

In this example, confirmation 227 can be received from satellite 238. Satellite 238 sends a return laser beam at the same angle as the incoming laser beam 233.

In this example, the movement controlled by controller 214 is nearest to maximum scan 240 such as nearest to maximum hexagonal scan 241. With this example, uncertainty area 281 can be in a shape of hexagon 291. Further, controller 214 can control the movement of laser beam 233 to change from nearest to maximum scan 240 to nearest neighbor scan 242. This type of scan in which the scanning changes from nearest to maximum scan 240 to nearest neighbor scan 242 is referred to as hybrid scan 263.

For example, controller 214 moves laser beam 233 to neighbor location 243 of nearest neighbor 244 in response to time 248 for moving laser beam 233 from current location 225 to next location 224 using location 222 nearest to maximum 223 of uncertainty area 281 being greater than threshold 247. In this example, next location 224 becomes current location 225 for future movements.

In this case, threshold 247 can be selected as the time for moving laser beam 233 from one location to a neighboring location. In another illustrative example, the threshold can be a lower time or some other suitable time. A probability of detection (y-axis) vs. pulse power (x-axis) graph may have two peaks. For low pulse powers (i.e., x values close to zero), an exponentially decreasing curve occurs as pulse power increases. This portion of the curve is caused mostly by noise. At some higher pulse powers, a Gaussian profile occurs in the curve. This portion of the curve is dominated by a signal.

If the pulse power threshold is set very low (i.e., low values for x), noise is often detected, resulting in a high false alarm rate. If the pulse power threshold is set very high (i.e., high values for x), the signal is almost always detected. Signal pulses can be missed (i.e., probability of detection is very low). However, a pulse power threshold can be selected in between these two extremes that provides a reasonable high probability of detection while having a reasonably low false alarm rate.

For example, for a single pulse, if a probability of detection of >90% is desired, this probability may require setting a threshold 1.28 standard deviations below the mean (i.e., peak) of the Gaussian curve. If a probability of detection of >99.9% is desired, this probability may set a threshold 3.0 standard deviations below the mean (i.e., peak) of the Gaussian curve. The false alarm rate can depend on factors such as the nature of the noise source, which drives the exact shape and magnitude of the noise PDF curve.

Further in this example, controller 214 continues to move laser beam 233 from current location 225 to subsequent neighbor location 245 of nearest neighbor 244 from current location 225 in response to time 248 for moving laser beam 233 from current location to next location 224 using location 222 nearest to maximum 223 of uncertainty area 281 being greater than threshold 247 and in response to not receiving confirmation 227 that satellite 238 has received laser beam 233.

As a result, controller 214 changes from using nearest to maximum scan 240 to nearest neighbor scan 242. This type of hybrid scan can provide a faster location of satellite 238 as compared to just using nearest to maximum scan 240.

In moving laser beam 233 to neighbor location 243 of nearest neighbor 244 and continuing to move laser beam 233 from current location 225 to subsequent neighbor location 245 of nearest neighbor 244 from current location 225 is part of a nearest neighbor scan 242 selected from one of a continuous spiral scan, a step spiral scan, a segmented scan, and a raster scan.

In response to receiving confirmation 227, controller 214 establishes communications with satellite 238. The communication is selected from one of unidirectional communications and bidirectional communications.

In one illustrative example, one or more technical solutions are present that overcome a technical problem with pointing an electromagnetic beam, such as a laser, at a receiver. As a result, one or more illustrative examples enable pointing a laser beam at a receiver in an efficient manner. The pointing of the laser beam is performed in a manner that uses a nearest to maximum scan as opposed to a nearest neighbor scan.

Computer system 212 can be configured to perform at least one of the steps, operations, or actions described in the different illustrative examples using software, hardware, firmware, or a combination thereof. As a result, computer system 212 operates as a special purpose computer system in which controller 214 in computer system 212 enables pointing an electromagnetic beam 203 at electromagnetic beam receiver 204 more quickly as compared to current techniques. Controller 214 transforms computer system 212 into a special purpose computer system as compared to currently available general computer systems that do not have controller 214.

In the illustrative example, the use of controller 214 in computer system 212 integrates processes into a practical application for pointing electromagnetic beam 203 at electromagnetic beam receiver 204. In these different examples, the processes identify locations to point electromagnetic beam 203 and control electromagnetic beam transmission system 202 to point electromagnetic beam 203 at the different locations as part of a process to locate electromagnetic beam receiver 204.

The illustration of electromagnetic signal environment 200 in FIG. 2 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, electromagnetic beam 203 has been described as being laser beam 233. Electromagnetic beam 203 can take other forms in other illustrative examples. For example, electromagnetic beam 203 can be selected from a group comprising laser beam 233, a radio frequency beam, a microwave beam, and other suitable types of electromagnetic signals that can be shaped into a beam.

As another example, platform 205 can take a number of different forms in addition to satellite 238. For example, electromagnetic beam receiver 204 can be located in platform 205 selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and other suitable platforms.

As another example, uncertainty area 281 can take other shapes in addition to hexagon 291. For example, uncertainty area 281 can be a shape selected from a group comprising a circle, an octagon, an ellipse, or some other suitable shape. Controller 214 can control one or more electromagnetic beam systems in addition to or in place of electromagnetic beam system 220. Further, the system can be used with an electromagnetic signal receiver system as described below with respect to FIG. 3.

In another example, controller 214 in electromagnetic beam transmission system 202 can point electromagnetic beam 203 to different locations in an uncertainty area using other mechanisms other than the location nearest to a maximum of an uncertainty area.

For example, controller 214 can control the electromagnetic beam system 220 to direct electromagnetic beam 203 to a location in uncertainty area 131 using a scan metric. Uncertainty area 281 is an area in which object 293 is expected to be located although it is possible that object 293 may not be in uncertainty area 281.

Controller 214 can control electromagnetic beam system 220 to move electromagnetic beam 203 from location 222 to next location 224 using the scan metric in response to not receiving confirmation 227 that object 293 is at location 222. Next location 224 becomes current location 225 for electromagnetic beam 203. Controller 214 can control electromagnetic beam system 220 to continue to move the electromagnetic beam 203 from current location 225 to next location 224 using the scan metric in response to not receiving confirmation 227 that object 293 is at location 222.

Further in this example, controller 214 selects next location 224 in uncertainty area 281 from a set of candidate locations that has a highest value for the scan metric, wherein the scan metric is as follows:

$$M = PDF_{int}/t_{tot}$$

where $PDF_{int}$ is a probability density function integrated over an area of interest for a next potential location and $t_{tot}$ is a total time $t_{tot}=t_{slew}+t_{dwell}$, $t_{slew}$ is a time to slew a line-of-sight from a current location to the next potential location, and $t_{dwell}$ is a time the line of site dwells at the next potential location.

Figure 3:
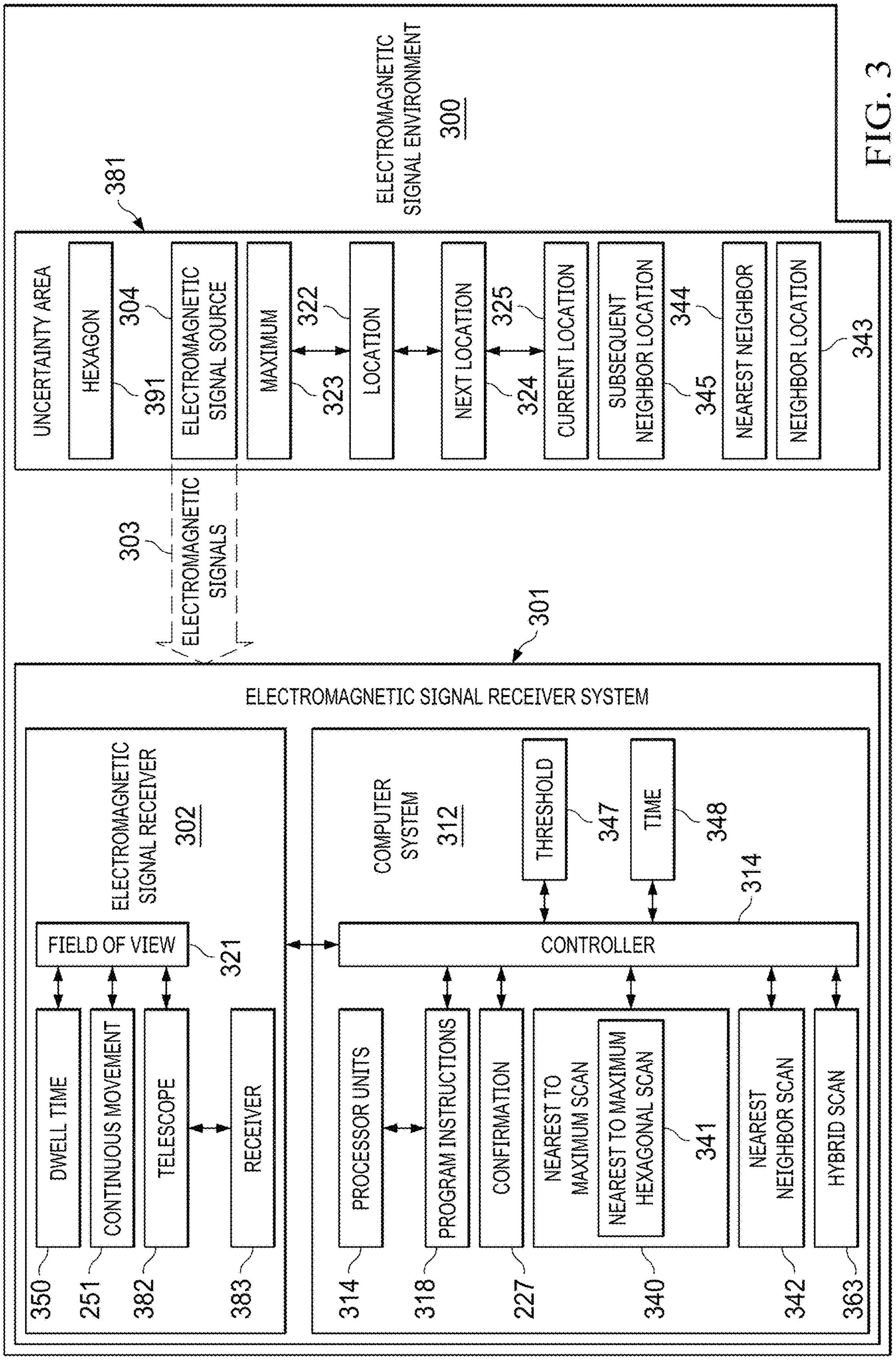
FIG. 3 is an illustration of a block diagram of an electromagnetic signal environment in accordance with an illustrative example.

Pointing electromagnetic signal receiver at an electromagnetic signal source also takes more time than desired and is more challenging than desired. With reference now to FIG. 3, an illustration of a block diagram of an electromagnetic signal environment is depicted in accordance with an illustrative example. In this illustrative example, electromagnetic signal environment 300 includes components that can be implemented in hardware such as the hardware shown in satellite 120 and receiver 122 and telescope 123 in FIG. 1.

In the illustrative example, electromagnetic signal receiver system 301 in electromagnetic signal environment 300 can be pointed to receive electromagnetic signals 303 from electromagnetic signal source 304. In this example, electromagnetic signal receiver system 301 comprises electromagnetic signal receiver 302 and controller 314. In this example, controller 314 is located in computer system 312. As depicted, computer system 312 is part of electromagnetic signal receiver system 301 in this example.

In this illustrative example, electromagnetic signal source 304 generates electromagnetic signals 303. Electromagnetic signals 303 can take a number of different forms. For example, electromagnetic signals 303 can be in a beam, collimated beam, omnidirectional signals, directional signals, or other types of radiation patterns for forms. Electromagnetic signals 303 can be selected from at least one of a laser beam, a radio frequency beam, a microwave beam, microwave signals, infrared signals, visible light signals, ultraviolet light signals, or other types of electromagnetic signals.

Electromagnetic signal source 304 can take a number of different forms. For example, electromagnetic signal source 304 can be a platform selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

Electromagnetic signal receiver 302 is a physical hardware system that can receive electromagnetic signals 303. Electromagnetic signal receiver 302 has field of view 321. In this illustrative example, hardware such as an antenna, radio receiver, photo detector, or other device that can detect electromagnetic signals 303 that are in field of view 321. This hardware is unable to detect or use electromagnetic signals 303 outside the field of view 321. The hardware can include receiver 383. Receiver 383 can be implemented using a receiver such as a photodetector, a photodiode system, a phase array antenna, focal plane array (FPA), cell (QC), or other suitable types of hardware.

In another illustrative example, electromagnetic signal receiver 302 can include telescope 382. Telescope 382 is a hardware component collecting incoming electromagnetic signals onto a detector in receiver 383.

In this illustrative example, field of view (FOV) 321 is the view that electromagnetic signal receiver 302 has to see or receive electromagnetic signals 303. Field of view 321 may be described as the angular range within which electromagnetic signal receiver 302 can detect or receive electromagnetic signals 303. In this example, field of view 321 can be defined by telescope 382.

In this example, field of view 321 can also be described as the instantaneous angle subtended by the scanning system that exceeds the detection threshold (e.g., the divergence angle of the laser beam (above threshold) for a laser-scanning system, or the sensor field of view for a receiving sensor).

In some illustrative examples, the size of field of view 321 can be controlled. Field of view 321 should have a size that enables detecting electromagnetic signals 303. For example, the time for nearest to maximum scan 340 to locate electromagnetic signal source 304 is faster than current techniques such as those that use a continuous file scan a segment scan oil raster scan. However, actually detecting electromagnetic signals 303 may be difficult with electromagnetic signals 303 being too weak for detection with the size of field of view 321. For example, the aperture or coping defining the field of view for a receiver may pick up signals from other sources for noises in addition to the signals from the desired source. As result, the receiver may struggle to identify and isolate electromagnetic signals 303 from the surrounding noise. As result, reducing or narrowing field of view 321 be performed to reduce issues with noise. In other words, size of field of view 321 can be adjusted to increase the signal-to-noise ratio.

In another example, the scan time becomes slower as field of view 321 is decreased. At some point, field of view 321 may be able to easily detect electromagnetic signals 303. However, the amount of scan time may be much slower than desired and may be slower than current techniques.

The size of field of view 321 can be selected such that electromagnetic signals 303 can be just barely detectable. In other words, these electromagnetic signals can be detected over noise that may be present. With this size for field of view 321, nearest to maximum scan 340 can be performed within a desired amount of time such as less than techniques that use a continuous scan based on a nearest neighbor.

Controller 314 can be implemented in the same manner as controller 214 in FIG. 2 in which program instructions 318 can be used to implement controller 214 that are executed by a number of processor units 316 in computer system 312. Program instructions 318, the number of processor units 316, and computer system 312 can be implemented in a manner similar to program instructions 218, processor units 216, and the computer system 212 in FIG. 2.

Controller 314 is configured to control the operation of electromagnetic signal receiver 302. In this illustrative example, controller 314 controls electromagnetic signal receiver 302 to move field of view 321 of electromagnetic signal receiver 302 to location 322 nearest to maximum 323 of uncertainty area 381 in which an electromagnetic signal source 304 is expected to be located. This moving of field of view 321 can also be referred to as pointing field of view 321.

Further, in this example, controller 314 moves field of view 321 of electromagnetic signal receiver 302 from location 322 to next location 324 nearest to maximum 323 of uncertainty area 381 in response to not detecting electromagnetic signals 303 from electromagnetic signal source 304 at location 322. In this example, next location 324 becomes current location 325 for field of view 321.

Controller 314 continues to move field of view 321 from current location 325 to next location 324 nearest to maximum 323 of uncertainty area 381 from current location 325 in response to not detecting electromagnetic signals 303 from electromagnetic signal source 304. This type of movement of the field of view 321 is a nearest to maximum scan 340. This scan can be nearest to maximum hexagonal scan 341 with uncertainty area 381. In this example, uncertainty area 381 can be in a shape of hexagon 391. In other examples, uncertainty area 381 can be a shape selected from a group comprising a circle, an octagon, an ellipse, or some other suitable shape in addition to or in place of hexagon 391.

Also in this illustrative example, controller 314 can continue to move field of view 321 from current location 325 to next location 324 nearest to maximum 323 of uncertainty area 381 from current location 325 with dwell time 350 at each location in response to not detecting the electromagnetic signals 303 from electromagnetic signal source 304. In other words, including field of view 321 from one location to another location, field of view 321 may remain or stay at one location for a period of time or move to another location.

In yet another example, controller 314 continues to move field of view 321 from current location 325 to next location 324 nearest to maximum 323 of uncertainty area 381 from current location 325 with continuous movement 351 from one location to another location in response to not detecting electromagnetic signals 303 from electromagnetic signal source 304. In this example, field of view 321 moves to different locations without stopping or pausing at the different locations.

Further, controller 314 can change the manner in which field of view 321 is moved. In this example, controller 314 can begin with nearest to maximum scan 340 and change to nearest neighbor scan 342. This type of scan in which the scanning changes from nearest to maximum scan 340 to nearest neighbor scan 342 is referred to as hybrid scan 363.

For example, controller 314 moves field of view 321 to neighbor location 343 of nearest neighbor 344 in response to time 348 for moving field of view 321 from current location 325 to next location 324 using location 322 nearest to maximum 323 of uncertainty area 381 being greater than threshold 347. In this example, next location 324 becomes current location 325.

Controller 314 continues to move field of view 321 from current location 325 to subsequent neighbor location reported by nearest neighbor 344 from current location 325 in response to time 348 for moving field of view 321 from current location 325 to next location 324 using location 322 nearest to maximum 323 of uncertainty area 381 being greater than threshold 347 and in response to not detecting electromagnetic signals 303 from electromagnetic signal source 304.

In this case, threshold 347 can be selected as the time for moving field of view 321 from one location to a neighboring location. In another illustrative example, the threshold can be a lower time or some other suitable time.

Also, moving field of view 321 to neighbor location 343 of nearest neighbor 344 and continuing to move field of view 321 from current location 325 to subsequent neighbor location 345 of nearest neighbor 344 from current location 325 can be part of nearest neighbor scan 342. This nearest neighbor scan can be selected from one of a continuous spiral scan, a step spiral scan, a segmented scan, and a raster scan.

In this illustrative example, controller 314 can detect electromagnetic signals 303 from electromagnetic signal source 304 in response to detecting selected electromagnetic signals that are greater than a noise level in field of view 321. In response to detecting electromagnetic signals 303, controller 314 can establish communications with electromagnetic signal source 304. The communications are selected from one of unidirectional communications and bidirectional communications. In the illustrative example, the communications that are unidirectional from electromagnetic signal source 304 to electromagnetic signal receiver 302 does not necessarily require electromagnetic signal source 304 to know that electromagnetic signals 303 are being received by electromagnetic signal receiver 302.

The illustration of electromagnetic signal environment 300 in FIG. 3 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, electromagnetic signal receiver system 301 can be located on a platform. The platform can be a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and other suitable platforms.

In another illustrative example, controller 314 can be located in a separate platform or location from electromagnetic signal receiver system 301. Additionally, electromagnetic signal receiver system 301 may be used with an electromagnetic signal transmission system such as electromagnetic beam transmission system 202. In this example, a single controller can be present that controls both systems and that controller can be in a separate location from the systems.

In yet another illustrative example, controller 314 can be controlled by one or more electromagnetic signal receiver systems in addition to or in place of electromagnetic signal receiver system 301.

In one illustrative example, controller 314 in electromagnetic signal receiver system 301 is configured to control electromagnetic signal receiver 302 to move field of view 321 of electromagnetic signal receiver 302 to location 322 in uncertainty area 381 using a scan metric. Uncertainty area 381 is an area in which an electromagnetic signal source 304 is expected to be located. Controller 314 is configured to control electromagnetic signal receiver 302 to move field of view 321 from location 322 to next location 324 using the scan metric in response to not detecting electromagnetic signals 303 from electromagnetic signal source 304 at location 322. Next location 324 becomes current location 325 for field of view 321. Controller 314 is configured to control electromagnetic signal receiver 302 to continue to move field of view 321 from current location 325 to next location 324 using the scan metric in response to not detecting electromagnetic signals 303 from electromagnetic signal source 304.

Further, controller 314 can select next location 324 in uncertainty area 381 from a set of candidate locations that has a highest value for the scan metric. The scan metric is as follows:

$$M = PDF_{int}/t_{tot}$$

where $PDF_{int}$ is a probability density function integrated over an area of interest for a next potential location and $t_{tot}$ is a total time $t_{tot}=t_{slew}+t_{dwell}$, $t_{slew}$ is a time to slew a line-of-sight from a current location to the next potential location, and $t_{dwell}$ is a time the line of site dwells at the next potential location.

Figure 4:
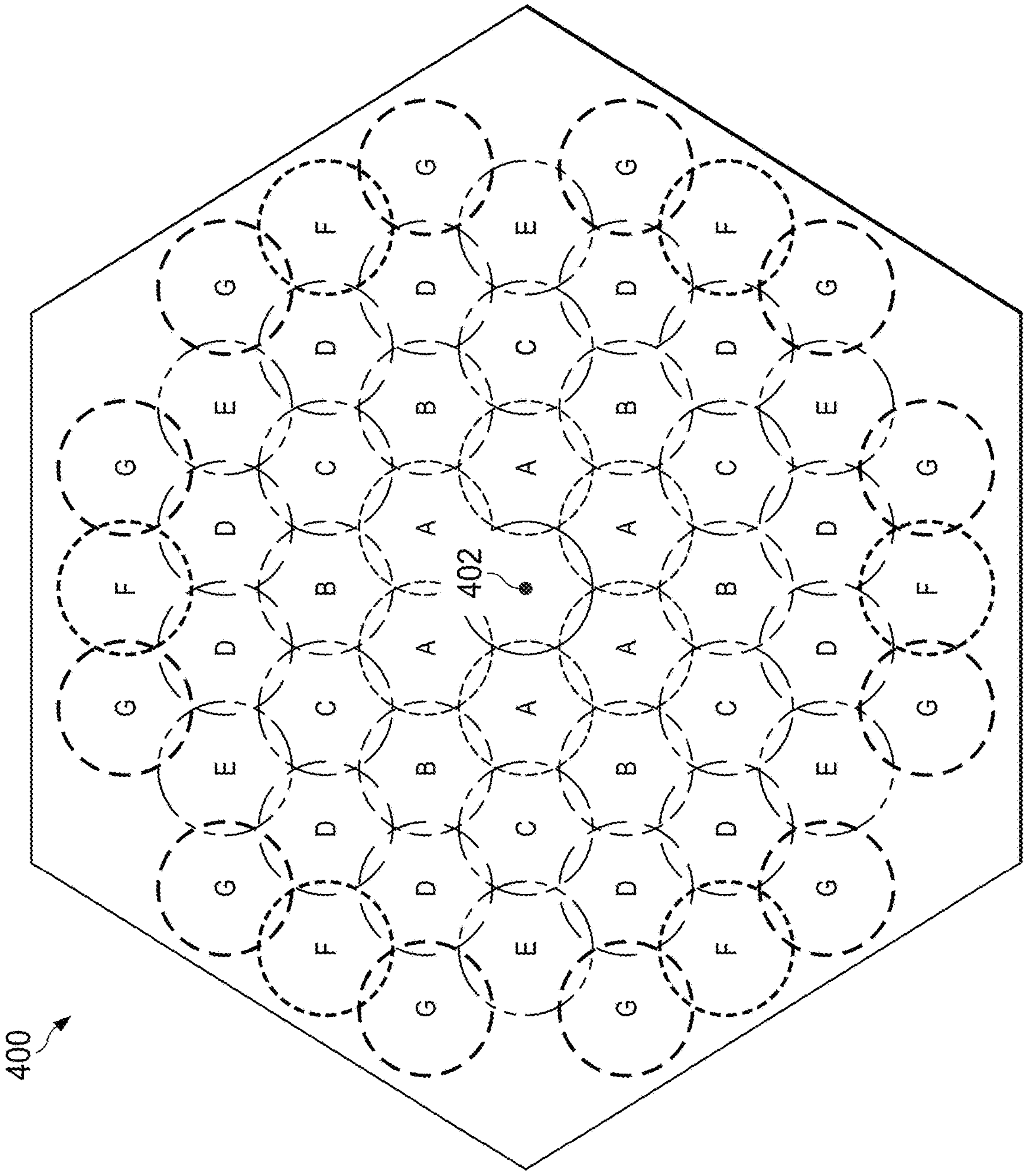
FIG. 4 is an illustration of locations for pointing an electromagnetic beam system or an electromagnetic signal receiver in accordance with an illustrative example.

With reference now to FIG. 4, an illustration of locations for pointing an electromagnetic beam system or an electromagnetic signal receiver is depicted in accordance with an illustrative example. In this example, locations are depicted within area 400. This area is an example of an implementation for uncertainty area 281 in FIG. 2 and uncertainty area 381 in FIG. 3. As depicted, area 400 has a hexagonal shape.

In this example, an electromagnetic beam receiver for an electromagnetic signal source is expected to be within area 400. In this example, locations can be selected to be the nearest to maximum of uncertainty area 400. In this example, the maximum of uncertainty area 400 is center 402. In other illustrative examples, the maximum uncertainty area 400 can be in other locations other than center 402.

For example, the first location can be locations for center 402. The next locations closest to center 402 are locations A.

Locations selected that are closest to center 402 after locations A are locations B. The next locations used for pointing electromagnetic beams or field of views are locations C. The next locations closest to center 402 are locations D with locations E being the next locations closest to the center after locations D. The next locations closest to center 402 are locations F followed by locations G.

As can be seen, this type of selection of locations is not a nearest neighbor selection as currently used. In some cases, moving from one location to another location may take more time than using a nearest neighbor selection location. In this case, the process can change from using the nearest to maximum scan of locations to a nearest neighbor scan for locations. A threshold time for changing the type of scan can be selected based on a number of different considerations. This type of scan is a hybrid scan in these different illustrative examples.

Figure 5:
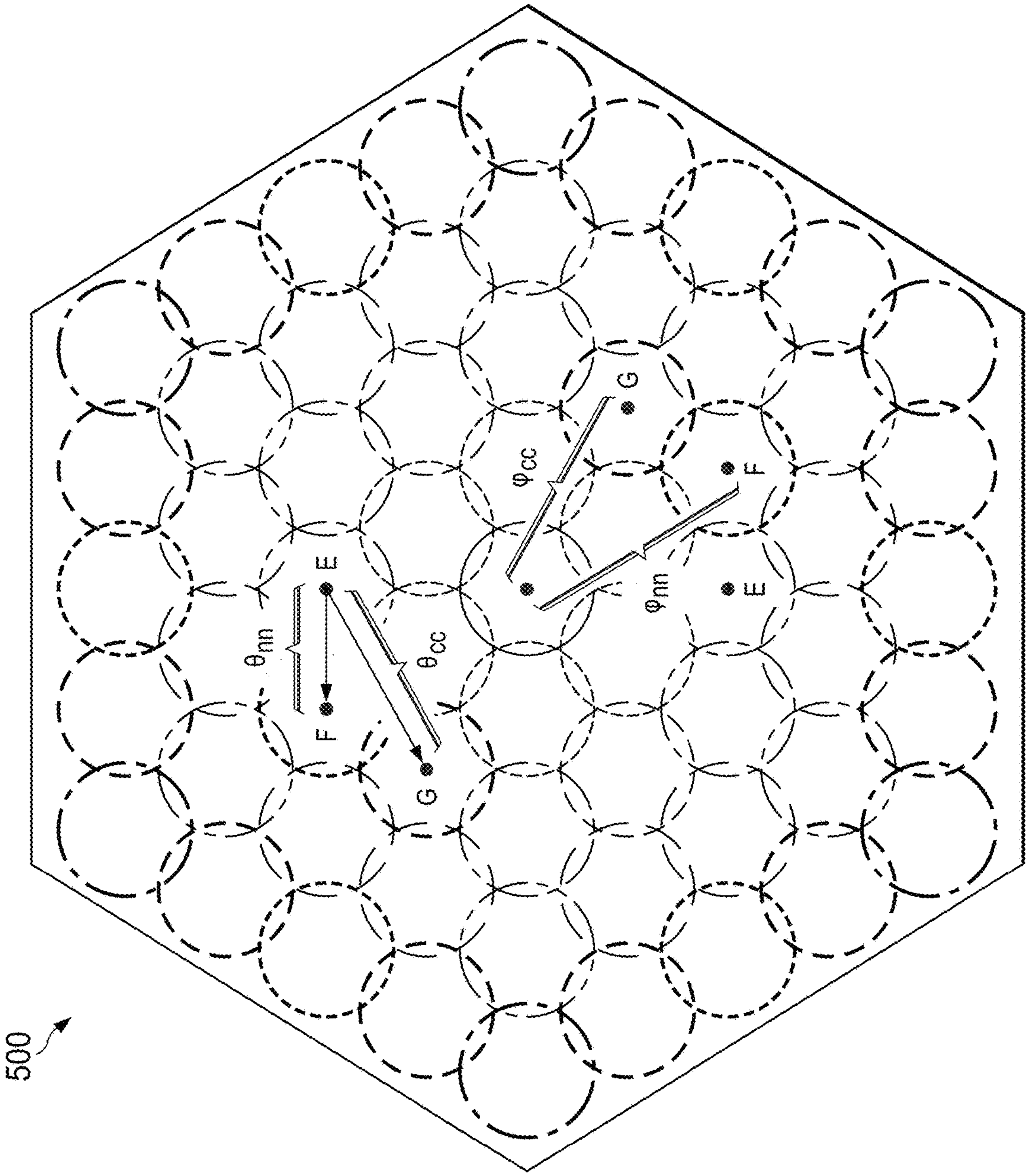
FIG. 5 is an illustration of locations and beam spots and angles between beam spots in accordance with an illustrative example.

Turning to FIG. 5, an illustration of locations and for beam spots and angles between beam spots is depicted in accordance with an illustrative example. In this example, a scan for directing an electromagnetic beam at beam spots 500 in a pattern can be performed using a nearest to maximum scan. The pattern includes the location of beam spots as well as an order in which an electromagnetic beam is directed to the different beam spots. This pattern can also be referred to as a beam spot pattern. This type of scan can be used to find a location of an electromagnetic beam receiver more quickly as compared to current scanning techniques.

As depicted, angle Θcc is between beam spot E and beam spot G, and angle Θnn is between beam spot E and beam spot F. Also shown is angle $\varphi_{cc}$ between the center and beam spot G, and angle $\varphi_{nn}$ is between the center and beam spot F. These angles can be used in determining a pattern of beam spots for pointing an electromagnetic beam.

In this example, the beam spot pattern can be determined using a nearest to maximum scan. For a given beam spot pattern, the following equation can be used:

$$t_{net\,savings} \approx \frac{t_{scan}}{N}[PDF(\varphi_{cc}) - PDF(\varphi_{nn})] - \frac{\theta_{cc} - \theta_{nn}}{\text{slew rate}} \qquad \text{Equation A}$$

where $t_{net\ savings}$ is the time saved for a single jump from beam spot to beam spot using the nearest to maximum scan relative to the nearest neighbor scan. In other words, this variable is the time it takes for a single jump from one beam spot to another beam spot using the nearest to maximum scan approach minus the time it takes for a single jump from beam spot to beam spot using the nearest neighbor scan to determine the beam spot pattern.

$t_{scan}$ is the total scan time to use the nearest neighbor scan.

N is the total number of beam spots in the scan pattern.

PDF($\varphi_{cc}$) is a unitless value of the probability density function for the beam spot that was moved to for the nearest to maximum scan. This value is a function of distance from the beam spot to the center of the probability density function, which is equivalent to an angle defined as "φ".

PDF($\varphi_{nn}$) is the unitless value of the probability density function for the beam spot that was moved to for the nearest neighbor scan.

$\theta_{cc}$ is the angular separation between two beam spots when jumping from beam spot to beam spot using the nearest to maximum scan. The units can be degrees or radians.

$\theta_{nn}$ is the angular separation between two beam spots when jumping from beam spot to beam spot using the nearest neighbor scan.

slew rate is the speed at which the gimble moves. The units are angular change over time (e.g., degree/s or rad/s).

Example 1

In this example, the slew rate is infinite. This infinite slew rate means the electromagnetic beam instantly jumps from beam spot to beam spot. In this case Equation A becomes:

$$t_{net\,savings} \approx \frac{t_{scan}}{N}[PDF(\varphi_{cc}) - PDF(\varphi_{nn})] - \frac{\theta_{cc} - \theta_{nn}}{\infty} = \frac{t_{scan}}{N}[PDF(\varphi_{cc}) - PDF(\varphi_{nn})]$$

Since PDF($\varphi_{cc}$)cc)≥PDF($\varphi_{nn}$), $t_{net\ savings} \geq 0$, there is never a need to switch from the closest to center scan to the nearest neighbor scan for determining the beam spot pattern.

Example 2

In this example, the slew rate can be considered zero resulting in the following:

$$t_{net\,savings} \approx \frac{t_{scan}}{N}[PDF(\varphi_{cc}) - PDF(\varphi_{nn})] - \frac{\theta_{cc} - \theta_{nn}}{0} = -\infty$$

In this case, the nearest to maximum scan is not needed because the $t_{net\ savings} < 0$.

Example 3

Example 1 showed that if the slew rate is sufficiently fast, it always saves time to use the nearest to maximum scan to determine a beam spot pattern. Example 2 shows that if the slew rate is sufficiently slow, no time savings is present. In this example, the nearest neighbor scan is used.

If the slew rate is something in between these extremes, initially, time savings are present using the nearest to maximum scan. When the time savings change from a positive savings to a negative savings, a switch to the nearest neighbor scan can be used.

Figure 6:
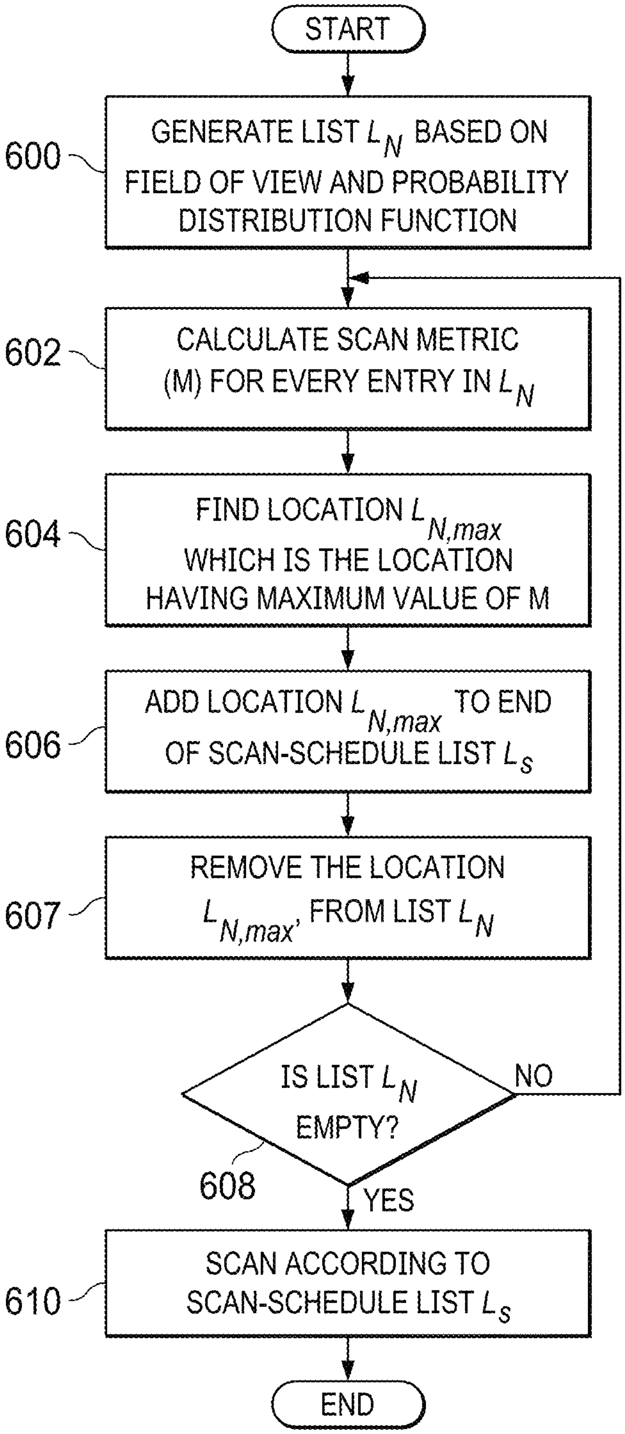
FIG. 6 is an illustration of a flowchart of a process for identifying locations for scanning an uncertainty area in accordance with an illustrative example.

Turning next to FIG. 6, an illustration of a flowchart of a process for identifying locations for scanning an uncertainty area is depicted in accordance with an illustrative example. The process in FIG. 6 can be implemented in hardware, software, or both. When implemented in software, the process can take the form of program instructions that are run by one of more processor units located in one or more hardware devices in one or more computer systems. This process can be implemented to identify locations for pointing an electromagnetic beam emitted from magnetic beam transmission system from and for pointing a field of view or an electromagnetic signal receiver. For example, the process can be implemented in controller 214 in computer system 212 in electromagnetic beam transmission system 202 in FIG. 2 and in controller 314 in computer system 312 in electromagnetic signal receiver system 301 in FIG. 3.

In this example, the pointing involves moving or directing electromagnetic beam 203 in FIG. 2 or field of view 321 in FIG. 3.

In this example, the field of view can be pointed at an uncertainty area. This uncertainty area is an example of uncertainty area 381 in FIG. 3. This uncertainty area can also be referred to as a field of regard (FOR).

The process begins by generating a list LN of all possible locations for the next scan step (operation 600). In operation 600, the possible locations are potential next locations for scanning. The process calculates a scan metric (M) for every entry in the list (LN) (operation 602).

In operation 602, the scan metric is as follows:

$$M = PDF_{int}/t_{tot}$$

where $PDF_{int}$ is the probability density function (PDF) integrated over an area of interest (AOI) for the next potential dwell location. The area of interest for pointing an electromagnetic beam is the region over which the electromagnetic beam exceeds the detection threshold. The area of interest for an electromagnetic signal receiver is the region of the field of view (FOV) for the electromagnetic signal receiver.

In this example, the total time, $t_{tot}$, is given by $t_{tot}=t_{slew}+t_{dwell}$, where $t_{slew}$ is the time it takes to slew the line-of-sight (LOS) from the current dwell location to the next potential location, and $t_{dwell}$ is the time the line of sight dwells at the next potential location. After the dwell at the current location, that dwell location is removed from the list of next possible dwell locations, and the process is repeated until there are no remaining possible dwell locations. The line of sight can be the center of the field of view and is moved to point the electromagnetic signal receiver to different locations.

The process finds location $L_{N,max}$, which is the location having maximum value of M (operation 604). In operation 604, the location $L_{N,max}$ is the location in the list $L_N$ with the maximum value for M. The system adds the location $L_{N,max}$ to the end of scan-schedule list $L_s$ (operation 606). In operation 606, the scan-schedule list $L_s$ is a scan-schedule list that saves an optimal order of scan steps to use in moving the field of view to different locations.

The process then removes the location $L_{N,max}$ from list LN (operation 607). The process determines whether the list LN is empty (operation 608). In operation 608, If list $L_N$ is not empty, the process returns to operation 602. Otherwise, the process proceeds to scan according to the scan-schedule list $L_s$ (operation 610) with the process terminating thereafter.

Figure 7:
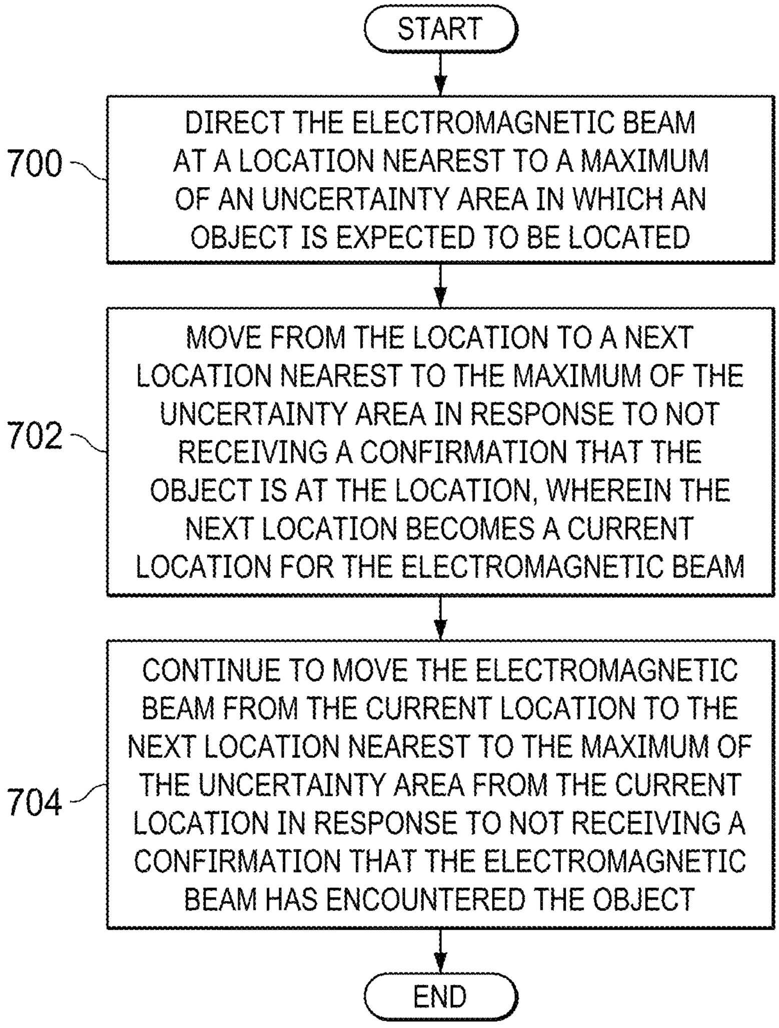
FIG. 7 is an illustration of a flowchart of a method for pointing an electromagnetic beam in accordance with an illustrative example.

With reference next to FIG. 7, an illustration of a flowchart of a method for pointing an electromagnetic beam is depicted in accordance with an illustrative example. The process in FIG. 7 can be implemented in hardware, software, or both. When implemented in software, the process can take the form of program instructions that are run by one of more processor units located in one or more hardware devices in one or more computer systems. For example, the process can be implemented in controller 214 in computer system 212 in electromagnetic beam system 220 in FIG. 2.

The process begins by directing the electromagnetic beam at a location nearest to a maximum of an uncertainty area in which an object is expected to be located (operation 700). The process moves from the location to a next location nearest to the maximum of the uncertainty area in response to not receiving a confirmation that the object is at the location, wherein the next location becomes a current location for the electromagnetic beam (operation 702).

The process continues to move the electromagnetic beam from the current location to the next location nearest to the maximum of the uncertainty area from the current location in response to not receiving a confirmation that the electromagnetic beam has encountered the object (operation 704). The process terminates thereafter.

In one illustrative example, the object can be an uncooperative object. In these examples, an uncooperative object is one that is not providing feedback that can be used as a confirmation that the object is in the location. In other words, if the electromagnetic beam is a laser beam and the object is a satellite, a satellite does not provide any feedback that the laser beam has encountered or eliminated a satellite. An uncooperative object can be, for example, that the satellite is not functioning. However, a confirmation that the laser beam has encountered the satellite can be detected by the reflection of the laser beam from the satellite.

Figure 8:
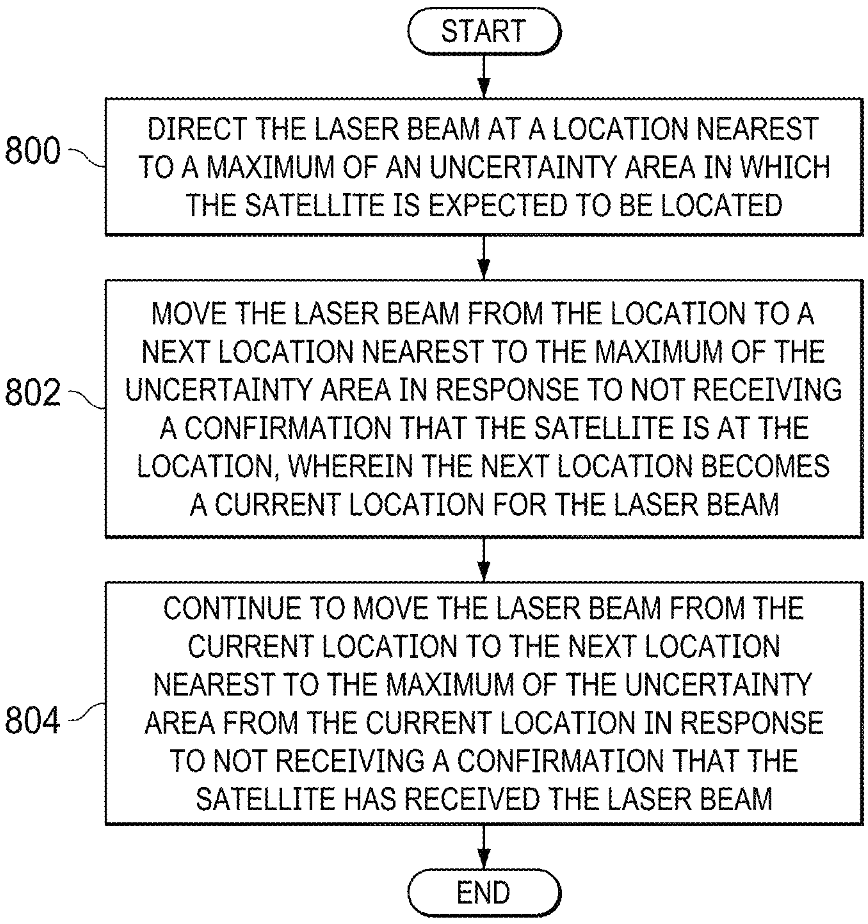
FIG. 8 is an illustration of a flowchart of a method for pointing a laser beam in accordance with an illustrative example.

With reference next to FIG. 8, an illustration of a flowchart of a method for pointing a laser beam is depicted in accordance with an illustrative example. The process in FIG. 8 can be implemented in hardware, software, or both. When implemented in software, the process can take the form of program instructions that are run by one of more processor units located in one or more hardware devices in one or more computer systems. For example, the process can be implemented in controller 214 in computer system 212 in laser beam system 230 in FIG. 2.

The process directs the laser beam at a location nearest to a maximum of an uncertainty area in which the satellite is expected to be located (operation 800). The process moves the laser beam from the location to a next location nearest to the maximum of the uncertainty area in response to not receiving a confirmation that the satellite is at the location, wherein the next location becomes a current location for the laser beam (operation 802). In operation 802, the movement can be movement in the form of a nearest to maximum hexagonal scan with the uncertainty area taking the form of a hexagon.

The process continues to move the laser beam from the current location to the next location nearest to the maximum of the uncertainty area from the current location in response to not receiving a confirmation that the satellite has received the laser beam (operation 804). The process terminates thereafter.

Figure 9:
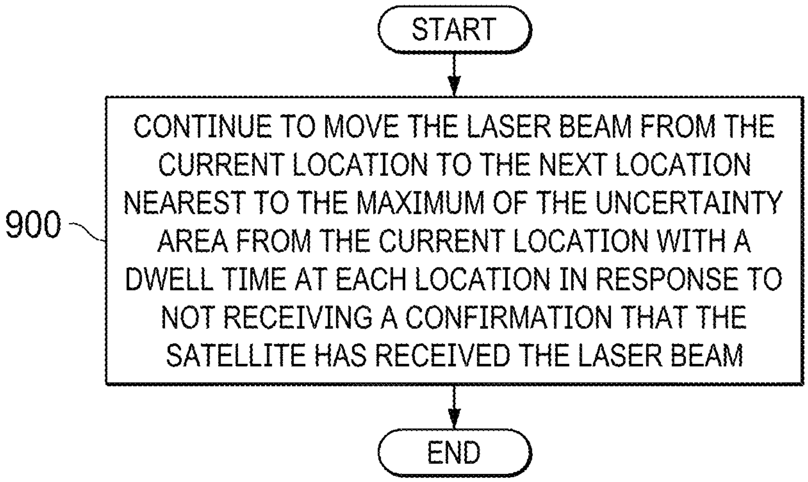
FIG. 9 is an illustration of a flowchart of a process for continuing to move a laser beam in accordance with an illustrative example.

Turning next to FIG. 9, an illustration of a flowchart of a process for continuing to move a laser beam is depicted in accordance with an illustrative example. The process in this flowchart is an example of an implementation for operation 804 in FIG. 8.

The process continues to move the laser beam from the current location to the next location nearest to the maximum of the uncertainty area from the current location with a dwell time at each location in response to not receiving a confirmation that the satellite has received the laser beam (operation 900). The process terminates thereafter.

Figure 10:
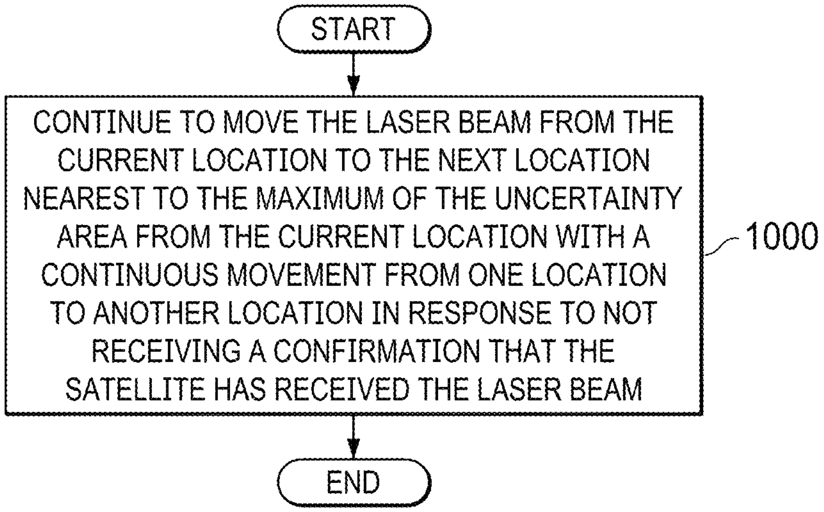
FIG. 10 is an illustration of a flowchart of a process for continuing a laser beam in accordance with an illustrative example.

In FIG. 10, an illustration of a flowchart of a process for continuing a laser beam is depicted in accordance with an illustrative example. The process in this flowchart is an example of an implementation for operation 804 in FIG. 8.

The process continues to move the laser beam from the current location to the next location nearest to the maximum of the uncertainty area from the current location with a continuous movement from one location to another location in response to not receiving a confirmation that the satellite has received the laser beam (operation 1000). The process terminates thereafter.

Figure 11:
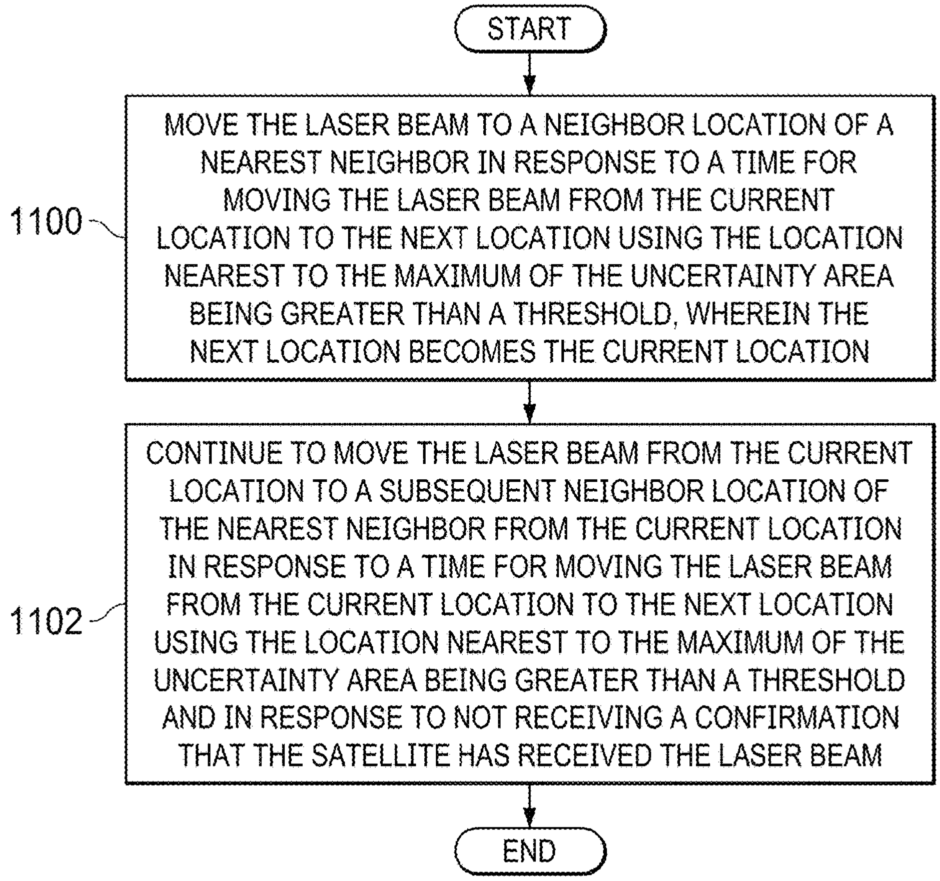
FIG. 11 is an illustration of a flowchart of a process for moving a laser beam in accordance with an illustrative example.

Turning now to FIG. 11, an illustration of a flowchart of a process for moving a laser beam is depicted in accordance with an illustrative example. The process in this flowchart is an example of additional operations that can be performed with the operations in FIG. 8.

The process moves the laser beam to a neighbor location of a nearest neighbor in response to a time for moving the laser beam from the current location to the next location using the location nearest to the maximum of the uncertainty area being greater than a threshold, wherein the next location becomes the current location (operation 1100). The process continues to move the laser beam from the current location to a subsequent neighbor location of the nearest neighbor from the current location in response to a time for moving the laser beam from the current location to the next location using the location nearest to the maximum of the uncertainty area being greater than a threshold and in response to not receiving a confirmation that the satellite has received the laser beam (operation 1102). The process terminates thereafter.

In this illustrative example, moving the laser beam to the neighbor location of the nearest neighbor and continuing to move the laser beam from the current location to the subsequent neighbor location of the nearest neighbor from the current location is part of a nearest neighbor scan selected from one of a continuous spiral scan, a step spiral scan, a segmented scan, and a raster scan.

Figure 12:
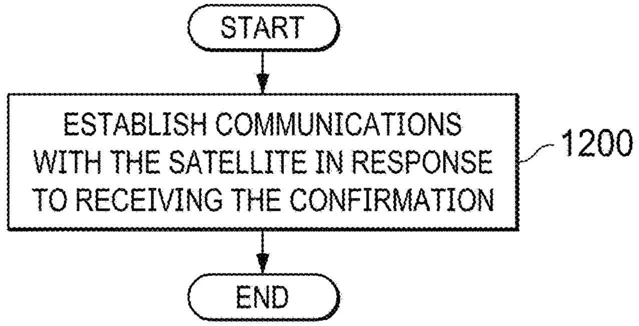
FIG. 12 is an illustration of a flowchart of a process for establishing communications in accordance with an illustrative example.

With reference next to FIG. 12, an illustration of a flowchart of a process for establishing communications is depicted in accordance with an illustrative example. The process in this figure is an example of an additional operation that can be performed with the operations in FIG. 8.

The process establishes communications with the satellite in response to receiving the confirmation (operation 1200). The process terminates thereafter. In operation 1200, communications are selected from one of unidirectional communications and bidirectional communications.

Figure 13:
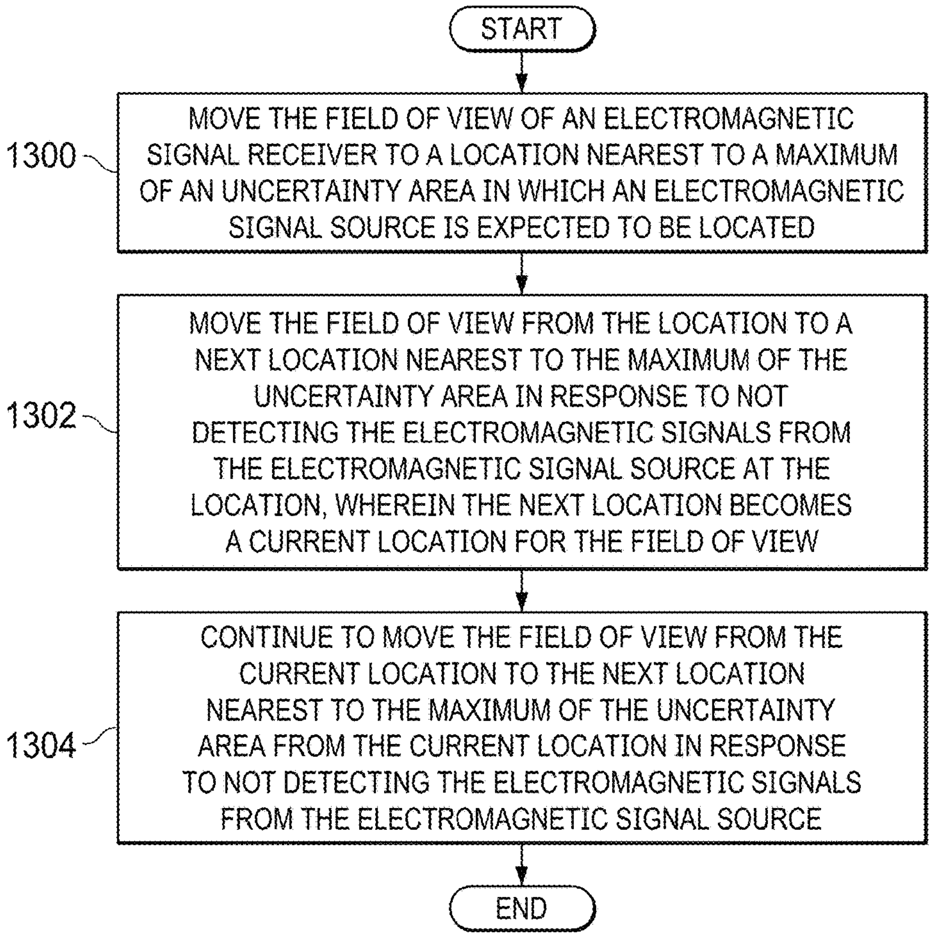
FIG. 13 is an illustration of a flowchart of a process for receiving electromagnetic signals in accordance with an illustrative example.

Turning to FIG. 13, an illustration of a flowchart of a process for receiving electromagnetic signals is depicted in accordance with an illustrative example. The process in FIG. 13 can be implemented in hardware, software, or both. When implemented in software, the process can take the form of program instructions that are run by one of more processor units located in one or more hardware devices in one or more computer systems. For example, the process can be implemented in controller 314 in computer system 312 in electromagnetic signal receiver system 301 in FIG. 3.

The process moves the field of view of an electromagnetic signal receiver to a location nearest to a maximum of an uncertainty area in which an electromagnetic signal source is expected to be located (operation 1300). Next, the process moves the field of view from the location to a next location nearest to the maximum of the uncertainty area in response to not detecting the electromagnetic signals from the electromagnetic signal source at the location, wherein the next location becomes a current location for the field of view (operation 1302).

The process continues to move the field of view from the current location to the next location nearest to the maximum of the uncertainty area from the current location in response to not detecting the electromagnetic signals from the electromagnetic signal source (operation 1304). The process terminates thereafter. In this example, the movement of the laser beam is in a form of a nearest to maximum hexagonal scan.

Figure 14:
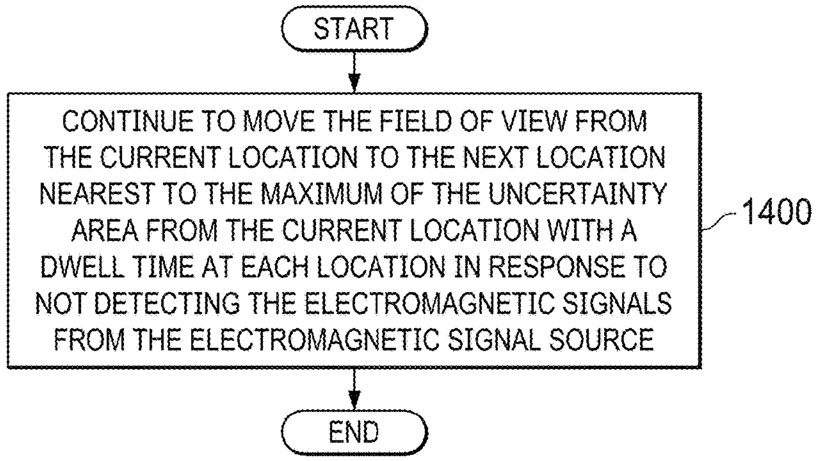
FIG. 14 is an illustration of a flowchart of a process for continuing to move a field of view in accordance with an illustrative example.

Turning next to FIG. 14, an illustration of a flowchart of a process for continuing to move a field of view is depicted in accordance with an illustrative example. The process in this figure is an example of an implementation for operation 1304 in FIG. 13.

The process continues to move the field of view from the current location to the next location nearest to the maximum of the uncertainty area from the current location with a dwell time at each location in response to not detecting the electromagnetic signals from the electromagnetic signal source (operation 1400). The process terminates thereafter.

Figure 15:
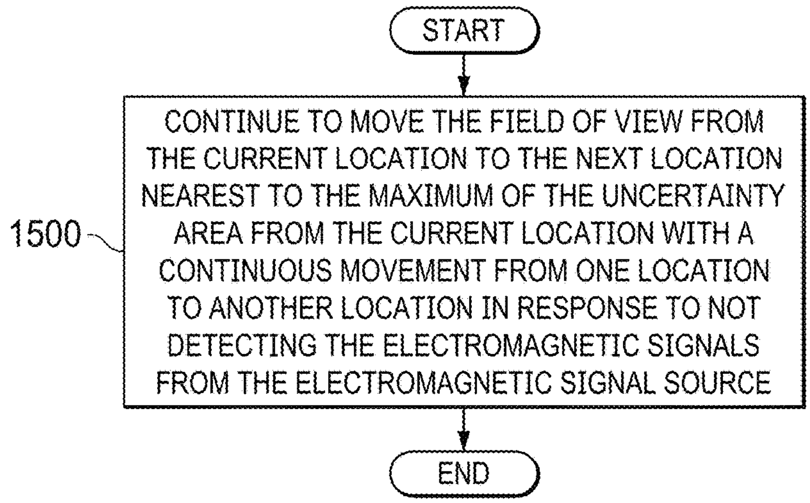
FIG. 15 is an illustration of a flowchart of a process for continuing to move a field of view in accordance with an illustrative example.

In FIG. 15, an illustration of a flowchart of a process for continuing to move a field of view is depicted in accordance with an illustrative example. The process in this figure is an example of an implementation for operation 1304 in FIG. 13.

The process continues to move the field of view from the current location to the next location nearest to the maximum of the uncertainty area from the current location with a continuous movement from one location to another location in response to not detecting the electromagnetic signals from the electromagnetic signal source (operation 1500). The process terminates thereafter.

Figure 16:
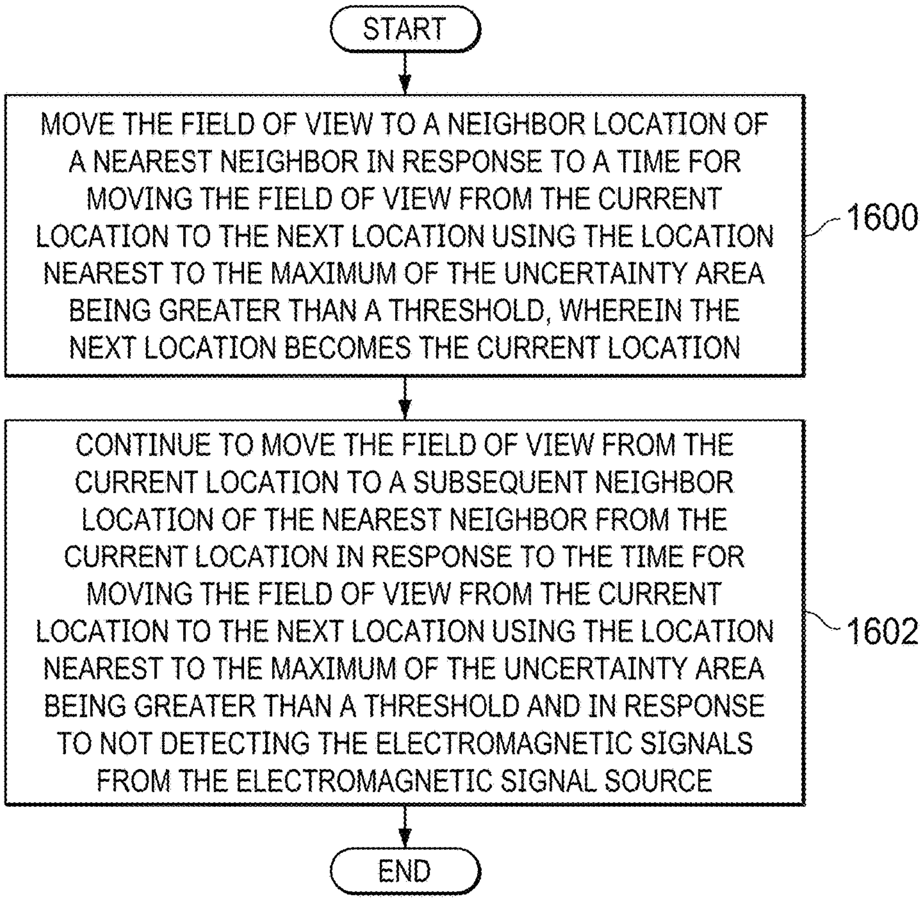
FIG. 16 is an illustration of a flowchart of an operation for moving a field of view in accordance with an illustrative example.

Next in FIG. 16, an illustration of a flowchart of an operation for moving a field of view is depicted in accordance with an illustrative example. The process in this figure is an example of additional operations that can be performed with the process in FIG. 13.

The process moves the field of view to a neighbor location of a nearest neighbor in response to a time for moving the field of view from the current location to the next location using the location nearest to the maximum of the uncertainty area being greater than a threshold, wherein the next location becomes the current location (operation 1600). The process continues to move the field of view from the current location to a subsequent neighbor location of the nearest neighbor from the current location in response to the time for moving the field of view from the current location to the next location using the location nearest to the maximum of the uncertainty area being greater than a threshold and in response to not detecting the electromagnetic signals from the electromagnetic signal source (operation 1602). The process terminates thereafter.

Moving the field of view to the neighbor location of the nearest neighbor and continuing to move the field of view from the current location to a subsequent neighbor location of the nearest neighbor from the current location is part of a nearest neighbor scan selected from one of a continuous spiral scan, a step spiral scan, a segmented scan, and a raster scan.

Figure 17:
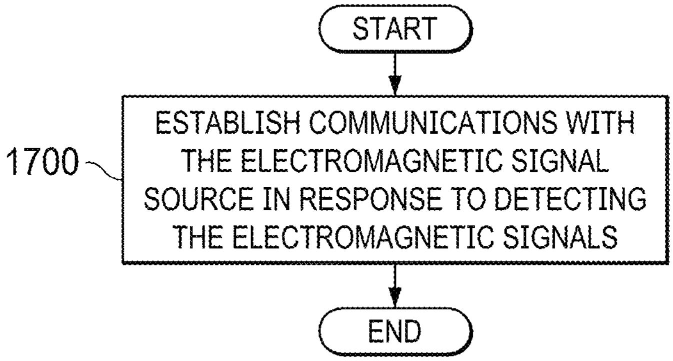
FIG. 17 is an illustration of a flowchart of a process for establishing communications in accordance with an illustrative example.

Turning now to FIG. 17, an illustration of a flowchart of a process for establishing communications is depicted in accordance with an illustrative example. The process in this flowchart is an example of additional operations that can be performed with the process in FIG. 13.

The process establishes communications with the electromagnetic signal source in response to detecting the electromagnetic signals (operation 1700). The process terminates thereafter.

Figure 18:
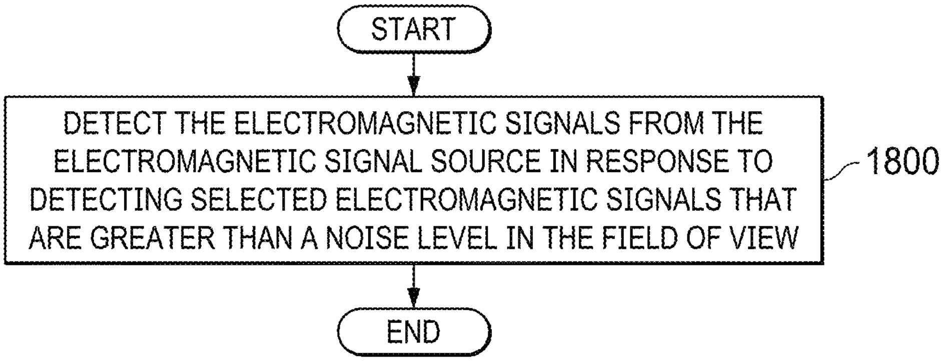
FIG. 18 is an illustration of a flowchart of a process for detecting electromagnetic signals in accordance with an illustrative example.

With reference next to FIG. 18, an illustration of a flowchart of a process for detecting electromagnetic signals is depicted in accordance with an illustrative example. The process in FIG. 18 is an example of additional operations that can be performed with the process in FIG. 13.

The process detects the electromagnetic signals from the electromagnetic signal source in response to detecting selected electromagnetic signals that are greater than a noise level in the field of view (operation 1800). The process terminates thereafter. In operation 1800, the communications are selected from one of unidirectional communications and bidirectional communications.

The flowcharts and block diagrams in the different depicted examples in FIGS. 6-18 illustrate the architecture, functionality, and operation of some possible implementations of apparatuses and methods in an illustrative example. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 19:
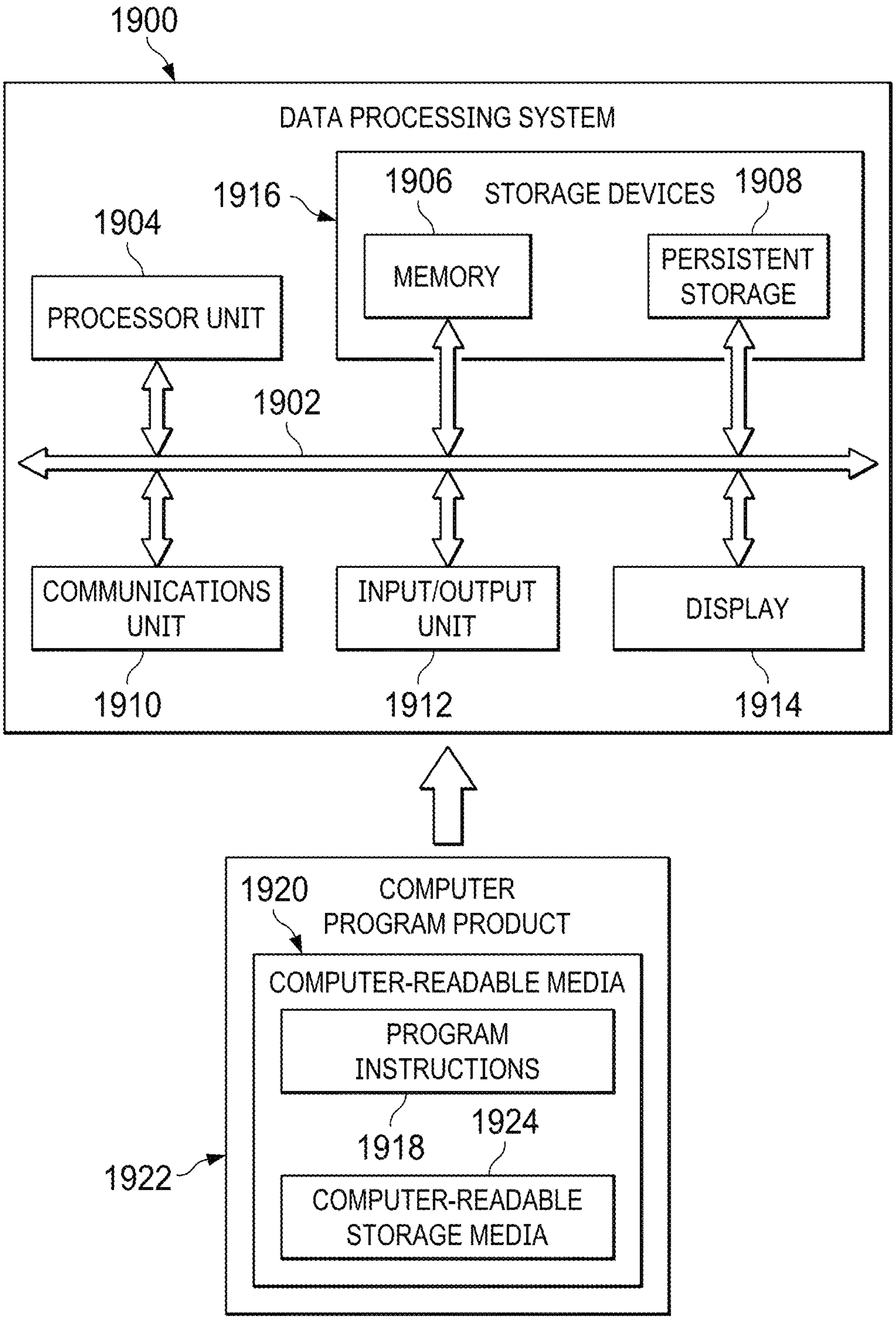
FIG. 19 is an illustration of a block diagram of a data processing system in accordance with an illustrative example.

Turning now to FIG. 19, a block diagram of a data processing system is depicted in accordance with an illustrative example. Data processing system 1900 can be used to implement computer system 212 in FIG. 2 and computer system 312 in FIG. 3.

In this illustrative example, data processing system 1900 includes communications framework 1902, which provides communications between processor unit 1904, memory 1906, persistent storage 1908, communications unit 1910, input/output (I/O) unit 1912, and display 1914. In this example, communications framework 1902 takes the form of a bus system.

Processor unit 1904 serves to execute instructions for software that can be loaded into memory 1906. Processor unit 1904 includes one or more processors. For example, processor unit 1904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1904 can be implemented using one or more heterogeneous processor systems in which a main processor is present with secondary processors on a single chip. As another illustrative example, processor unit 1904 can be a symmetric multi-processor system containing multiple processors of the same type on a single chip.

Memory 1906 and persistent storage 1908 are examples of storage devices 1916. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1916 may also be referred to as computer-readable storage devices in these illustrative examples. Memory 1906, in these examples, can be, for example, a random-access memory or any other suitable volatile or non-volatile storage device. Persistent storage 1908 may take various forms, depending on the particular implementation.

For example, persistent storage 1908 may contain one or more components or devices. For example, persistent storage 1908 can be a hard drive, a solid-state drive (SSD), a flash memory, a rewritable optical disk, a rewritable magnetic tape, or some combination of the above. The media used by persistent storage 1908 also can be removable. For example, a removable hard drive can be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that can be connected to data processing system 1900. For example, input/output unit 1912 may provide a connection for user input through at least one of a keyboard, a mouse, or some other suitable input device. Further, input/output unit 1912 may send output to a printer. Display 1914 provides a mechanism to display information to a user.

Instructions for at least one of the operating system, applications, or programs can be located in storage devices 1916, which are in communication with processor unit 1904 through communications framework 1902. The processes of the different examples can be performed by processor unit 1904 using computer-implemented instructions, which may be located in a memory, such as memory 1906.

These instructions are referred to as program instructions, computer usable program instructions, or computer-readable program instructions that can be read and executed by a processor in processor unit 1904. The program instructions in the different examples can be embodied on different physical or computer-readable storage media, such as memory 1906 or persistent storage 1908.

Program instructions 1918 are located in a functional form on computer-readable media 1920 that is selectively removable and can be loaded onto or transferred to data processing system 1900 for execution by processor unit 1904. Program instructions 1918 and computer-readable media 1920 form computer program product 1922 in these illustrative examples. In the illustrative example, computer-readable media 1920 is computer-readable storage media 1924.

Computer-readable storage media 1924 is a physical or tangible storage device used to store program instructions 1918 rather than a medium that propagates or transmits program instructions 1918. Computer-readable storage media 1924 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 1924, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1918 can be transferred to data processing system 1900 using a computer-readable signal media. The computer-readable signal media are signals and can be, for example, a propagated data signal containing program instructions 1918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1920" can be singular or plural. For example, program instructions 1918 can be located in computer-readable media 1920 in the form of a single storage device or system. In another example, program instructions 1918 can be located in computer-readable media 1920 that is distributed in multiple data processing systems. In other words, some instructions in program instructions 1918 can be located in one data processing system while other instructions in program instructions 1918 can be located in another data processing system. For example, a portion of program instructions 1918 can be located in computer-readable media 1920 in a server computer while another portion of program instructions 1918 can be located in computer-readable media 1920 located in a set of client computers.

The different components illustrated for data processing system 1900 are not meant to provide architectural limitations to the manner in which different examples can be implemented. In some illustrative examples, one or more of the components may be incorporated in or otherwise form a portion of, another component. For example, memory 1906, or portions thereof, may be incorporated in processor unit 1904 in some illustrative examples. The different illustrative examples can be implemented in a data processing system including components in addition to or in place of those illustrated for data processing system 1900. Other components shown in FIG. 19 can be varied from the illustrative examples shown. The different examples can be implemented using any hardware device or system capable of running program instructions 1918.

Some features of the illustrative examples for pointing an electromagnetic beam are described in the following clauses. These clauses are examples of features and are not intended to limit other illustrative examples.

Clause 1

A laser beam transmission system comprising:

a laser beam system configured to transmit a laser beam;

a controller configured to control the laser beam system to:

direct the laser beam at a location nearest to a maximum of an uncertainty area in which a satellite is expected to be located;

move the laser beam from the location to a next location nearest to the maximum of the uncertainty area in response to not receiving a confirmation that the satellite is at the location, wherein the next location becomes a current location for the laser beam; and continue to move the laser beam from the current location to the next location nearest to the maximum of the uncertainty area from the current location in response to not receiving the confirmation that the satellite has received the laser beam.

Clause 2

The laser beam transmission system of clause 1, wherein a movement of the laser beam is in a form of a nearest to maximum hexagonal scan.

Clause 3

The laser beam transmission system of clause 1, wherein in continuing to move the laser beam, the controller is configured to:

continue to move the laser beam from the current location to the next location nearest to the maximum of the uncertainty area from the current location with a dwell time at each location in response to not receiving the confirmation that the satellite has received the laser beam.

Clause 4

The laser beam transmission system of clause 1, wherein in continuing to move the laser beam, the controller is configured to:

continue to move the laser beam from the current location to the next location nearest to the maximum of the uncertainty area from the current location with a continuous movement from one location to another location in response to not receiving the confirmation that the satellite has received the laser beam.

Clause 5

The laser beam transmission system of clause 1, wherein the controller is configured to control the laser beam system to:

move the laser beam to a neighbor location of a nearest neighbor in response to a time for moving the laser beam from the current location to the next location using the location nearest to the maximum of the uncertainty area being greater than a threshold, wherein the next location becomes the current location; and continue to move the laser beam from the current location to a subsequent neighbor location of the nearest neighbor from the current location in response to the time for moving the laser beam from the current location to the next location using the location nearest to the maximum of the uncertainty area being greater than the threshold and in response to not receiving the confirmation that the satellite has received the laser beam.

Clause 6

The laser beam transmission system of clause 5, wherein in moving the laser beam to the neighbor location of the nearest neighbor and continuing to move the laser beam from the current location to the subsequent neighbor location of the nearest neighbor from the current location is part of a nearest neighbor scan selected from one of a continuous spiral scan, a step spiral scan, a segmented scan, and a raster scan.

Clause 7

The laser beam transmission system of clause 1, wherein the controller is configured to:

establish communications with the satellite in response to receiving the confirmation.

Clause 8

The laser beam transmission system of clause 7, wherein the communications are selected from one of unidirectional communications and bidirectional communications.

Clause 9

The laser beam transmission system of clause 1, wherein the laser beam is selected from a group comprising a continuous laser beam and a pulsed laser beam.

Clause 10

An electromagnetic beam transmission system comprising:

an electromagnetic beam system configured to transmit an electromagnetic beam;

a controller configured to control the electromagnetic beam transmission system to:

direct the electromagnetic beam at a location nearest to a maximum of an uncertainty area in which an object is expected to be located;

move the electromagnetic beam from the location to a next location nearest to the maximum of the uncertainty area in response to not receiving a confirmation that the object is at the location, wherein the next location becomes a current location for the electromagnetic beam; and continue to move the electromagnetic beam from the current location to the next location nearest to the maximum of the uncertainty area from the current location in response to not receiving the confirmation that the electromagnetic beam has encountered the object.

Clause 11

The electromagnetic beam transmission system of clause 10, wherein the object is selected from a group comprising an uncooperative object, a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and an electromagnetic beam receiver.

Clause 12.

An electromagnetic beam transmission system comprising:

an electromagnetic beam system configured to transmit an electromagnetic beam;

a controller configured to control the electromagnetic beam transmission system to:

direct the electromagnetic beam to a location in an uncertainty area using a scan metric, wherein the uncertainty area is one in which an object is expected to be located;

move the electromagnetic beam from the location to a next location using the scan metric in response to not receiving a confirmation that the object is at the location, wherein the next location becomes a current location for the electromagnetic beam; and continue to move the electromagnetic beam from the current location to the next location using the scan metric in response to not receiving the confirmation that the electromagnetic beam has encountered the object.

Clause 13

The electromagnetic beam transmission system of clause 12, wherein the controller selects the next location in the uncertainty area from a set of candidate locations that has a highest value for the scan metric, wherein the scan metric is as follows:

$$M = PDFint/ttot$$

where PDFint is a probability density function integrated over an area of interest for a next potential location and ttot is a total time ttot=tslew+tdwell, tslew is a time to slew a line-of-sight from the current location to the next potential location, and tdwell is a time the line of site dwells at the next potential location.

Clause 14

A method for pointing a laser beam, the method comprising:

directing the laser beam at a location nearest to a maximum of an uncertainty area in which a satellite is expected to be located;

moving the laser beam from the location to a next location nearest to the maximum of the uncertainty area in response to not receiving a confirmation that the satellite is at the location, wherein the next location becomes a current location for the laser beam; and continuing to move the laser beam from the current location to the next location nearest to the maximum of the uncertainty area from the current location in response to not receiving the confirmation that the satellite has received the laser beam.

Clause 15

The method of clause 14, wherein a movement of the laser beam is in a form of a nearest to maximum hexagonal scan.

Clause 16

The method of clause 14, wherein continuing to move the laser beam comprises:

continuing to move the laser beam from the current location to the next location nearest to the maximum of the uncertainty area from the current location with a dwell time at each location in response to not receiving the confirmation that the satellite has received the laser beam.

Clause 17

The method of clause 14, wherein continuing to move the laser beam comprises:

continuing to move the laser beam from the current location to the next location nearest to the maximum of the uncertainty area from the current location with a continuous movement from one location to another location in response to not receiving the confirmation that the satellite has received the laser beam.

Clause 18

The method of clause 14 further comprising:

moving the laser beam to a neighbor location of a nearest neighbor in response to a time for moving the laser beam from the current location to the next location using the location nearest to the maximum of the uncertainty area being greater than a threshold, wherein the next location becomes the current location; and continuing to move the laser beam from the current location to a subsequent neighbor location of the nearest neighbor from the current location in response to the time for moving the laser beam from the current location to the next location using the location nearest to the maximum of the uncertainty area being greater than the threshold and in response to not receiving the confirmation that the satellite has received the laser beam.

Clause 19

The method of clause 18, wherein moving the laser beam to the neighbor location of the nearest neighbor and continuing to move the laser beam from the current location to the subsequent neighbor location of the nearest neighbor from the current location is part of a nearest neighbor scan selected from one of a continuous spiral scan, a step spiral scan, a segmented scan, and a raster scan.

Clause 20

The method of clause 14 further comprising:

establishing communications with the satellite in response to receiving the confirmation.

Clause 21

The method of clause 20, wherein the communications are selected from one of unidirectional communications and bidirectional communications.

Clause 22

The method of clause 14, wherein the laser beam is selected is selected from a group comprising a continuous laser beam and a pulsed laser beam.

Clause 23

A method for pointing an electromagnetic beam, the method comprising:

directing the electromagnetic beam at a location nearest to a maximum of an uncertainty area in which an object is expected to be located;

moving the electromagnetic beam from the location to a next location nearest to the maximum of the uncertainty area in response to not receiving a confirmation that the object is at the location, wherein the next location becomes a current location for the electromagnetic beam; and continuing to move the electromagnetic beam from the current location to the next location nearest to the maximum of the uncertainty area from the current location in response to not receiving the confirmation that the electromagnetic beam has encountered the object.

With respect to receiving electromagnetic signals, an example of the present disclosure provides an electromagnetic signal receiver system comprising an electromagnetic signal receiver having a field of view in which electromagnetic signals are received and a controller. The controller is configured to control the electromagnetic signal receiver to move the field of view to a location nearest to a maximum of an uncertainty area in which an electromagnetic signal source is expected to be located. The controller is configured to control the electromagnetic signal receiver to move the field of view from the location to a next location nearest to the maximum of the uncertainty area in response to not detecting the electromagnetic signals from the electromagnetic signal source at the location. The next location becomes a current location for the field of view. The controller is configured to control the electromagnetic signal receiver to continue to move the field of view from the current location to the next location nearest to the maximum of the uncertainty area from the current location in response to not detecting the electromagnetic signals from the electromagnetic signal source.

Another example of the present disclosure provides an electromagnetic signal receiver system comprising an electromagnetic signal receiver having a field of view in which electromagnetic signals are received and a controller. The controller is configured to control the electromagnetic signal receiver to move the field of view of the electromagnetic signal receiver to a location in an uncertainty area using a scan metric, wherein the uncertainty area is an area in which an electromagnetic signal source is expected to be located. The controller is configured to control the electromagnetic signal receiver to move the field of view from the location to a next location using the scan metric in response to not detecting the electromagnetic signals from the electromagnetic signal source at the location. The next location becomes a current location for the field of view. The controller is configured to control the electromagnetic signal receiver to continue to move the field of view from the current location to the next location using the scan metric in response to not detecting the electromagnetic signals from the electromagnetic signal source.

Yet another example of the present disclosure provides a method for receiving electromagnetic signals. A field of view of an electromagnetic signal receiver is moved to a location nearest to a maximum of an uncertainty area in which an electromagnetic signal source is expected to be located. The field of view is moved from the location to a next location nearest to the maximum of the uncertainty area in response to not detecting the electromagnetic signals from the electromagnetic signal source at the location. The next location becomes a current location for the field of view. The field of view is continued to be moved from the current location to the next location nearest to the maximum of the uncertainty area from the current location in response to not detecting the electromagnetic signals from the electromagnetic signal source.

Some features of the illustrative examples for receiving electromagnetic signals are described in the following clauses. These clauses are examples of features and are not intended to limit other illustrative examples.

Clause 1

An electromagnetic signal receiver system comprising:

an electromagnetic signal receiver having a field of view in which electromagnetic signals are received;

a controller configured to control the electromagnetic signal receiver to:

move the field of view to a location nearest to a maximum of an uncertainty area in which an electromagnetic signal source is expected to be located;

move the field of view from the location to a next location nearest to the maximum of the uncertainty area in response to not detecting the electromagnetic signals from the electromagnetic signal source at the location, wherein the next location becomes a current location for the field of view; and continue to move the field of view from the current location to the next location nearest to the maximum of the uncertainty area from the current location in response to not detecting the electromagnetic signals from the electromagnetic signal source.

Clause 2

The electromagnetic signal receiver system of clause 1, wherein a movement of the field of view is in a form of a nearest to maximum hexagonal scan. Clause 3.

The electromagnetic signal receiver system of clause 1, wherein in continuing to move the field of view, the controller is configured to:

continue to move the field of view from the current location to the next location nearest to the maximum of the uncertainty area from the current location with a dwell time at each location in response to not detecting the electromagnetic signals from the electromagnetic signal source.

Clause 4

The electromagnetic signal receiver system of clause 1, wherein in continuing to move the field of view, the controller is configured to:

continue to move the field of view from the current location to the next location nearest to the maximum of the uncertainty area from the current location with a continuous movement from one location to another location in response to not detecting the electromagnetic signals from the electromagnetic signal source.

Clause 5

The electromagnetic signal receiver system of clause 1, wherein the controller is configured to control the electromagnetic signal receiver system to:

move the field of view to a neighbor location of a nearest neighbor in response to a time for moving the field of view from the current location to the next location using the location nearest to the maximum of the uncertainty area being greater than a threshold, wherein the next location becomes the current location; and continue to move the field of view from the current location to a subsequent neighbor location of the nearest neighbor from the current location in response to a time for moving the field of view from the current location to the next location using the location nearest to the maximum of the uncertainty area being greater than the threshold and in response to not detecting the electromagnetic signals from the electromagnetic signal source.

Clause 6

The electromagnetic signal receiver system of clause 5, wherein moving the field of view to the neighbor location of the nearest neighbor and continuing to move the field of view from the current location to the subsequent neighbor location of the nearest neighbor from the current location is part of a nearest neighbor scan selected from one of a continuous spiral scan, a step spiral scan, a segmented scan, and a raster scan.

Clause 7

The electromagnetic signal receiver system of clause 1, wherein the controller is configured to:

establish communications with the electromagnetic signal source in response to detecting the electromagnetic signals.

Clause 8

The electromagnetic signal receiver system of clause 7, wherein the communications are selected from one of unidirectional communications and bidirectional communications.

Clause 9

The electromagnetic signal receiver system of clause 1, wherein the controller is configured to:

detect the electromagnetic signals from the electromagnetic signal source in response to detecting selected electromagnetic signals that are greater than a noise level in the field of view.

Clause 10

The electromagnetic signal receiver system of clause 1, wherein the electromagnetic signal receiver is selected from a group comprising a telescope.

Clause 11

The electromagnetic signal receiver system of clause 1, wherein the electromagnetic signals are selected from at least one of a laser beam, a radio frequency beam, a microwave beam, microwave signals, infrared signals, visible light signals, or ultraviolet light signals.

Clause 12

An electromagnetic signal receiver system comprising:

an electromagnetic signal receiver having a field of view in which electromagnetic signals are received;

a controller configured to control the electromagnetic signal receiver to:

move the field of view of the electromagnetic signal receiver to a location in an uncertainty area using a scan metric, wherein the uncertainty area is an area in which an electromagnetic signal source is expected to be located;

move the field of view from the location to a next location using the scan metric in response to not detecting the electromagnetic signals from the electromagnetic signal source at the location, wherein the next location becomes a current location for the field of view; and continue to move the field of view from the current location to the next location using the scan metric in response to not detecting the electromagnetic signals from the electromagnetic signal source.

Clause 13

The electromagnetic signal receiver system of clause 12, wherein the controller selects the next location in the uncertainty area from a set of candidate locations that has a highest value for the scan metric, wherein the scan metric is as follows:

$$M = PDFint/ttot$$

where PDFint is a probability density function integrated over an area of interest for a next potential location and ttot is a total time ttot=tslew+tdwell, tslew is a time to slew a line-of-sight from the current location to the next potential location, and tdwell is a time the line of site dwells at the next potential location.

Clause 14

A method for receiving electromagnetic signals comprising:

moving a field of view of an electromagnetic signal receiver to a location nearest to a maximum of an uncertainty area in which an electromagnetic signal source is expected to be located;

moving the field of view from the location to a next location nearest to the maximum of the uncertainty area in response to not detecting the electromagnetic signals from the electromagnetic signal source at the location, wherein the next location becomes a current location for the field of view; and continuing to move the field of view from the current location to the next location nearest to the maximum of the uncertainty area from the current location in response to not detecting the electromagnetic signals from the electromagnetic signal source.

Clause 15

The method of clause 14, wherein a movement of the field of view is in a form of a nearest to maximum hexagonal scan.

Clause 16

The method of clause 14, wherein continuing to move the field of view comprises:

continuing to move the field of view from the current location to the next location nearest to the maximum of the uncertainty area from the current location with a dwell time at each location in response to not detecting the electromagnetic signals from the electromagnetic signal source.

17. The method of claim 14, continuing to move the field of view comprises:

continuing to move the field of view from the current location to the next location nearest to the maximum of the uncertainty area from the current location with a continuous movement from one location to another location in response to not detecting the electromagnetic signals from the electromagnetic signal source.

Clause 18

The method of clause 14 further comprising:

moving the field of view to a neighbor location of a nearest neighbor in response to a time for moving the field of view from the current location to the next location using the location nearest to the maximum of the uncertainty area being greater than a threshold, wherein the next location becomes the current location; and continuing to move the field of view from the current location to a subsequent neighbor location of the nearest neighbor from the current location in response to not detecting the electromagnetic signals from the electromagnetic signal source from the current location to the next location using the location nearest to the maximum of the uncertainty area being greater than the threshold and in response to not detecting the electromagnetic signals from the electromagnetic signal source.

Clause 19

The method of clause 18, wherein moving the field of view to the neighbor location of the nearest neighbor and continuing to move the field of view from the current location to the subsequent neighbor location of the nearest neighbor from the current location is part of a nearest neighbor scan selected from one of a continuous spiral scan, a step spiral scan, a segmented scan, and a raster scan.

Clause 20

The method of clause 14 further comprising:

establishing communications with the electromagnetic signal source in response to detecting the electromagnetic signals.

Clause 21

The method of clause 20 wherein the communications is selected from one of unidirectional communications and bidirectional communications.

Clause 22

The method of clause 14 further comprising:

detecting the electromagnetic signals from the electromagnetic signal source in response to detecting selected electromagnetic signals that are greater than a noise level in the field of view.

Clause 23

The method of clause 14, wherein the electromagnetic signals are selected from at least one of a laser beam, a radio frequency beam, a microwave beam, microwave signals, infrared signals, and ultraviolet light signals.

The illustrative embodiments recognize and take into account one or more different considerations as described herein. During the initial acquisition in establishing the communications link, a time efficient scanning method for pointing laser beams at satellites is desired. Various scanning methods can be used to point a laser beam from a transmitting satellite to a receiving satellite. In satellite communications, lasers beams can have different wavelengths such as, for example, a wavelength of about 1064 nm in the near infrared wavelength range, 1550 nm in the visible wavelength range, and 532 nm in the visible wavelength range.

With the distances separating satellites, establishing communications between the satellites using laser beams requires a time efficient scanning technique. The speed at which an area to be scanned to locate a satellite is important in establishing the communications link as quickly as possible. For example, a service-level agreement (SLA) may require establishing a communications link within a specified amount of time.

Using the most time efficient technique for scanning an area to locate a satellite is important in quickly establishing communications links between satellites using laser beams to meet service-level agreements (SLAs) and other requirements or agreements.

Current laser scanning methods include a continuous spiral scan, a step spiral scan, a segment scan, and a raster scan. These types of scans for establishing the communications link may not be sufficiently fast to establish communications as quickly as needed to meet various requirements that may be present.

Currently, the different parameters for scanning for a satellite are fixed during the entire scan. However, given the probability of finding a satellite typically changes from location to location, the scan parameters can be changed from location to location to efficiently search for the satellite. In some cases, the scan parameters can be changed between some locations and not all of the locations.

Figure 20:
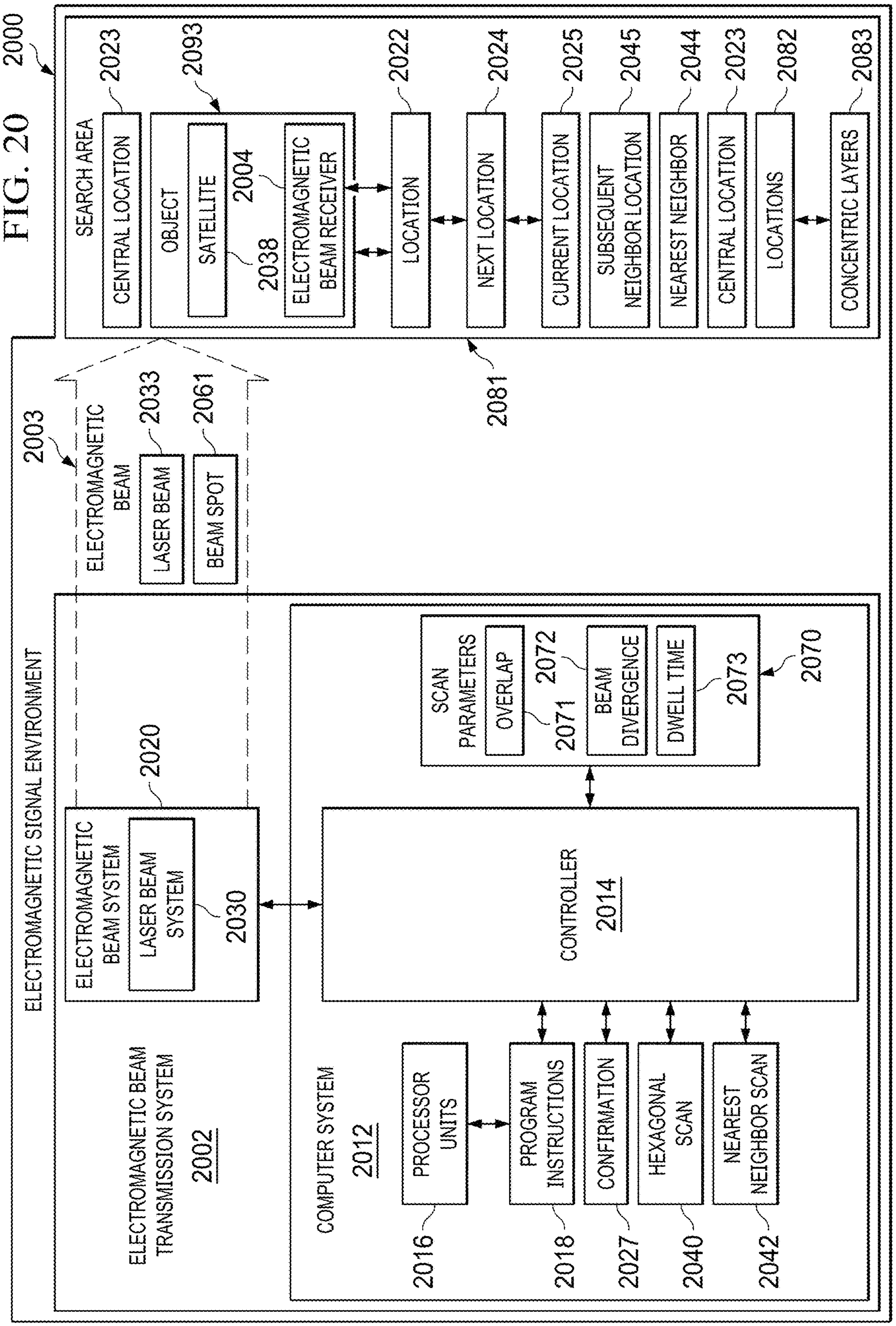
FIG. 20 is an illustration of a block diagram of an electromagnetic signal environment in accordance with an illustrative embodiment.

With reference now to FIG. 20, an illustration of a block diagram of an electromagnetic signal environment is depicted in accordance with an illustrative embodiment. In this illustrative example, electromagnetic signal environment 2000 includes components that can be implemented in hardware such as the hardware in satellite 101 and satellite 102 in FIG. 1. In this example, electromagnetic beam transmission system 2002 is an example of an implementation of electromagnetic beam transmission system 202 in FIG. 2. The components can be implemented using components in electromagnetic beam transmission system 2002 in electromagnetic beam transmission system 202 in FIG. 2.

In this illustrative example, electromagnetic beam transmission system 2002 can point the transmission of electromagnetic beam 2003 at object 2093. In this example, object 2093 can be electromagnetic beam receiver 2004. Electromagnetic beam receiver 2004 can be connected to object 2093 in this example. For example, object 2093 can be satellite 2038.

In this illustrative example, electromagnetic beam transmission system 2002 comprises electromagnetic beam system 2020 and controller 2014. In this example, controller 214 is located in computer system 2012. As depicted, computer system 2012 is also part of electromagnetic beam transmission system 2002.

Electromagnetic beam system 2020 is a physical hardware system. This hardware system is configured to transmit electromagnetic beam 2003.

Controller 2014 can be implemented in a similar manner as controller 214 in FIG. 2 in which program instructions 2018 can be used to implement controller 2014 that are executed by a number of processor units 2016 in computer system 2012. In this example, controller 2014 includes processes similar to those in controller 214 in FIG. 2 but also includes additional processes for controlling the manner in which a scan is performed. Program instructions 2018, the number of processor units 2016, and computer system 2012 can be implemented in a similar manner to program instructions 218, processor units 216, and computer system 212 in FIG. 2.

In this illustrative example, controller 2014 controls electromagnetic beam transmission system 2002 to direct electromagnetic beam 2003 at location 2022 in search area 2081 in which object 2093 is expected to be located. In other words, search area 2081 is an area in which object 2093 is believed to be present. This search area 2081 can have a number of different shapes selected from a group comprising a hexagon, a circle, an octagon, an ellipse, or some other shape. Object 2093 may not actually be in search area 2081. In some cases, search area 2081 can be selected as an area for searching with the intent of locating object 2093.

As depicted, electromagnetic beam 2003 has beam spot 2061. In this example, beam spot 2061 is a diameter of electromagnetic beam 2003 at a location in search area 2081. In this example, beam spots can correspond to locations in search area 2081. For example, location 2022 in search area 2081 can have a size and shape that corresponds to the size and shape of beam spot 2061 when the electromagnetic beam 2003 is directed at location 2022.

In one illustrative example, electromagnetic beam receiver 2004 is connected to object 2093. When one component is "connected" to another component, the connection is a physical connection. For example, a first component, electromagnetic beam receiver 2004, can be considered to be physically connected to a second component, object 2093, by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both. In some examples, the first component can be physically connected to the second component by being located within the second component.

In this example, controller 2014 controls electromagnetic beam system 2020 to direct electromagnetic beam 2003 at central location 2023 in search area 2081 in which object 2093 is expected to be located. In one example, object 2093 is satellite 2038. Central location 2023 is the first location for performing hexagonal scan 2040 and is at the center of search area 2081. Hexagonal scan 2040 occurs with the movement of electromagnetic beam 2003 to scan search area 2081. In this example, hexagonal scan 2040 has a shape of a hexagon. This type of search can be used with search area 2081 in the form of a hexagon, a circle, an octagon or some other shape that has radial symmetry. For example, if search area 2081 has the shape of a circle, this circle falls within the area scanned by hexagonal scan 2040. Locations that fall outside of search area 2081 when using hexagonal scan 2040 can be skipped.

In this example, controller 2014 controls electromagnetic beam system 220 to move electromagnetic beam 2003 to next location 2024 that is nearest neighbor 2044 to central location 2023 in response to not receiving confirmation 2027 that object 2093 is at central location 2023. Next location 2024 becomes current location 2025 for the electromagnetic beam 2003.

Further in this example, controller 214 controls electromagnetic beam system 2020 to adjust a number of scan parameters 2070 during a movement of the electromagnetic beam system 2020 to scan search area 2081. The number of scan parameters 2070 changes during scanning of search area 2081. In other words, the number of scan parameters 2070 does not remain fixed during the entire scan. In this illustrative example, the number of scan parameters 2070 can be adjusted by controller 2014 controlling electromagnetic beam system 2020. In this illustrative example, the number of scan parameters 2070 can be adjusted to increase the likelihood that electromagnetic beam 2003 hits object 2093 in search area 2081.

In this depicted example, controller 2014 controls electromagnetic beam system 2020 to continue to move electromagnetic beam 2003 from current location 2025 to next location 2024 that is nearest neighbor 2044 to current location 2025 in response to not receiving confirmation 2027 that object 2093 has received electromagnetic beam 2003.

This type of movement of electromagnetic beam 2003 is nearest neighbor scan 2042. In other words, the movement of electromagnetic beam 2003 is from current location 2025 to subsequent location 2045 that is nearest neighbor 2044 to current location 2025. In this example, each subsequent neighbor location that electromagnetic beam 2003 moves to is adjacent to current location 2025. Thus, with this type of movement, the scan performed using electromagnetic beam 2003 is both hexagonal scan 2040 and nearest neighbor scan 2042. This time of scan can also be referred to as a honeycomb-like laser beam scan.

In this illustrative example, confirmation 227 can take a number of different forms. For example, confirmation 2027 can be a reply or acknowledgment sent in a return electromagnetic beam to electromagnetic beam system 2020. In this example, electromagnetic beam system 220 can also receive electromagnetic beams. In another illustrative example, confirmation can be sent through another transmission to controller 2014 through another device such as a radiofrequency receiver or other type of receiver.

In one illustrative example, electromagnetic beam 2003 can take the form of laser beam 2033. Further, laser beam 2033 can be selected from a group comprising a continuous laser beam and a pulsed laser beam. Electromagnetic beam system 2020 can be laser beam system 2030 and object 2093 can take the form of satellite 238. In this example, electromagnetic beam transmission system 2002 is laser beam transmission system 2011.

In this example, controller 2014 controls laser beam system 2030 to direct laser beam 2033 at central location 2023 in search area 2081 in which satellite 2038 is expected to be located. Controller 2014 also controls laser beam system 2030 to move laser beam 2033 to next location 2024 that is nearest neighbor 2044 to central location 2023 in response to not receiving confirmation 2027 that satellite

2038 is at central location 2023. In this example, next location 2024 becomes current location 2025 for laser beam 2033.

Further, controller 2014 controls laser beam system 2030 to adjust a number of scan parameters 2070 during a movement of laser beam 2033 to scan search area 2081. As a result, the number of scan parameters 2070 can change during every movement of laser beam 2033 or during one or more movements of laser beam 2033 to scan search area 2081.

For example, controller 2014 can change the number of scan parameters 2070 from location to location. The adjustment to the number of scan parameters 2070 is made to efficiently search for satellite 2038. In some cases, the number of scan parameters 2070 can be changed between some locations and not all of the locations.

In this illustrative example, the number of scan parameters 2070 can be adjusted to increase the likelihood that laser beam 2033 hits satellite 2038 in search area 2081. The number of scan parameters 2070 can be selected from at least one of overlap 2071, beam divergence 2072, dwell time 2073, or other suitable scan parameters. In this illustrative example, controller 2014 can adjust the number of scan parameters 2070 during movement of laser beam 2033.

In the illustrative example, controller 2014 adjusts the number of scan parameters 2070 by increasing overlap 2071 during the movement of laser beam 2033 to scan search area 2081.

In one illustrative example, search area 2081 comprises locations 2082 around central location 2023 are arranged in concentric layers 2083 in search area 2081. These layers can also be referred to as rings and in particular as concentric rings. Each layer in concentric layers 2083 is larger or farther away from central location 2023 than a prior layer in concentric layers 2083. Central location 2023 can be considered a first layer in concentric layers 2083.

With these concentric layers of locations 2082, controller 2014 adjusts the number of scan parameters 2070 by increasing overlap 2071 at each layer in concentric layers 2083 in the search area 2081 during the movement of laser beam 2033 to scan search area 2081. Overlap 2071 at locations 2082 in a layer is uniform. In other words, overlap 2071 is the same for all locations in a layer.

In this example, nearest neighbor scan 2042 involves laser beam 2033 moving along a path from central location 2023 that progresses outward to the perimeter of search area 2081. Increased overlap results in more time being needed to perform nearest neighbor scan 2042.

The amount of overlap in different segments of the path for the scan can be selected such that the time needed to scan the entire path of nearest neighbor scan 2042 is the same as if the path used the same amount of overlap for the entire path. In other words, different segments of the path can have different amounts of overlap such that the total overlap present along the path for the segments can be the same as the total overlap for a path in which the amount of overlap is the same along the path for the scan.

In another illustrative example, controller 2014 adjusts the number of scan parameters 2070 by increasing a divergence of laser beam 2033 during the movement of the laser beam 2033 to scan search area 2081. In one illustrative example, in increasing beam divergence 2072, controller 2014 increases beam divergence 2072 of laser beam 2033 at each layer in concentric layers 2083 in the search area 2081 during the movement of the laser beam to scan search area 2081. With this example, beam divergence 2072 of the laser beam 2033 at locations 2082 in a layer is uniform.

A smaller divergence may increase the ability to detect satellite 2038 at a particular location. However, the smaller divergence means that the path for nearest neighbor scan 2042 is longer to cover search area 2081. As a result, increasing beam divergence 2072 as laser beam 2033 moves farther away from central location 2023 results in that portion of the path needing less time to cover search area 2081. As a result, the same amount of time is used for the scan as if beam divergence 2072 remained constant along the entire path for nearest neighbor scan 2042.

In still another illustrative example, controller 2014 adjusts the number of scan parameters 2070 by increasing dwell time 2073 for laser beam 2033 during the movement of laser beam 2033 to scan search area 2081. A longer dwell time increases the ability to detect satellite 2038 at a particular location. However, the increased dwell time results in the need for more time to perform nearest neighbor scan 2042. As a result, decreasing the dwell time as laser beam 2033 moves away from central location 2023 can reduce the scan time for that portion of the path for nearest neighbor scan 2042.

Further, in increasing dwell time 2073, controller 2014 can increase dwell time 2073 for laser beam 2033 at each layer in concentric layers 2083 in search area 2081 during the movement of laser beam 2033 to scan search area 2081. With this example, dwell time 2073 of laser beam 2033 at locations 2082 in a layer is uniform.

In this manner, controller 2014 can adjust a number of scan parameters 2070 such that the time to perform nearest neighbor scan 2042 can be performed within a desired amount of time. In other words, rather than having a longer dwell time along the entire path for nearest neighbor scan 2042, the dwell time can decrease as the scan progresses. This change in dwell time can be made during the scan because the likelihood of satellite 2038 being in a location farther away from central location 2023 is lower than at central location 2023.

Controller 2014 controls laser beam system 2030 to continue to move laser beam 2033 from current location 2025 to next location 2024 that is nearest neighbor 2044 to current location 2025 in response to not receiving confirmation 2027 that satellite 2038 has received laser beam 2033.

In these examples, the moving or directing of laser beam 2033 can also be referred to as pointing laser beam 2033. Further, laser beam 2033 can be selected from one of unidirectional communications and bidirectional communications.

In this example, confirmation 2027 can be received from satellite 2038. Satellite 2038 can send a return laser beam at the same angle as the incoming laser beam.

In this illustrative example, controller 2014 can perform a number of operations in response to locating satellite 2038. For example, controller 2014 can establish communications with satellite 2038 in response to receiving confirmation 2027 that satellite 2038 has received laser beam 2033.

In one illustrative example, one or more technical solutions are present that overcome a technical problem with pointing an electromagnetic beam, such as a laser beam, at a receiver connected to a platform. As a result, one or more illustrative examples enable pointing a laser beam at an object in an efficient manner. The pointing of the laser beam is performed in a manner that adjusts a number of scan parameters during the scanning process used to scan an area such as search area 2081.

Computer system 2012 can be configured to perform at least one of the steps, operations, or actions described in the different illustrative examples using software, hardware, firmware, or a combination thereof. As a result, computer system 2012 operates as a special purpose computer system in which controller 2014 in computer system 2012 enables adjusting scan parameters such that locating an object can be performed more quickly as compared to current techniques. Controller 2014 transforms computer system 2012 into a special purpose computer system as compared to currently available general computer systems that do not have controller 2014.

In the illustrative example, the use of controller 2014 in computer system 2012 integrates processes into a practical application for pointing electromagnetic beam 2003 at electromagnetic beam receiver 2004. In these different examples, the processes adjusts scan parameters 2070 during movement of electromagnetic beam 2003. In other words, the number of scan parameters 2070 are not fixed during the scanning of search area 2081.

The illustration of electromagnetic signal environment 2000 in FIG. 20 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, electromagnetic beam 2003 has been described as being laser beam 2033. Electromagnetic beam 2003 can take other forms in other illustrative examples such as a radio frequency beam, a microwave beam, and other suitable types of electromagnetic signals that can be shaped into a beam.

As another example, object 2093 can take a number of different forms in addition to satellite 2038. For example, object 2093 can be selected from a group comprising an uncooperative object, a platform, a mobile platform, a stationary platform, a land-based structure, an aquatic-based structure, a space-based structure, an aircraft, a vehicle controlled by an artificial intelligence system, a vehicle controlled by a neural network, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, an electromagnetic beam receiver, and other suitable types of objects.

As another example, controller 2014 can control one or more electromagnetic beam systems in addition to or in place of electromagnetic beam system 2020. Further, the system can be used with an electromagnetic signal receiver system as described below with respect to FIG. 3.

In one illustrative example, the number of scan parameters 2070 changes between concentric layers 2083. In other illustrative examples, the number of scan parameters 2070 can change at other locations to scan search area 2081. For example, the number of scan parameters 2070 can change within a layer in concentric layers 2083. The locations at which the number of scan parameters 2070 change can be selected to increase the likelihood that electromagnetic beam 2003, such as laser beam 2033, hits object 2093.

Figure 21:
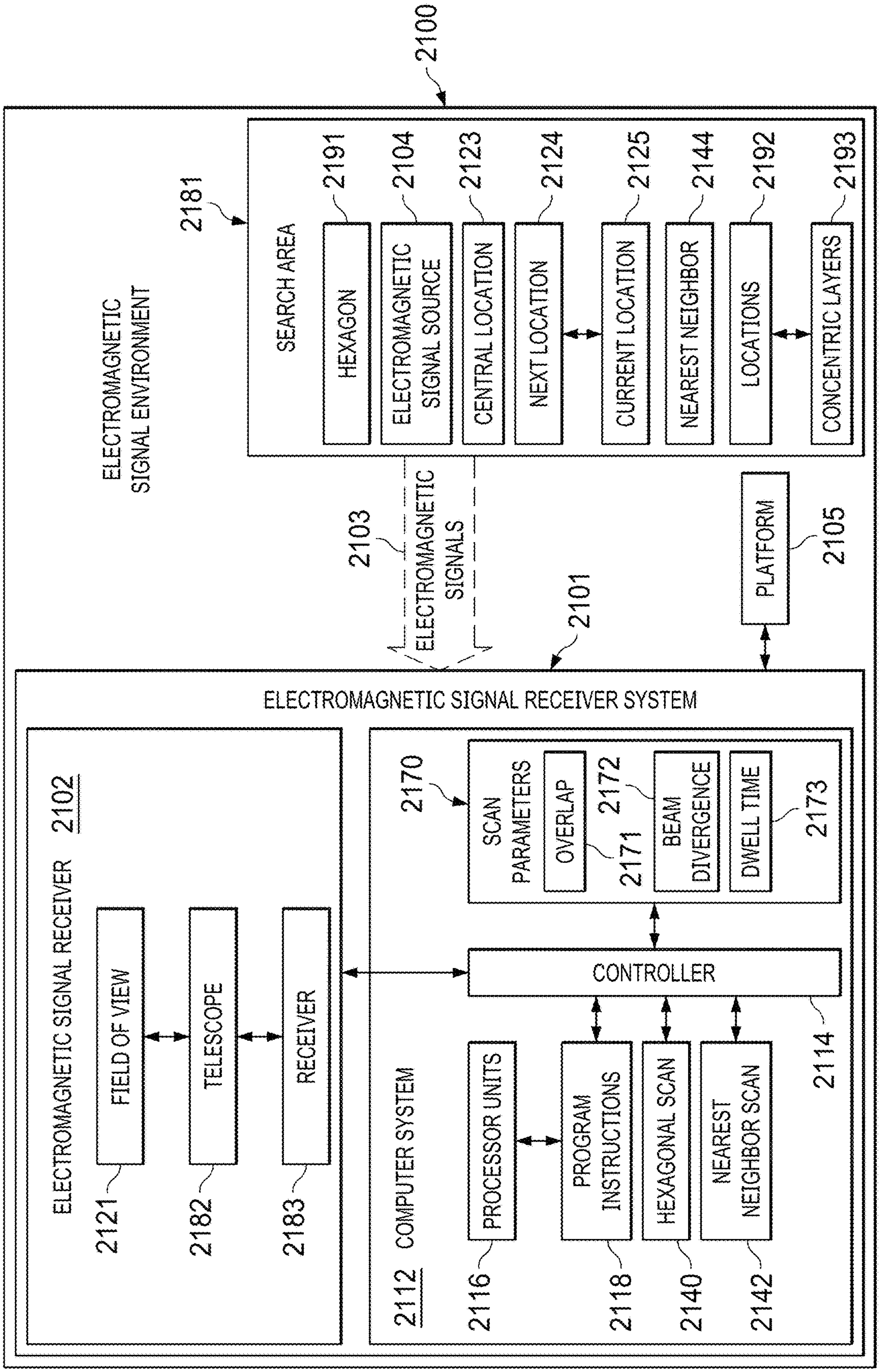
FIG. 21 is an illustration of a block diagram of an electromagnetic signal environment in accordance with an illustrative embodiment.

Pointing an electromagnetic signal receiver at an electromagnetic signal source can also take more time than desired and is more challenging than desired. With reference now to FIG. 21, an illustration of a block diagram of an electromagnetic signal environment is depicted in accordance with an illustrative embodiment. In this illustrative example, electromagnetic signal environment 2100 includes components that can be implemented in hardware such as the hardware shown in satellite 120 and receiver 122 and telescope 123 in FIG. 1.

In the illustrative example, electromagnetic signal receiver system 2101 in electromagnetic signal environment 2100 can be pointed to receive electromagnetic signals 2103 from electromagnetic signal source 2104. In this example, electromagnetic signal receiver system 2101 comprises electromagnetic signal receiver 2102 and controller 2114. In this example, controller 2114 is located in computer system 2112. As depicted, computer system 2112 is part of electromagnetic signal receiver system 2101 in this example. In this example, these components can be examples of components in electromagnetic signal receiver system 301 in FIG. 3. The components can be implemented using components in electromagnetic signal receiver system 301 in FIG. 3.

In this illustrative example, electromagnetic signal source 2104 generates electromagnetic signals 2103. Electromagnetic signals 2103 can take a number of different forms. For example, electromagnetic signals 2103 can be in a beam, collimated beam, omnidirectional signals, directional signals, or other types of radiation patterns for forms. Electromagnetic signals 2103 can be selected from at least one of a laser beam, a radio frequency beam, a microwave beam, microwave signals, infrared signals, visible light signals, ultraviolet light signals, or other types of electromagnetic signals.

Electromagnetic signal source 2104 can take a number of different forms. For example, electromagnetic signal source 2104 can be a platform selected from a group comprising a mobile platform, a stationary platform, a land-based structure, an aquatic-based structure, a space-based structure, an aircraft, a vehicle controlled by an artificial intelligence system, a vehicle controlled by a neural network, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

Electromagnetic signal receiver 2102 is a physical hardware system that can receive electromagnetic signals 2103. Electromagnetic signal receiver 2102 has field of view 2121. In this illustrative example, hardware such as an antenna, a radio receiver, a photo detector, or other device that can detect electromagnetic signals 2103 that are in field of view 2121 can be used. This hardware is unable to detect or use electromagnetic signals 2103 outside the field of view 2121.

The hardware can include receiver 2183. Receiver 2183 can be implemented using a receiver such as a photodetector, a photodiode system, a phase array antenna, focal plane array (FPA), cell (QC), or other suitable types of hardware.

In another illustrative example, electromagnetic signal receiver 2102 can include telescope 2182. Telescope 2182 is a hardware component collecting incoming electromagnetic signals onto a detector in receiver 2183.

In this illustrative example, field of view (FOV) 2121 is the view that electromagnetic signal receiver 2102 has to see or receive electromagnetic signals 2103. Field of view 2121 may be described as the angular range within which electromagnetic signal receiver 2102 can detect or receive electromagnetic signals 2103. In this example, field of view 2121 can be defined by telescope 2182.

In this example, field of view 2121 can also be described as the instantaneous angle subtended by the scanning system that exceeds the detection threshold.

Controller 2114 can be implemented in a similar manner as controller 314 in FIG. 3 in which program instructions 2118 can be used to implement controller 2114 that are executed by a number of processor units 2116 in computer system 2112. In this example, controller 2114 includes processes similar to those in controller 314 in FIG. 3 but also includes additional processes for controlling the manner in which a scan is performed to detect electromagnetic signals 2103. Program instructions 2118, the number of processor units 2016, and computer system 2112 can be implemented in a similar manner to program instructions 318, processor units 316, and the computer system 312 in FIG. 3.

Controller 2114 is configured to control the operation of electromagnetic signal receiver 2102. For example, controller 2114 can control electromagnetic signal receiver 2102 in search area 2181. Search area 2181 is an area in which electromagnetic signal source 2104 is believed to be present. This search can be performed by moving field of view 2121 to scan search area 2181.

In one illustrative example, search area 2181 comprises locations 2192 around central location 2123 that are arranged in concentric layers 2193 in search area 2081. These layers can also be referred to as rings and in particular as concentric rings. Each layer in concentric layers 2193 is larger or farther away from central location 2123 than a prior layer in concentric layers 2193. Central location 2123 can be considered a first layer in concentric layers 2193.

In this illustrative example, controller 2114 controls electromagnetic signal receiver 2102 to move field of view 2121 of electromagnetic signal receiver 2102 to central location 2123 in search area 2181 in which electromagnetic signal source 2104 is expected to be located. This moving of field of view 2121 can also be referred to as pointing field of view 2121. Central location 2123 is the first location for performing hexagonal scan 2140 and is at the center of search area 2081. Hexagonal scan 2140 occurs from moving field of view 2121 to scan search area 2181.

Further, in this example, controller 2114 moves field of view 2121 of electromagnetic signal receiver 2102 to next location 2124 that is nearest neighbor 2144 to central location 2123 in response to not detecting electromagnetic signals 2103 from electromagnetic signal source 2104 at central location 2123. In this example, next location 2124 becomes current location 2125 for field of view 2121. This type of movement of field of view 2121 is nearest neighbor scan 2142. Thus, the movement of field of view 2121 can be both hexagonal scan 2140 and nearest neighbor scan 2142.

Thus, with this type of movement, the scan performed by moving field of view 2121 is both hexagonal scan 2040 and nearest neighbor scan 2042.

Further in this example, controller 314 adjusts a number of scan parameters 2170 during a movement of field of view 2121 to scan search area 2181. In this illustrative example, the number of scan parameters 2170 can be adjusted by controller 2114 controlling electromagnetic signal receiver 2102. The number of scan parameters 2170 can be selected from at least one of overlap 2171, beam divergence 2172, dwell time 2173, or other suitable scan parameters. In this illustrative example, the number of scan parameters 2170 can be adjusted to increase the likelihood that electromagnetic signals 2103 from electromagnetic signal source 2104 are detected.

In this illustrative example, the number of scan parameters 2170 can be changed during movement of field of view 2121 using the same type of adjustments as described with respect to controller 2014 adjusting scan parameters 2070 while controlling laser beam system 2030 to move laser beam 2033 to scan search area 2081 in FIG. 20.

In this illustrative example, controller 2114 can detect electromagnetic signals 2103 from electromagnetic signal source 2104 in response to detecting selected electromagnetic signals that are greater than a noise level in field of view 2121. In response to detecting electromagnetic signals 303, controller 2114 can establish communications with electromagnetic signal source 2104 or perform other actions. As another example, controller 2114 can identify a location of electromagnetic signal source 2104 in response to detecting electromagnetic signals 2103 in a particular location in locations 2192 in search area 2181.

The illustration of electromagnetic signal environment 2100 in FIG. 21 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, electromagnetic signal receiver system 2101 can be connected to platform 2105. In this example, platform 2105 can be a mobile platform, a stationary platform, a land-based structure, an aquatic-based structure, a space-based structure, an aircraft, a vehicle controlled by an artificial intelligence system, a vehicle controlled by a neural network, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and other suitable platforms.

In another illustrative example, controller 2114 can be located in a separate platform or location from electromagnetic signal receiver system 2101. Additionally, electromagnetic signal receiver system 2101 can be used with an electromagnetic signal transmission system such as electromagnetic beam transmission system 2002 in FIG. 20. In this example, a single controller can be present that controls both systems and that controller can be in a separate location from the systems.

In yet another illustrative example, controller 2114 can be controlled by one or more electromagnetic signal receiver systems in addition to or in place of electromagnetic signal receiver system 2101.

Further with this example, search area 2181 is a shape of hexagon 2191. In other examples, the scan area can have a shape selected from a group comprising a hexagon, a circle, an octagon, an ellipse, or some other suitable shape in addition to or in place of hexagon 2191.

Figure 22:
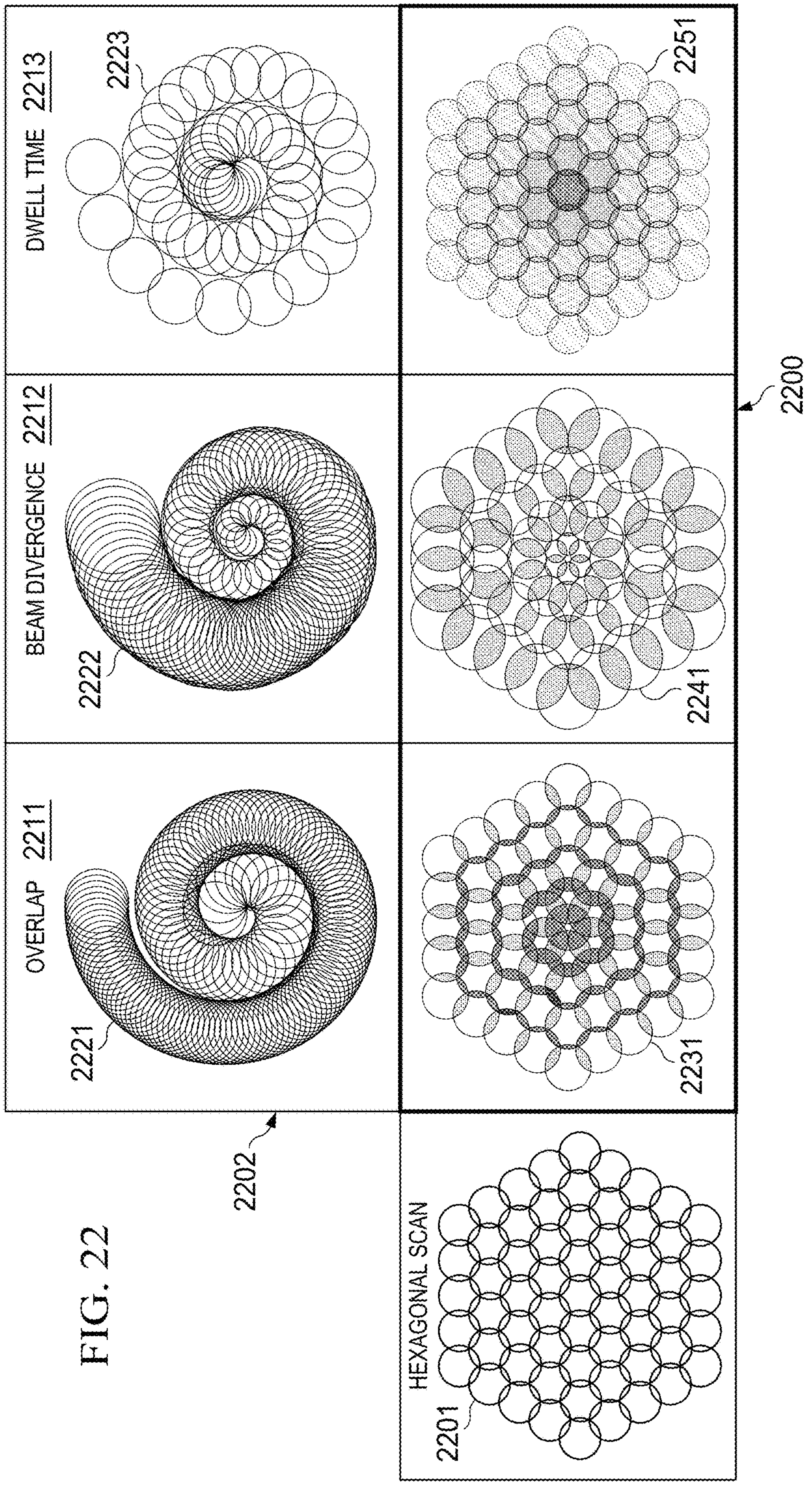
FIG. 22 is an illustration of hexagonal scans performed using scan parameters that are adjusted during the scanning of a search area in accordance with an illustrative embodiment.

With reference next to FIG. 22, an illustration of hexagonal scans performed using scan parameters that are adjusted during the scanning of a search area is depicted in accordance with an illustrative embodiment. In this illustrative example, hexagonal scans 2200 are hexagonal scans in which a number of scan parameters are adjusted for hexagonal scan 2201 while performing a scan. In other words, one or more scan parameters can change during the performance of the scan of the search area.

As depicted, spiral scans 2202 include spiral scan 2221, spiral scan 2222, and spiral scan 2223. These spiral scans provide a visual illustration of adjustments to scan parameters that occur during the performance of these spiral scans. In this example, spiral scans 2202 have been selected because the scans provide a clear visualization of changes to scan parameters.

In this example, these spiral scans include illustrative adjustments to overlap 2211, beam divergence 2212, and dwell time 2213. As depicted, overlap 2211 decreases as spiral scan 2221 progresses. Further in this example, beam divergence 2212 increases as spiral scan 2222 progresses. Further in this example, dwell time 2213 decreases as spiral scan 2223 progresses.

In this example, hexagonal scan 2231 is hexagonal scan 2201 with adjustments to overlap 2211. In this example, the overlap decreases as hexagonal scan 2231 progresses. In this example, the increase in overlap occurs at each layer in the concentric layers forming hexagonal scan 2231.

In this example, hexagonal scan 2241 is hexagonal scan 2201 with adjustments to beam divergence 2212. In this example, beam divergence 2212 increases as hexagonal scan 2241 progresses. In this example, the increase in beam divergence 2212 occurs at each layer in the concentric layers forming hexagonal scan 2241.

Further, hexagonal scan 2251 is hexagonal scan 2201 with adjustments to dwell time 2213. In this example, dwell time 2213 increases as hexagonal scan 2251 progresses. In this example, the increase in dwell time 2213 occurs at each layer in the concentric layers forming hexagonal scan 2251.

In this illustrative example, the adjustments to the number of scan parameters are performed to reduce the amount of time needed to perform a scan as compared to maintaining the same value for scan parameters of the entire scan. As a result, scans can be performed with a greater likelihood of hitting an object such as a satellite while performing scans within a selected amount of time. This selected amount time may be set through various policies such as service-level agreements, scan time requirements or other rules or guidelines.

Figure 23:
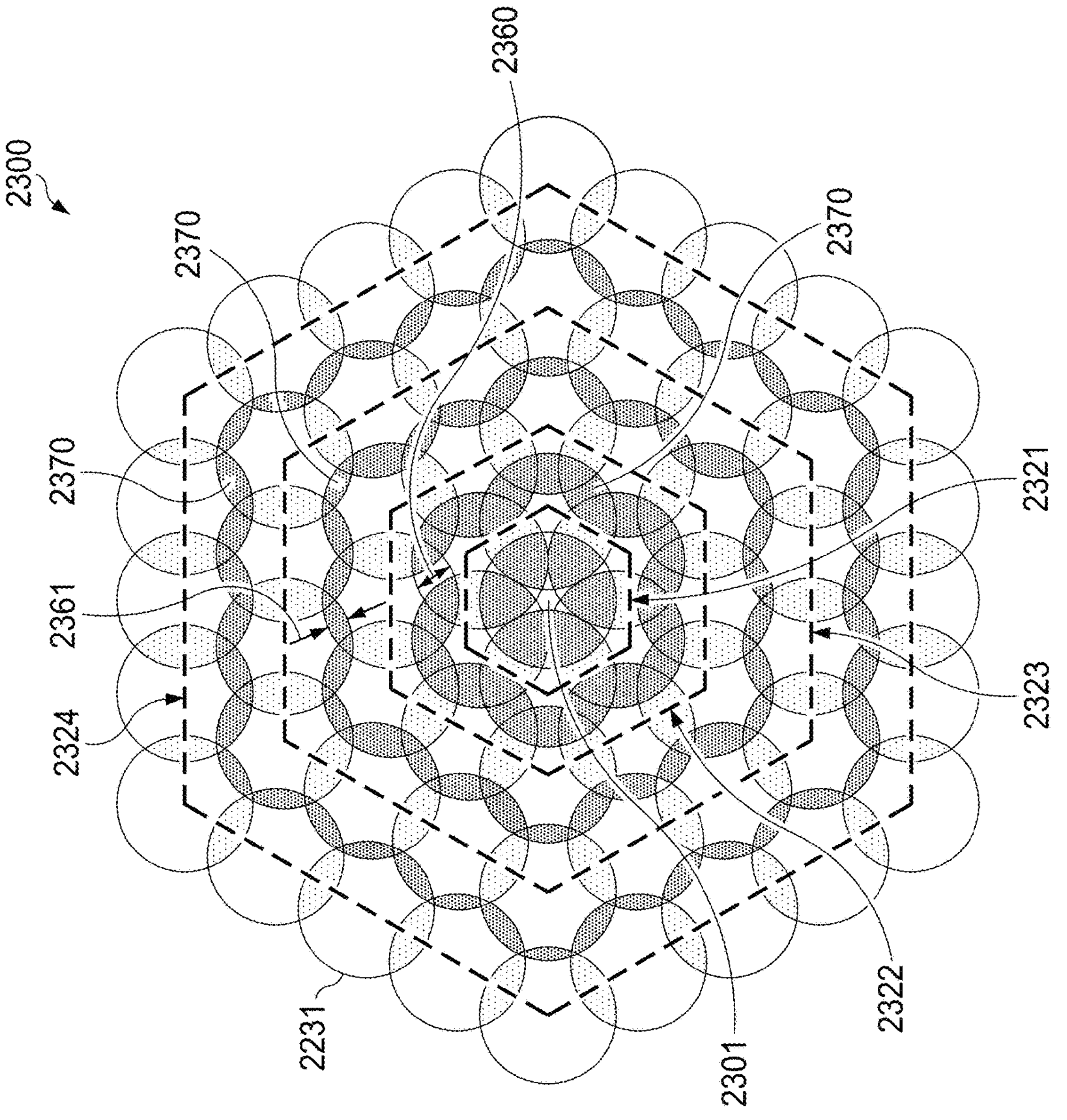
FIG. 23 is an illustration of a hexagon scan with decreasing overlap in accordance with an illustrative embodiment.

Turning to FIG. 23, an illustration of a hexagon scan with decreasing overlap is depicted in accordance with an illustrative embodiment. In this example, hexagonal scan 2231 is comprised of beam spots. In this illustrative example, each circle represents the location of the beam spot for a laser beam that is moved to perform hexagonal scan 2231.

For example, hexagonal scan 2231 starts at central location 2301 and moves from location to location in layers that form concentric layers 2300.

As depicted, the beam spots are organized as concentric layers 2300 around central location 2301. In this example, concentric layers 2300 comprises five concentric layers, which has central location 2301, layer 2321, layer 2322, layer 2323, and layer 2324. Each layer in concentric layers 2300 is thicker than the previous layer in concentric layers 2300. For example, layer 2322 is thicker than layer 2321. In this example, central location 2301 is the innermost layer and layer 2324 is the outermost layer in concentric layers 2300.

As depicted, a dashed line in a layer in a hexagonal shape extends through the center of beam spots. In this example, each of concentric layers 2300 has a hexagonal shaped dashed line. The dashed lines represents a path of the laser beam through each of the layers. Each layer in these concentric layers can be also referred to as a zone or sector around central location 2301.

In this example, overlap 2370 between locations in adjacent layers decreases during movement of the laser beam in performing hexagonal scan 2231. In this depicted example, the overlap 2370 decreases at each layer in concentric layers 2300. With this example, as the layers in concentric layers 2300 become thicker, overlap 2370 decreases.

In this example, overlap 2370 for a selected layer is the overlap between the selected layer and another layer in hexagonal scan 2231. The layer can be a prior layer or a subsequent layer.

For example, overlap 2370 for layer 2322 has width 2360, which is the overlap between locations in layer 2322 and locations in layer 2321. In other words, the overlap 2370 in a current layer is the overlap between locations that form the current layer and locations in the prior layer that was previously scanned.

In another example, overlap 2370 can be with a current layer and a subsequent layer that will be scanned. For example, overlap 2370 for layer 2322 can be the overlap between locations in layer 2322 and locations in layer 2323. Overlap 2370 can reduce issues caused to vibrations at the source of the laser beam. For example, vibrations in a laser beam system can cause the laser beam to have jitter such that the laser beam does not hit the intended location at which the laser beam is directed or pointed. Overlap 2370 can increase the likelihood that the laser beam hits the object even with jitter in the laser beam.

For example, an object such as a satellite is at a first location. The laser beam directed to the first location may result in a miss because of the jitter in the laser beam. However, the overlap of the first location from a second location increases the probability that the satellite will be hit when the laser beam is directed at the second location For example, the laser beam may miss the satellite while moving layer 2322. The laser beam may hit the satellite while moving along layer 2323 because of overlap 2370 between layer 2322 and layer 2323.

In this example, overlap 2370 for layer 2323 is the overlap between locations in layer 2323 and locations in layer 2322. In this example, the overlap has width 2361.

As depicted, width 2360 of the overlap for layer 2322 is greater than width 2361 for layer 2323. In this example, the overlap decreases as the scan progresses outwards through concentric layers 2300 in hexagonal scan 2231.

In this example, overlap can be referred to as a path overlap and can be used to increase the probability of detecting an object such as a satellite while minimizing the time to scan an area such as a hexagonal shape or other areas with other shapes. In these examples, increasing overlap between the layers or sections in a scan increases the probability that an object will be detected in those layers or sections. In these examples, the probability of detecting the object is dependent in part on overlap of a layer with an adjacent layer.

Figure 24:
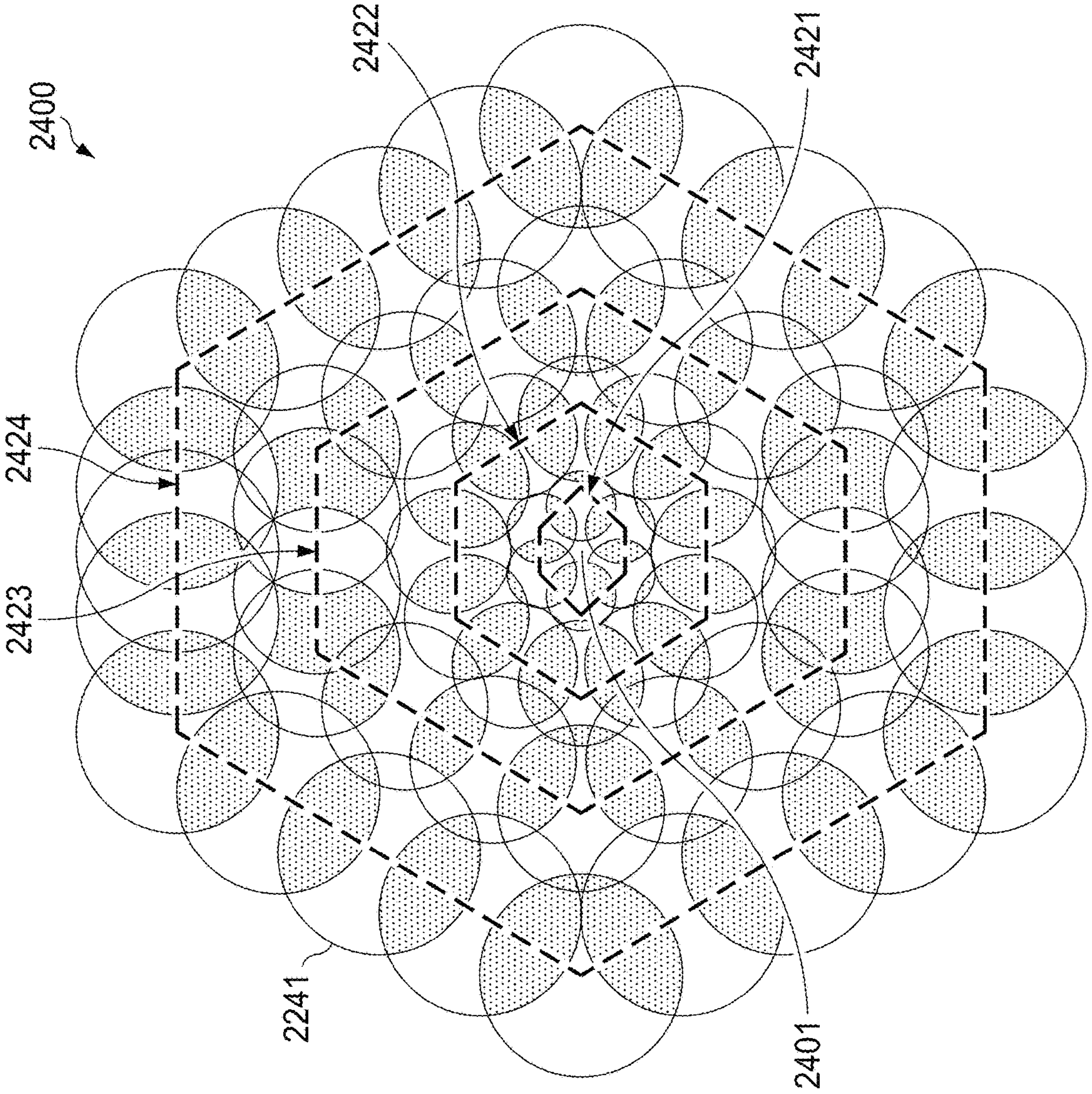
FIG. 24 is an illustration of a hexagon scan with increasing beam divergence in accordance with an illustrative embodiment.

With reference to FIG. 24, an illustration of a hexagon scan with increasing beam divergence is depicted in accordance with an illustrative embodiment. In this example, hexagonal scan 2241 has adjustments to beam divergence that change during performance of hexagonal scan 2241. In this example, hexagonal scan 2231 is comprised of beam spots. In this illustrative example, each circle represents the location of the beam spot for a laser beam that is moved to perform hexagonal scan 2031.

For example, hexagonal scan 2241 starts at central location 2401 and moves from location to location in layers that form concentric layers 2400.

As depicted, these beam spots are organized as concentric layers 2300 around central location 2301. In this example, concentric layers 2400 comprises five concentric layers. Central location 2301 is the first layer. The other four layers are layer 2421, layer 2422, layer 2423, and layer 2424. Each layer in concentric layers 2300 is thicker than the previous layer in concentric layers 2300. For example, layer 2322 is thicker than layer 2321. In this example, central location 2401 is the innermost layer and layer 2424 is the outermost layer in concentric layers 2400.

In this example, beam divergence increases from layer to layer in concentric layers 2400. As a result, the size of beam spot in a plane increases from layer to layer in concentric layers 2400 during the performance of hexagonal scan 2241.

For example, a low irradiance laser beam is harder to detect than a high irradiance laser beam. Also increasing the beam divergence (i.e., larger spot size) of a laser beam reduces the irradiance of the laser beam. As a result, hitting an object such as a satellite becomes more difficult as the beam spot size of the laser beam increases from changing the beam divergence. Increasing the spot size through increased beam divergence enables covering more of the scan area as compared to a smaller spot size. As a result, scan time can decrease as the beam divergence increases for a scan area.

A limited amount of time can be present for completing a scan of an area. With this limitation in mind, it is desirable to maximize the probability that the laser beam will hit the target and the target will detect the laser beam. In these examples, the object is expected to be near the center of the area being scanned. As a result, a higher laser beam irradiance is used when scanning the center of the area as compared to outer portions of the area. As a result, the beam spot should be small (i.e., low beam divergence). A small beam divergence takes more time to scan as compared to a larger beam divergence.

This changing to the beam divergence can be performed to decrease the time needed to scan the area. In these examples, the probability that the object is located near the edge of the area being scanned is lower as compared to the center of the area being scanned. As a result, beam divergence can be increased to increase beam spot size at the edge of the area to reduce the scan time for scanning area at portions of the area farther away from the center. As a result, increasing the beam divergence can reduce scan time. This saved scan time can be used to scan near the center. In other words, resources are shifted away from the portions of the area being scanned that are less likely to contain the object to scan the portions where the object is more likely to be present. The use of the increased beam divergence results in the beam being less likely to hit the object and the object being less likely to detect the laser beam when the object is located on the edge of the area being scanned. This lower probability of hitting an object is made up by the increased probability of hitting the object at the center of the area being scanned.

In another example, if a required probability of hitting and detection by the object is specified, the time for scanning can be traded for the probability to minimize scan time.

Figure 25:
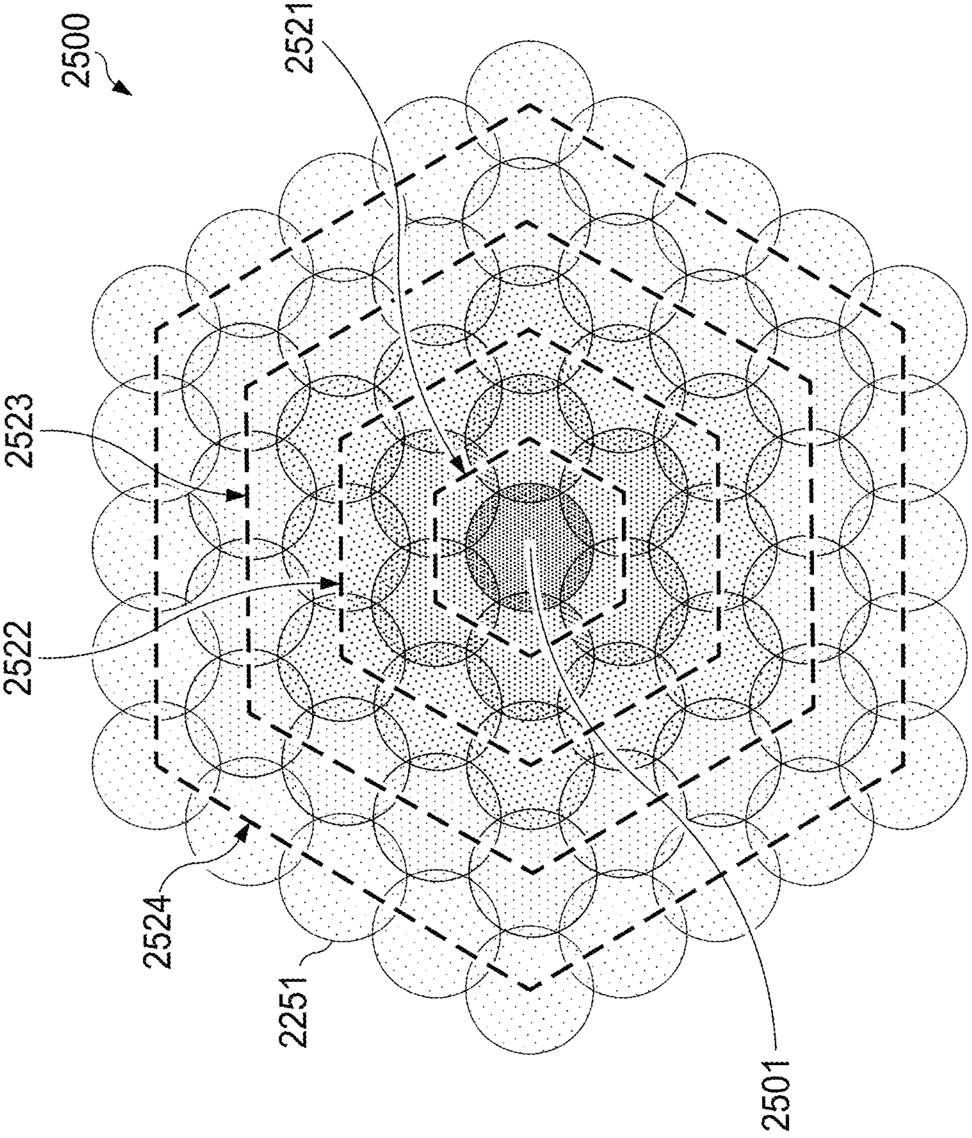
FIG. 25 is an illustration of a hexagon scan with decreasing dwell time in accordance with an illustrative embodiment.

Next in FIG. 25, an illustration of a hexagon scan with decreasing dwell time is depicted in accordance with an illustrative embodiment. In this example, hexagonal scan 2251 has adjustments to dwell time that change during performance of hexagonal scan 2251. In this example, hexagonal scan 2231 is comprised of beam spots. In this illustrative example, each circle represents the location of the beam spot for a laser beam that is moved from location to location to perform hexagonal scan 2251.

For example, hexagonal scan 2241 starts at central location 2401 and moves from location to location in layers that form concentric layers 2500.

As depicted, these beam spots are organized as concentric layers 2500 around central location 2501. In this example, concentric layers 2500 comprises five concentric layers. Central location 2501 is the first layer. The other four layers are layer 2521, layer 2522, layer 2523, and layer 2524. In this example, each layer in concentric layers 2500 has a dwell time that is less than the dwell time in a previous layer in concentric layers 2500.

In this illustrative example, the dwell time increases as hexagonal scan 2251 progresses. More specifically, the dwell time for the laser beam decreases at each layer in concentric layers 2500. For example, the dwell time used for layer 2521 is greater than the dwell time for layer 2522.

In these illustrative examples, increased dwell time increases the probability that an object such as a satellite can be detected in the search of an area such as a search area. For example, the amount of time to aim a beam at an object is dwell time. As the dwell time increases, the probability that the object will be hit by the laser beam and that the laser beam will be detected by the target increases. Increasing dwell time results in increasing the scan time.

In the illustrative example a set amount of time can be present to complete a scan of an area. Further, it is desirable to maximize the probability that an object such as a satellite will be hit by the laser beam and that the satellite will detect the laser beam. With this example, the satellite is expected to be near the center of the area being scanned. As a result, a laser dwell time is used when scanning near the center. However, with limited scan time, the dwell time can be reduced in other portions of the area being scanned to avoid increasing the scan time from increasing the dwell time. In this depicted example, the satellite is not expected to be near the edge of the area. As a result, the dwell time can be decreased at the edge. This reduction in scan time for this portion can offset the increase in scan time near the center of the area. In other words, resources (dwell time) are shifted away from portions of the scan area that are less likely to contain the satellite to portions of the area where the satellite is more likely to be present. The reduction of the dwell time results in reducing the likelihood that the laser beam will hit and be detected by a satellite located on the edge of the area. This reduction in probability is offset by increasing the probability of the laser beam hitting and being detected by the satellite close to the center of the area being searched, where the satellite is expected to be located.

In this illustrative example, greater dwell times can be used in areas in which the object is more likely to be found as compared to areas in which the object is less likely to be found. In this manner, a hexagonal scan can be performed without increasing the amount of scan time.

The illustration of changing scan parameters in FIGS. 22-25 for a hexagonal scan is provided as one example and not meant to limit the manner in which other illustrative examples can be implemented. For example, although the scan parameters change at each layer, the scan parameters can change while scanning is performed within a layer. For example, scan parameters can change within a layer in the concentric layers. For example, a portion or segment of a layer can have one overlap while another portion or segment of the same layer can have a different overlap.

Further, one or more scan parameters can be changed during a hexagonal scan in addition to the scan parameters illustrated in these hexagonal scans. In other illustrative examples, other types of electromagnetic beams can be used in addition to the laser beam. For example, the electromagnetic beam used in the scans can be selected from a group comprising a radio frequency beam, a microwave beam, and other suitable types of electromagnetic signals that can be shaped into a beam. Further, these type of scans can also be used in receiving electromagnetic signals from an electromagnetic signal source.

Figure 26:
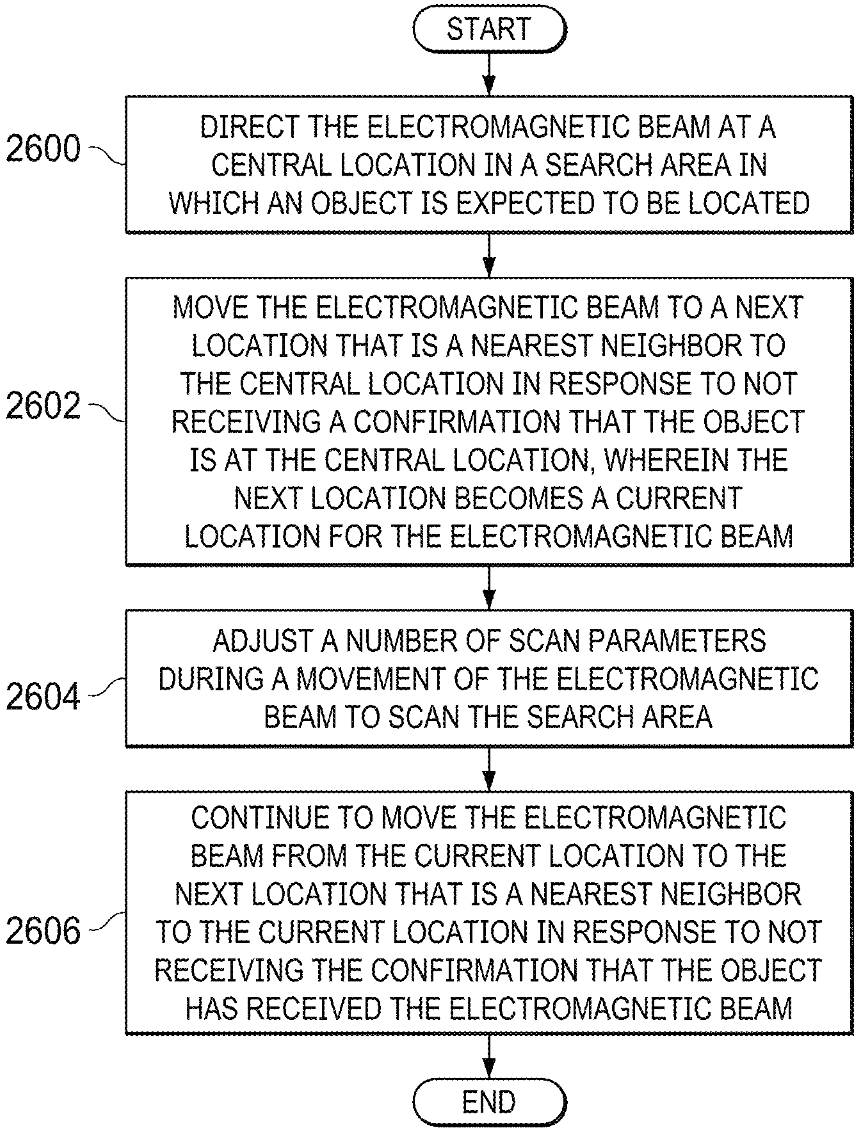
FIG. 26 is an illustration of a flowchart of a process for pointing an electromagnetic beam in accordance with an illustrative embodiment.

Turning to FIG. 26, an illustration of a flowchart of a process for pointing an electromagnetic beam is depicted in accordance with an illustrative embodiment. The process in FIG. 26 can be implemented in hardware, software, or both. When implemented in software, the process can take the form of program instructions that are run by one of more processor units located in one or more hardware devices in one or more computer systems. For example, the process can be implemented in controller 2014 in computer system 2012 in FIG. 20.

The process begins by directing the electromagnetic beam at a central location in a search area in which an object is expected to be located (operation 2600). The process moves the electromagnetic beam to a next location that is a nearest neighbor to the central location in response to not receiving a confirmation that the object is at the central location, wherein the next location becomes a current location for the electromagnetic beam (operation 2602).

The process adjusts a number of scan parameters during a movement of the electromagnetic beam to scan the search area (operation 2604). The process continues to move the electromagnetic beam from the current location to the next location that is a nearest neighbor to the current location in response to not receiving the confirmation that the object has received the electromagnetic beam (operation 2606). The process terminates thereafter.

Figure 27:
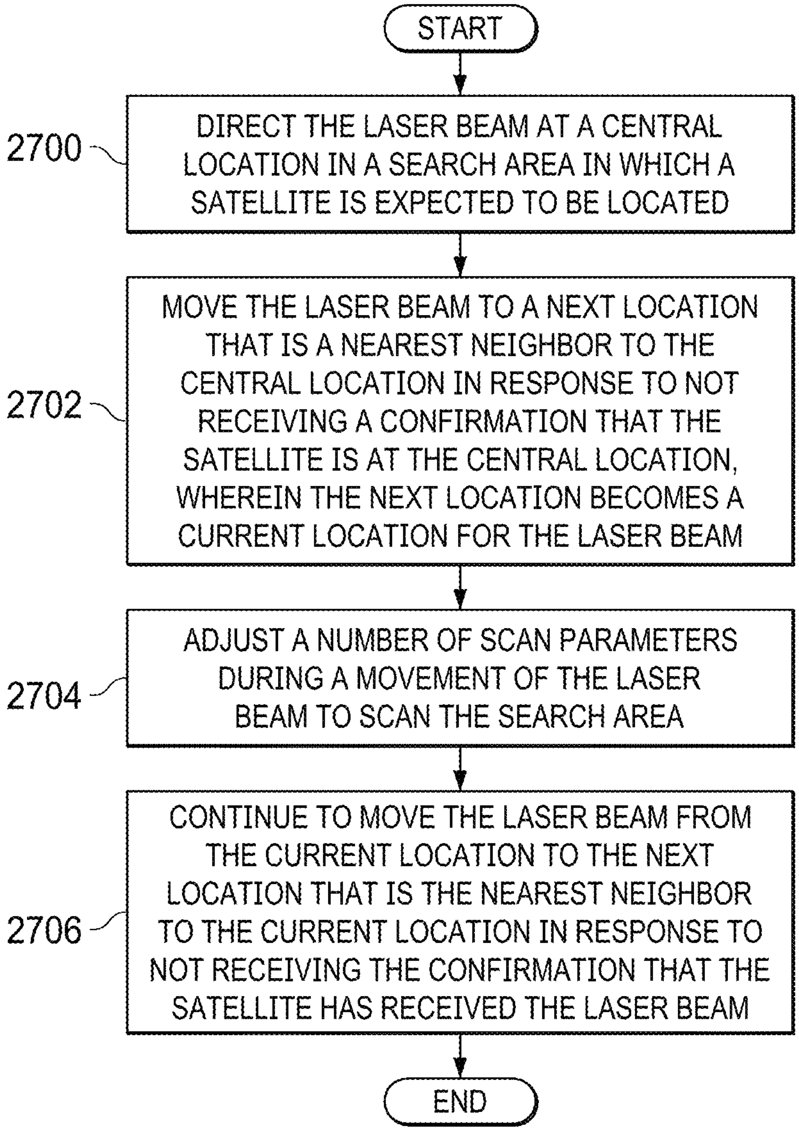
FIG. 27 is an illustration of a flowchart of a process for pointing an electromagnetic beam in accordance with an illustrative embodiment.

Turning to FIG. 27, an illustration of a flowchart of a process for pointing an electromagnetic beam is depicted in accordance with an illustrative embodiment. The process in FIG. 27 can be implemented in hardware, software, or both. When implemented in software, the process can take the form of program instructions that are run by one of more processor units located in one or more hardware devices in one or more computer systems. For example, the process can be implemented in controller 2014 in computer system 2012 in FIG. 20.

The process directs the laser beam at a central location in a search area in which a satellite is expected to be located (operation 2700). The process moves the laser beam to a next location that is a nearest neighbor to the central location in response to not receiving a confirmation that the satellite is at the central location, wherein the next location becomes a current location for the laser beam (operation 2702).

The process adjusts a number of scan parameters during a movement of the laser beam to scan the search area (operation 2704). In operation 2704, the number of scan parameters can be changed during every movement of the laser beam or during one or more movements of the laser beam to the scan search area 2081. For example, the number of scan parameters can be changed from location to location. The adjustment to the number of scan parameters is made to efficiently search for a satellite. In some cases, the scan parameters can be changed between some locations and not all of the locations.

The process continues to move the laser beam from the current location to the next location that is the nearest neighbor to the current location in response to not receiving the confirmation that the satellite has received the laser beam (operation 2706). The process terminates thereafter.

Figure 28:
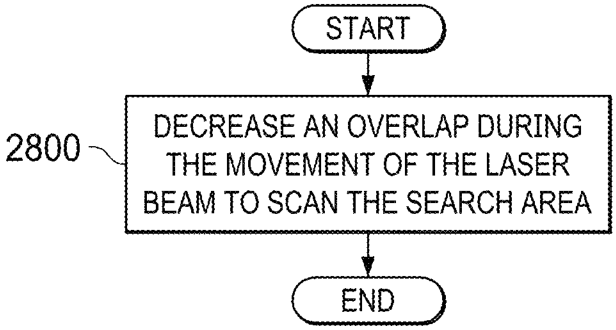
FIG. 28 is an illustration of a flowchart of a process for adjusting a number of scan parameters in accordance with an illustrative embodiment.

Next in FIG. 28, an illustration of a flowchart of a process for adjusting a number of scan parameters is depicted in accordance with an illustrative embodiment. The process in this flowchart is an example of an implementation for operation 2704 in FIG. 27.

The process decreases an overlap during the movement of the laser beam to scan the search area (operation 2800). The process terminates thereafter.

Figure 29:
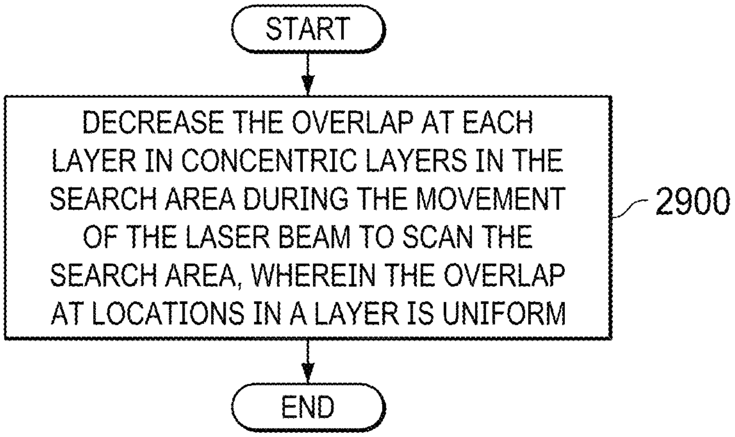
FIG. 29 is an illustration of a flowchart of a process for decreasing overlap in accordance with an illustrative embodiment.

With reference now to FIG. 29, an illustration of a flowchart of a process for decreasing overlap is depicted in accordance with an illustrative embodiment. The process in this flowchart is an example of an implementation for operation 2800 in FIG. 28.

The process decreases the overlap at each layer in concentric layers in the search area during the movement of the laser beam to scan the search area, wherein the overlap at locations in a layer is uniform (operation 2900). The process terminates thereafter.

Figure 30:
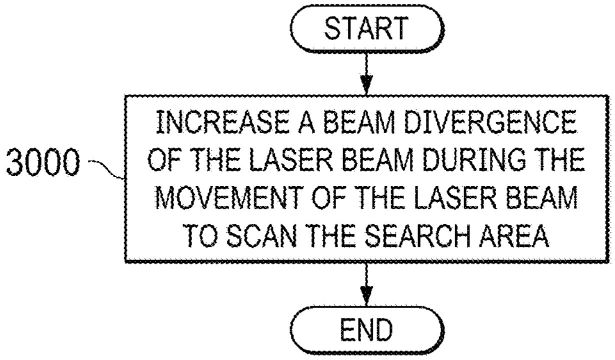
FIG. 30 is an illustration of a flowchart of a process for adjusting a number of scan parameters in accordance with an illustrative embodiment.

Next in FIG. 30, an illustration of a flowchart of a process for adjusting a number of scan parameters is depicted in accordance with an illustrative embodiment. The process in this flowchart is an example of an implementation for operation 2704 in FIG. 27.

The process increases a beam divergence of the laser beam during the movement of the laser beam to scan the search area (operation 3000). The process terminates thereafter.

Figure 31:
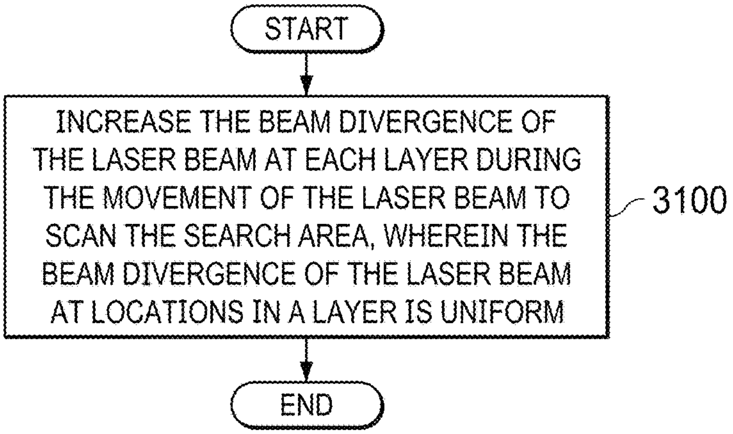
FIG. 31 is an illustration of a flowchart of a process for increasing beam divergence in accordance with an illustrative embodiment.

With reference now to FIG. 31, an illustration of a flowchart of a process for increasing beam divergence is depicted in accordance with an illustrative embodiment. Process in this flowchart is an example of an implementation for operation 3000 in FIG. 30.

The process increases the beam divergence of the laser beam at each layer during the movement of the laser beam to scan the search area, wherein the beam divergence of the laser beam at locations in a layer is uniform (operation 3100). The process terminates thereafter.

Figure 32:
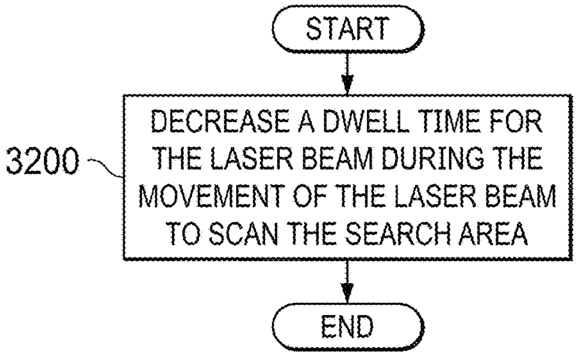
FIG. 32 is an illustration of a flowchart of a process for adjusting a number of scan parameters in accordance with an illustrative embodiment.

Turning next to in FIG. 32, an illustration of a flowchart of a process for adjusting a number of scan parameters is depicted in accordance with an illustrative embodiment. The process in this flowchart is an example of an implementation for operation 2704 in FIG. 27.

The process decreases a dwell time for the laser beam during the movement of the laser beam to scan the search area (operation 3200). The process terminates thereafter.

Figure 33:
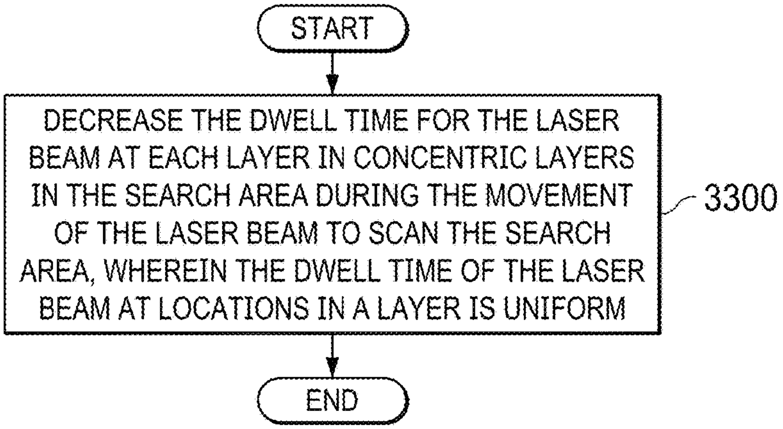
FIG. 33 is an illustration of a flowchart of a process for decreasing dwell time in accordance with an illustrative embodiment.

Next in FIG. 33, an illustration of a flowchart of a process for decreasing dwell time is depicted in accordance with an illustrative embodiment. The process in this flowchart is an example of an implementation for operation 3200 in FIG. 32.

The process decreases the dwell time for the laser beam at each layer in concentric layers in the search area during the movement of the laser beam to scan the search area, wherein the dwell time of the laser beam at locations in a layer is uniform (operation 3300). The process terminates thereafter.

Figure 34:
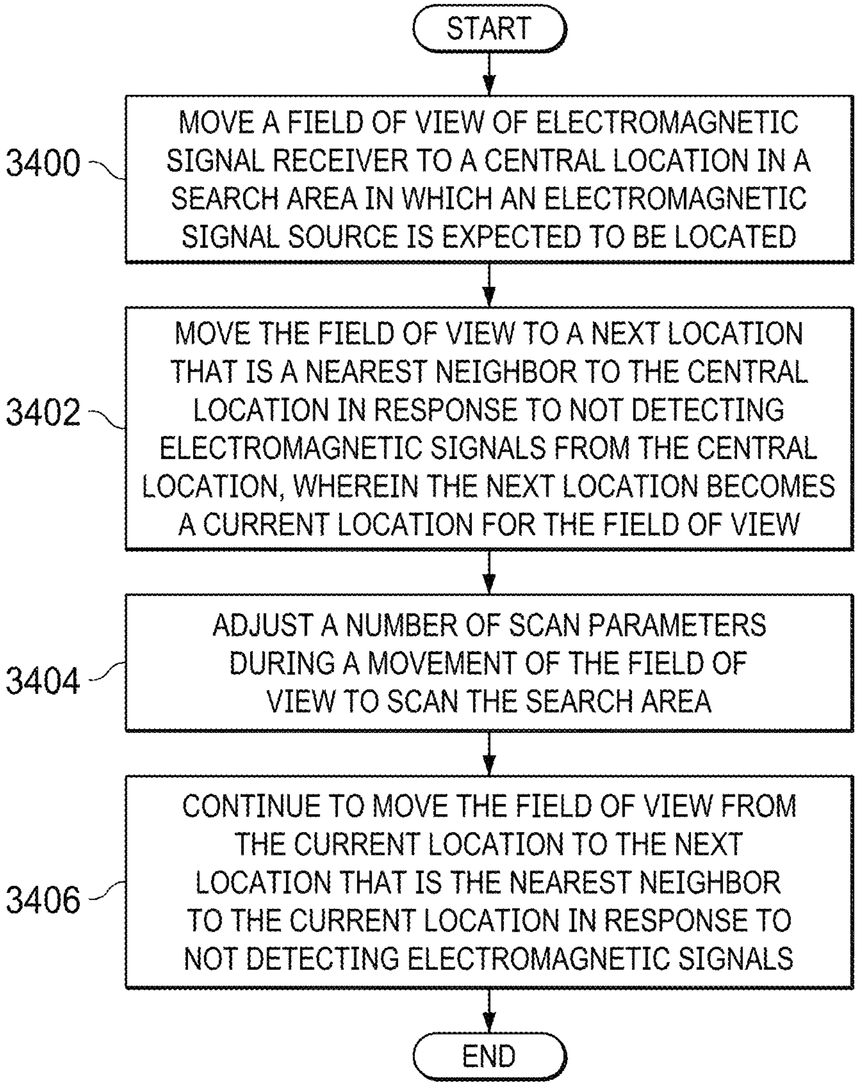
FIG. 34 is an illustration of a flowchart of a process for receiving electromagnetic signals in accordance with an illustrative embodiment.

With reference next to FIG. 34, an illustration of a flowchart of a process for receiving electromagnetic signals is depicted in accordance with an illustrative embodiment. The process in FIG. 34 can be implemented in hardware, software, or both. When implemented in software, the process can take the form of program instructions that are run by one or more processor units located in one or more hardware devices in one or more computer systems. For example, the process can be implemented in controller 2114 in computer system 2112 in FIG. 21.

The process moves a field of view of an electromagnetic signal receiver to a central location in a search area in which an electromagnetic signal source is expected to be located (operation 3400). The process moves the field of view to a next location that is a nearest neighbor to the central location in response to not detecting electromagnetic signals from the central location, wherein the next location becomes a current location for the field of view (operation 3402).

The process adjusts a number of scan parameters during a movement of the field of view to scan the search area (operation 3404). The process continues to move the field of view from the current location to the next location that is the nearest neighbor to the current location in response to not detecting electromagnetic signals (operation 3406). The process terminates thereafter.

The flowcharts and block diagrams in the different depicted examples in FIGS. 26-34 illustrate the architecture, functionality, and operation of some possible implementations of apparatuses and methods in an illustrative example. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 35:
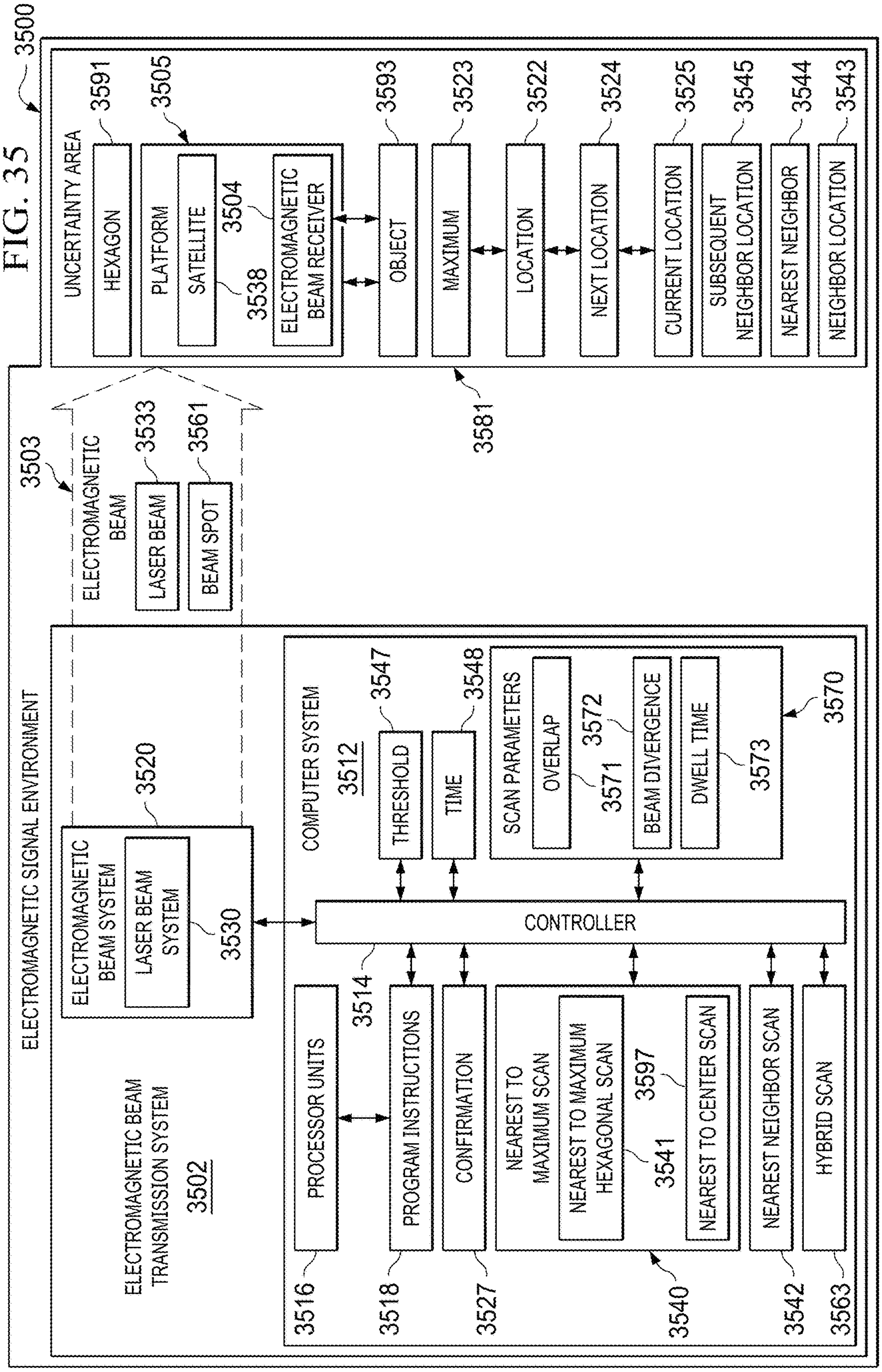
FIG. 35 is an illustration of a block diagram of an electromagnetic signal environment in accordance with an illustrative embodiment.

With reference now to FIG. 35, an illustration of a block diagram of an electromagnetic signal environment is depicted in accordance with an illustrative embodiment. In this illustrative example, electromagnetic signal environment 3500 includes components that can be implemented in hardware such as the hardware in satellite 101 and satellite 102 in FIG. 1.

In this example, electromagnetic beam transmission system 3502 is an example of an implementation of electromagnetic beam transmission system 202 in FIG. 2. The components can be implemented using components in electromagnetic beam transmission system 202 in electromagnetic signal environment 200 in FIG. 2.

In this illustrative example, electromagnetic beam transmission system 3502 can point the transmission of electromagnetic beam 3503 at object 3593. In this example, object 3593 can be electromagnetic beam receiver 3504. Object 3593 can also be platform 3505 with which electromagnetic beam receiver 3504 is connected in this example.

In this illustrative example, electromagnetic beam transmission system 3502 comprises electromagnetic beam system 3520 and controller 3514. In this example, controller 3514 is located in computer system 3512. As depicted, computer system 3512 is also part of electromagnetic beam transmission system 3502.

Electromagnetic beam system 3520 is a physical hardware system. This hardware system is configured to transmit electromagnetic beam 3503.

Controller 3514 can be implemented in a similar manner as controller 214 in FIG. 2 in which program instructions 3518 can be used to implement controller 3514 that are executed by a number of processor units 3516 in computer system 3512. In this example, controller 2014 includes processes similar to those in controller 214 in FIG. 2 but also includes additional processes for controlling the manner in which a scan is performed. Program instructions 3518, the number of processor units 3516, and computer system 3512 can be implemented in a similar manner to program instructions 218, processor units 216, and computer system 212 in FIG. 2.

In this illustrative example, controller 3514 controls electromagnetic beam transmission system 3502 to direct electromagnetic beam 3503 at location 3522 nearest to maximum 3523 of uncertainty area 3581 in which object 293 is expected to be located. In other words, uncertainty area 3581 is an area in which object 3593 is believed to be present. However, object 3593 may not actually be in uncertainty area 3581. In some cases, uncertainty area 3581 can be selected as an area for searching with the hope of locating object 3593.

Further in this example, maximum 3523 represents a probability that object 3593 is at a location (beam spot) covered by electromagnetic beam system 3520. Maximum 3523 does not need to be 100 percent but can be some lower percentage.

As depicted, electromagnetic beam 3503 has beam spot 3561. In this example, beam spot 3561 is a diameter of electromagnetic beam 203 at a location in uncertainty area 3581. In this example, beam spots can correspond to locations in uncertainty area 3581. For example, location 3522 in uncertainty area 3581 can have a size and shape that corresponds to beam spot 3561 when the electromagnetic beam 3503 is directed at location 3522.

Location 3522 nearest to maximum 3523 of uncertainty area 3581 can be determined using a probability density function (PDF) that shows what location is likely to be closest to maximum 3523.

In this example, controller 3514 controls electromagnetic beam system 3520 to move electromagnetic beam 3503 from location 3522 to next location 3524 nearest to maximum 3523 of uncertainty area 3581 in response to not receiving confirmation 3527 that object 3593 such as electromagnetic beam receiver 3504 is at location 3522. In this example, next location 3524 becomes current location 3525 for electromagnetic beam 3503.

Further in this example, controller 3514 adjusts a number of scan parameters 3570 during a movement of electromagnetic beam 3503 to scan uncertainty area 3581. In this illustrative example, the number of scan parameters 3570 can be adjusted by controller 3514 controlling electromagnetic beam system 3520. In this illustrative example, the number of scan parameters 3570 can be adjusted to increase the likelihood that electromagnetic beam 3503 hits object 3593 in uncertainty area 3581.

Controller 3514 controls electromagnetic beam system 3520 to continue to move electromagnetic beam 3503 from current location 3525 to next location 3524 nearest to maximum 3523 of uncertainty area 3581 from current location 3525 in response to not receiving a confirmation 3527 that electromagnetic beam 3503 has encountered object 3593, such as electromagnetic beam receiver 3504 receiving electromagnetic beam 3503. This type of movement of electromagnetic beam 3503 is nearest to maximum scan 3540. When maximum 3523 of uncertainty area 3581 is the center of uncertainty area 3581, nearest to maximum scan 3540 is nearest to center scan 3597. This is an example of an implementation for nearest to maximum scan 3540 in which maximum 3523 of uncertainty area 3581 is the center of uncertainty area 3581.

In one illustrative example, electromagnetic beam 3503 can take the form of laser beam 3533. Further, laser beam 3533 can be selected from a group comprising a continuous laser beam and a pulsed laser beam. Electromagnetic beam system 3520 can be laser beam system 3530 and platform 3505 can take the form of satellite 3538. In this example, electromagnetic beam transmission system 3502 is laser beam transmission system 3511.

In this example, controller 3514 controls laser beam system 3530 to direct laser beam 3533 at location 3522 nearest to maximum 3523 of uncertainty area 3581 in which satellite 3538 is expected to be located. Controller 3514 also controls laser beam system 3530 to move laser beam 3533 from location 3522 to next location 3524 nearest to maximum 3523 of uncertainty area 3581 in response to not receiving confirmation 3527 that satellite 3538 is at location 3522. In this example, next location 3524 becomes current location 3525 for laser beam 3533.

Further, controller 3514 adjusts a number of scan parameters 3570 during a movement of laser beam 3533 to scan uncertainty area 3581. In this illustrative example, the number of scan parameters 3570 can be adjusted to increase the likelihood that laser beam 3533 hits satellite 3538 in uncertainty area 3581. The number of scan parameters 3570 can be selected from at least one of overlap 3571, beam divergence 3572, dwell time 3573, or other suitable scan parameters.

In adjusting the number of scan parameters 3570, controller 3514 decreases overlap 3571 during the movement of laser beam 3533 to scan uncertainty area 3581. With this example, maximum 3523 of uncertainty area 3581 is a center of uncertainty area 3581. Further, overlap 3571 at locations that have a same distance from the maximum of the uncertainty area is uniform. In other words, each location in the locations having the same distance from the center of uncertainty area 3581 have the same overlap. Locations having the same distance from the center of uncertainty area 3581 form a group of locations. Each group of locations having longer distance from the center of uncertainty area 3581 have a greater overlap.

Further, In adjusting the number of scan parameters 3570, controller 3514 increases beam divergence 3572 of laser beam 3533 during the movement of laser beam 3533 to scan uncertainty area 3581. In this example, maximum 3523 of uncertainty area 3581 is a center of uncertainty area 3581. Further with this example, beam divergence 3572 of laser beam 3533 at locations that have a same distance from maximum 3523 of uncertainty area 3581 is uniform.

In adjusting the number of scan parameters 3570, controller 3514 decreases dwell time 3573 for laser beam 3533 during movement of laser beam 3533 to scan uncertainty area 3581. With this example, maximum 3523 of uncertainty area 3581 is a center of uncertainty area 3581. Dwell time 3573 of laser beam 3533 at locations that have a same distance from the maximum 3523 of uncertainty area 3581 is uniform.

Controller 3514 controls laser beam system 3530 to continue to move laser beam 3533 from current location 3525 to next location 3524 nearest to maximum 3523 of uncertainty area 3581 from current location 3525 in response to not receiving confirmation 3527 that satellite 3538 has received laser beam 3533. The moving or directing of laser beam 3533 can also be referred to as pointing laser beam 3533. Further, laser beam 3533 can be selected from one of unidirectional communications and bidirectional communications.

In this example, confirmation 3527 can be received from satellite 3538. For example, satellite 3538 sends a return laser beam at the same angle as the incoming laser beam.

In this example, the movement controlled by controller 3514 is nearest to maximum scan 3540 such as nearest to maximum hexagonal scan 3541. With this example, uncertainty area 3581 can be in a shape of hexagon 3591 for nearest to maximum hexagonal scan 3541. Further, controller 3514 can control the movement of laser beam 3533 to change from nearest to maximum scan 3540 to nearest neighbor scan 3542. This type of scan in which the scanning changes from nearest to maximum scan 3540 to nearest neighbor scan 3542 is hybrid scan 263.

For example, controller 3514 moves laser beam 3533 to neighbor location 3543 of nearest neighbor 3544 in response to time 3548 for moving laser beam 3533 from current location 3525 to next location 3524 using location 3522 nearest to maximum 3523 of uncertainty area 3581 being greater than threshold 3547. In this example, next location 3524 becomes current location 3525 for future movements.

In this case, threshold 3547 can be selected as the time for moving laser beam 3533 from one location to a neighboring location. In another illustrative example, the threshold can be a lower time or some other suitable time.

Further in this example, controller 3514 continues to move laser beam 3533 from current location 3525 to subsequent neighbor location 3545 of nearest neighbor 3544 from current location 3525 in response to time 3548 for moving laser beam 3533 from current location to next location 3524 using location 3522 nearest to maximum 3523 of uncertainty area 3581 being greater than threshold 3547 and in response to not receiving confirmation 3527 that satellite 3538 has received laser beam 3533.

As a result, controller 3514 changes from using nearest to maximum scan 3540 to nearest neighbor scan 3542. This type of hybrid scan can provide a faster location of satellite 3538 as compared to just using nearest to maximum scan 3540.

In moving laser beam 3533 to neighbor location 3543 of nearest neighbor 3544 and continuing to move laser beam 3533 from current location 3525 to subsequent neighbor location 3545 of nearest neighbor 3544 from current location 3525 is part of a nearest neighbor scan 3542 selected from one of a continuous spiral scan, a step spiral scan, a segmented scan, a hexagonal scan, and a raster scan.

In response to receiving confirmation 3527, controller 3514 establishes communications with satellite 3538. The communication is selected from one of unidirectional communications and bidirectional communications.

In one illustrative example, one or more technical solutions are present that overcome a technical problem with pointing an electromagnetic beam, such as a laser, at a receiver. As a result, one or more illustrative examples enable scanning an area such as an uncertainty area in an efficient manner. The number of scan parameters can be adjusted during the scanning of the uncertainty area in a manner that increases the likelihood of hitting an object. In some examples, a hybrid scan can be used.

Computer system 3512 can be configured to perform at least one of the steps, operations, or actions described in the different illustrative examples using software, hardware, firmware, or a combination thereof. As a result, computer system 3512 operates as a special purpose computer system in which controller 3514 in computer system 3512 enables adjusting scan parameters such that locating an object can be performed more quickly as compared to current techniques. Controller 3514 transforms computer system 3512 into a special purpose computer system as compared to currently available general computer systems that do not have controller 3514.

The illustration of electromagnetic signal environment 3500 in FIG. 35 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, electromagnetic beam 3503 has been described as being laser beam 3533. Electromagnetic beam 3503 can take other forms in other illustrative examples. For example, electromagnetic beam 3503 can be selected from a group comprising laser beam 3533, a radio frequency beam, a microwave beam, and other suitable types of electromagnetic signals that can be shaped into a beam.

As another example, platform 3505 can take a number of different forms in addition to satellite 3538. For example, electromagnetic beam receiver 3504 can be located in platform 3505 selected from a group comprising a mobile platform, a stationary platform, a land-based structure, an aquatic-based structure, a space-based structure, an aircraft, a vehicle controlled by an artificial intelligence system, a vehicle controlled by a neural network, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and other suitable platforms.

As another example, uncertainty area 3581 can take other shapes in addition to hexagon 3591. For example, uncertainty area 3581 can be a shape selected from a group comprising a circle, an octagon, an ellipse, or some other suitable shape. Controller 3514 can control one or more electromagnetic beam systems in addition to or in place of electromagnetic beam system 3520. Further, the system can be used with an electromagnetic signal receiver system as described below with respect to FIG. 36.

In these examples, pointing electromagnetic signal receiver at an electromagnetic signal source can also take more time than desired and is more challenging than desired.

Figure 36:
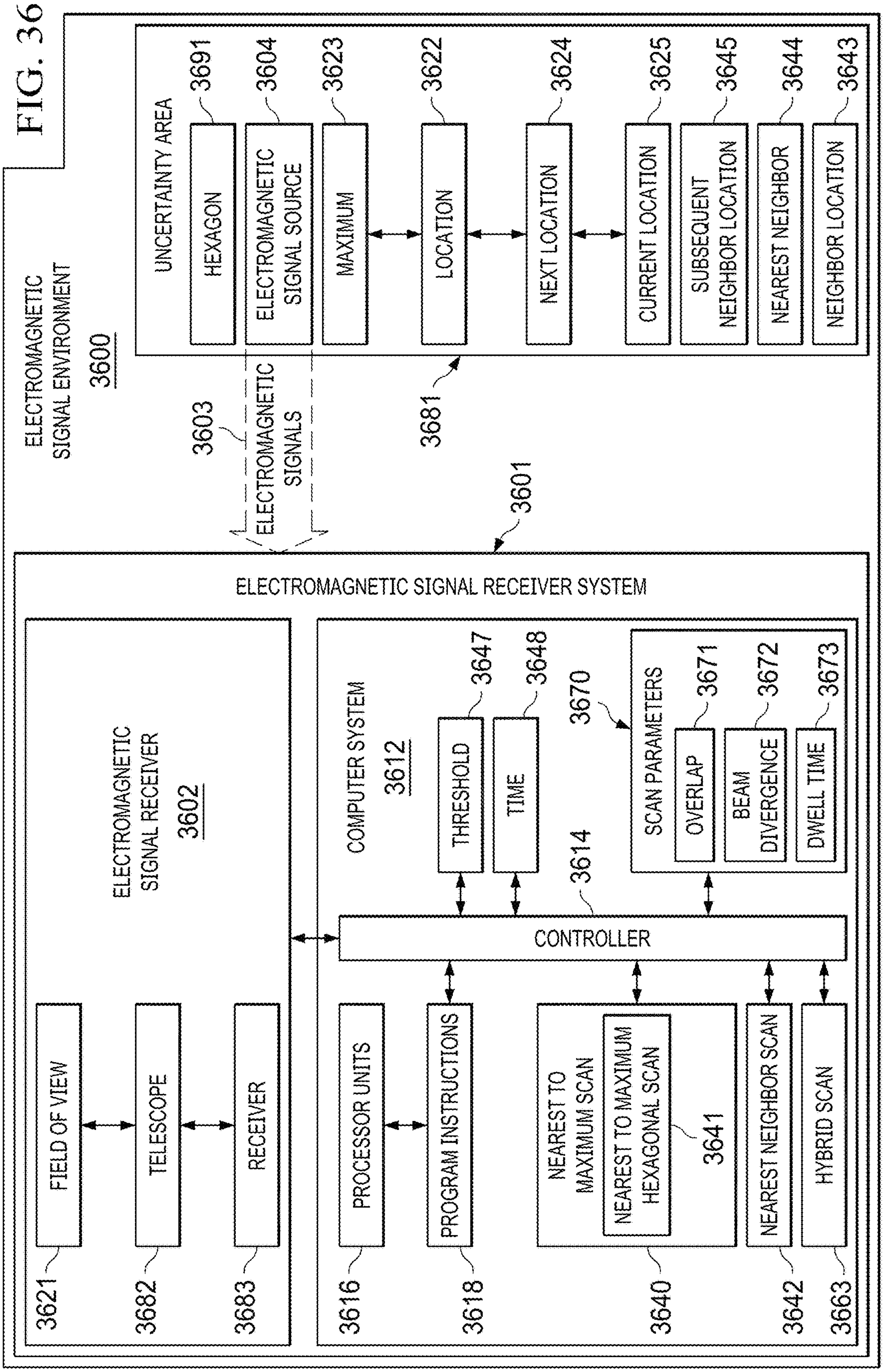
FIG. 36 is an illustration of a block diagram of an electromagnetic signal environment in accordance with an illustrative embodiment.

With reference now to FIG. 36, an illustration of a block diagram of an electromagnetic signal environment is depicted in accordance with an illustrative embodiment. In this illustrative example, electromagnetic signal environment 3600 includes components that can be implemented in hardware such as the hardware shown in satellite 120 and receiver 122 and telescope 123 in FIG. 1.

In the illustrative example, electromagnetic signal receiver system 3601 in electromagnetic signal environment 3600 can be pointed to receive electromagnetic signals 3603 from electromagnetic signal source 3604. In this example, electromagnetic signal receiver system 3601 comprises electromagnetic signal receiver 3602 and controller 3614. In this example, controller 3614 is located in computer system 3612. As depicted, computer system 3612 is part of electromagnetic signal receiver system 3601 in this example. In this example, these components can be examples of components in electromagnetic signal receiver system 301 in FIG. 3. The components can be implemented using components in electromagnetic signal receiver system 301 in FIG. 3.

In this illustrative example, electromagnetic signal source 3604 generates electromagnetic signals 3603. Electromagnetic signals 3603 can take a number of different forms. For example, electromagnetic signals 303 can be a beam, collimated beam, omnidirectional signals, directional signals, or other types of radiation patterns for forms. Electromagnetic signals 3603 can be selected from at least one of a laser beam, a radio frequency beam, a microwave beam, microwave signals, infrared signals, visible light signals, ultraviolet light signals, or other types of electromagnetic signals.

Electromagnetic signal source 3604 can take a number of different forms. For example, electromagnetic signal source 3604 can be a platform selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

Electromagnetic signal receiver 3602 is a physical hardware system that can receive electromagnetic signals 3603. Electromagnetic signal receiver 3602 has field of view 3621. In this illustrative example, hardware such as an antenna, radio receiver, photo detector, or other device that can detect electromagnetic signals 3603 that are in field of view 3621. This hardware is unable to detect or use electromagnetic signals 3603 outside the field of view 3621. The hardware can include receiver 3683. Receiver 3683 can be implemented using a receiver such as a photodetector, a photodiode system, a phase array antenna, focal plane array (FPA), cell (QC), or other suitable types of hardware.

In another illustrative example, electromagnetic signal receiver 3602 can include telescope 3682. Telescope 3682 is a hardware component collecting incoming electromagnetic signals onto a detector in receiver 3683.

In this illustrative example, field of view (FOV) 3621 is the view that electromagnetic signal receiver 3602 has to see or receive electromagnetic signals 3603.

In some illustrative examples, the size of field of view 3621 can be controlled. Field of view 3621 can have a size that enables detecting electromagnetic signals 3603. For example, the time for nearest to maximum scan 3640 to locate electromagnetic signal source 3604 is faster than current techniques such as those that use a continuous file scan, a segment scan, or raster scan. However, actually detecting electromagnetic signals 3603 may be difficult with electromagnetic signals 3603 being too weak for detection with the size of field of view 3621. For example, the aperture or coping defining the field of view for a receiver may pick up signals from other sources for noises in addition to the signals from the desired source. As a result, the receiver may struggle to identify and isolate electromagnetic signals 3603 from the surrounding noise. As a result, reducing or narrowing field of view 3621 can be performed to reduce issues with noise. In other words, size of field of view 3621 can be adjusted to increase the signal-to-noise ratio.

In another example, the scan time becomes slower as field of view 3621 is decreased. At some point, field of view 3621 may be able to easily detect electromagnetic signals 3603. However, the amount of scan time may be much slower than desired and may be slower than current techniques.

The size of field of view 3621 can be selected such that electromagnetic signals 3603 can be just barely detectable. In other words, these electromagnetic signals can be detected over noise that may be present. With this selection of the size for field of view 3621, nearest to maximum scan 3640 can be performed within a desired amount of time such as less than techniques that use a continuous scan based on a nearest neighbor.

Controller 3614 can be implemented in a similar manner as controller 314 in FIG. 3 in which program instructions 3618 can be used to implement controller 3614 that are executed by a number of processor units 3616 in computer system 3612. In this example, controller 3614 includes processes similar to those in controller 314 in FIG. 3 but also includes additional processes for controlling the manner in which a scan is performed to detect electromagnetic signals 3603. Program instructions 3618, the number of processor units 3616, and computer system 3612 can be implemented in a similar manner to program instructions 318, processor units 316, and computer system 312 in FIG. 3.

Controller 3614 is configured to control the operation of electromagnetic signal receiver 3602. In this illustrative example, controller 3614 controls electromagnetic signal receiver 3602 to move field of view 3621 of electromagnetic signal receiver 3602 to location 3622 nearest to maximum 3623 of uncertainty area 3681 in which an electromagnetic signal source 3604 is expected to be located. This moving of field of view 3621 can also be referred to as pointing field of view 3621.

Further, in this example, controller 3614 moves field of view 3621 of electromagnetic signal receiver 3602 from location 3622 to next location 3624 nearest to maximum 3623 of uncertainty area 3681 in response to not detecting electromagnetic signals 3603 from electromagnetic signal source 3604 at location 3622. In this example, next location 3624 becomes current location 3625 for field of view 3621.

Controller 3614 adjusts a number of scan parameters 3670 during a movement of field of view 3621 to scan uncertainty area 3681. The number of scan parameters 3670 changes during scanning of uncertainty area 3681. In other words, the number of scan parameters 3670 does not remain fixed during the entire scan.

The number of scan parameters 3670 can be selected from at least one of overlap 3671, beam divergence 3672, dwell time 3673, or other suitable scan parameters. In this illustrative example, the number of scan parameters 3670 can be adjusted to increase the likelihood that electromagnetic signals 3603 from electromagnetic signal source 3604 are detected.

In this illustrative example, the number of scan parameters 3670 can be changed during movement of field of view 3621 using the same type of adjustments as described with respect to controller 3514 adjusting scan parameters 3570 while controlling laser beam system 3530 to move laser beam 3533 to scan uncertainty area 3581 in FIG. 35.

Controller 3614 continues to move field of view 3621 from current location 3625 to next location 3624 nearest to maximum 3623 of uncertainty area 3681 from current location 3625 in response to not detecting electromagnetic signals 3603 from electromagnetic signal source 3604. This type of movement of the field of view 3621 is a nearest to maximum scan 3640. This scan can be nearest to maximum hexagonal scan 3641 with uncertainty area 3681. In this example, uncertainty area 3681 can be in a shape of hexagon 3691. In other examples, uncertainty area 3681 can be a shape selected from a group comprising a circle, an octagon, an ellipse, or some other suitable shape in addition to or in place of hexagon 3691.

Further, controller 3614 can change the manner in which field of view 3621 is moved. In this example, controller 3614 can begin with nearest to maximum scan 3640 and change to nearest neighbor scan 3642. This type of scan in which the scanning changes from nearest to maximum scan 3640 to nearest neighbor scan 3642 is referred to as hybrid scan 3663.

For example, controller 3614 moves field of view 3621 to neighbor location 3643 of nearest neighbor 3644 in response to time 3648 for moving field of view 3621 from current location 3625 to next location 3624 using location 3622 nearest to maximum 3623 of uncertainty area 3681 being greater than threshold 3647. In this example, next location 3624 becomes current location 3625.

Controller 3614 continues to move field of view 3621 from current location 3625 to subsequent neighbor location of nearest neighbor 3644 from current location 325 in response to time 3648 for moving field of view 3621 from current location 3625 to next location 3624 using location 3622 nearest to maximum 3623 of uncertainty area 3681 being greater than threshold 3647 and in response to not detecting electromagnetic signals 3603 from electromagnetic signal source 3604.

In this case, threshold 3647 can be selected as the time for moving field of view 3621 from one location to a neighboring location. In another illustrative example, the threshold can be a lower time or some other suitable time.

Also, moving field of view 3621 to neighbor location 3643 of nearest neighbor 3644 and continuing to move field of view 3621 from current location 3625 to subsequent neighbor location 3645 of nearest neighbor 3644 from current location 3625 is part of nearest neighbor scan 3642 in this example. This nearest neighbor scan can be selected from one of a continuous spiral scan, a step spiral scan, a segmented scan, a hexagonal scan, and a raster scan.

In this illustrative example, controller 3614 can detect electromagnetic signals 3603 from electromagnetic signal source 3604 in response to detecting selected electromagnetic signals that are greater than a noise level in field of view 3621. In response to detecting electromagnetic signals 3603, controller 3614 can establish communications with electromagnetic signal source 3604. The communications are selected from one of unidirectional communications and bidirectional communications. In the illustrative example, the communications that are unidirectional from electromagnetic signal source 3604 to electromagnetic signal receiver 3602 does not necessarily require electromagnetic signal source 3604 to know that electromagnetic signals 3603 are being received by electromagnetic signal receiver 3602.

The illustration of electromagnetic signal environment 3600 in FIG. 36 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, electromagnetic signal receiver system 3601 can be located on a platform. The platform can be a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and other suitable platforms.

In another illustrative example, controller 3614 can be located in a separate platform or location from electromagnetic signal receiver system 3601. Additionally, electromagnetic signal receiver system 3601 may be used with an electromagnetic signal transmission system such as electromagnetic beam transmission system 3502 in FIG. 35.

In yet another illustrative example, controller 3614 can control one or more electromagnetic signal receiver systems in addition to or in place of electromagnetic signal receiver system 3601.

Figure 37:
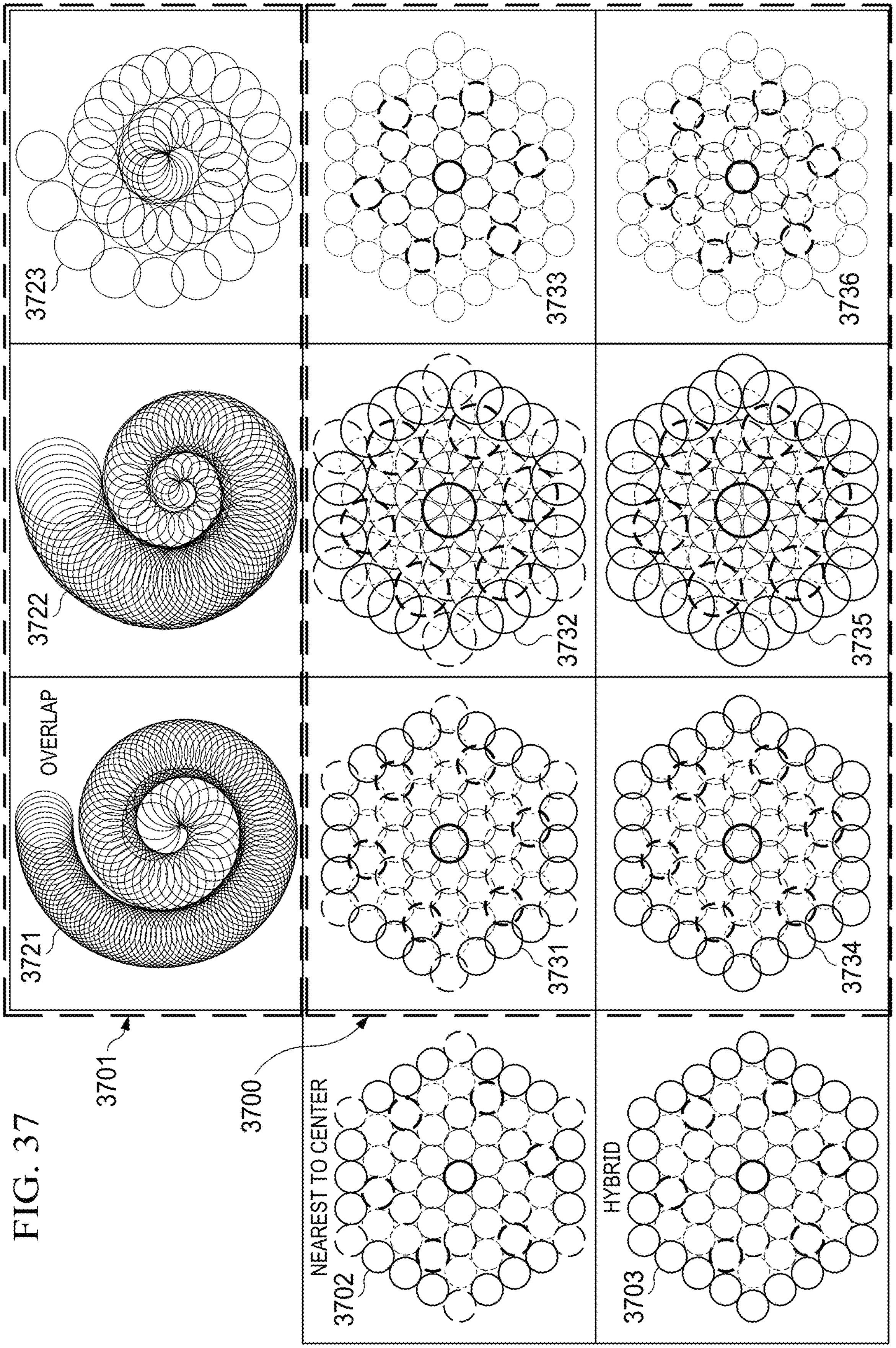
FIG. 37 is an illustration of scans performed using scan parameters that are adjusted during the scanning of an uncertainty area in accordance with an illustrative embodiment.

With reference next to FIG. 37, an illustration of scans performed using scan parameters that are adjusted during the scanning of an uncertainty area is depicted in in accordance with an illustrative embodiment. In this illustrative example, scans 3700 result from applying changes to scan parameters illustrated in spiral scans 3701 to nearest to center scan hexagonal 3702 and hybrid scan 3703. Nearest to center scan hexagonal 3702 is an example of an implementation for nearest to maximum hexagonal scan 3541 in FIG. 35 in which maximum 3523 of uncertainty area 3581 is the center of uncertainty area 3581. Hybrid scan 3703 is an example of an implementation for hybrid scan 3563 in FIG. 35. In this example, hybrid scan 3703 has a hexagonal shape.

As depicted, spiral scans 3701 include spiral scan 3721, spiral scan 3722, and spiral scan 3723. These spiral scans provide a visual illustration of adjustments to scan parameters that occur during the performance of these spiral scans. In this example, spiral scans 3701 have been selected because the scans provide a clear visualization of changes to scan parameters.

In this example, these spiral scans include illustrative adjustments to overlap 3711, beam divergence 3712, and dwell time 3713. As depicted, overlap 3711 decreases as spiral scan 3721 progresses. Further in this example, beam divergence 3712 increases as spiral scan 2222 progresses. Further in this example, dwell time 2213 decreases as spiral scan 2223 progresses.

In this example, nearest to center scan 3731 is nearest to center scan hexagonal 3702 with adjustments to overlap 3711. In this example, overlap 3711 decreases as nearest to center scan 3731 progresses. Nearest to center scan 3732 is nearest to center scan hexagonal 3702 with adjustments to beam divergence 3712. In this example, beam divergence 3712 increases as nearest to center scan 3732 progresses. Further, nearest to center scan 3733 is nearest to center scan hexagonal 3702 with adjustments to dwell time 3713. In this example, dwell time 3713 increases as nearest to center scan 3732 progresses.

Also in this example, hybrid scan 3734 is hybrid scan 3703 with adjustments to overlap 3711. As depicted, overlap 3711 decreases as hybrid scan 3703 progresses. Hybrid scan 3736 is hybrid scan 3703 with adjustments to beam divergence 3712. In this example, beam divergence 3712 increases as hybrid scan 3736 progresses. In this illustrative example, hybrid scan 3736 is hybrid scan 3703 with adjustments to dwell time 3723. In this example, dwell time 3723 increases as hybrid scan 3736 progresses.

Figure 38:
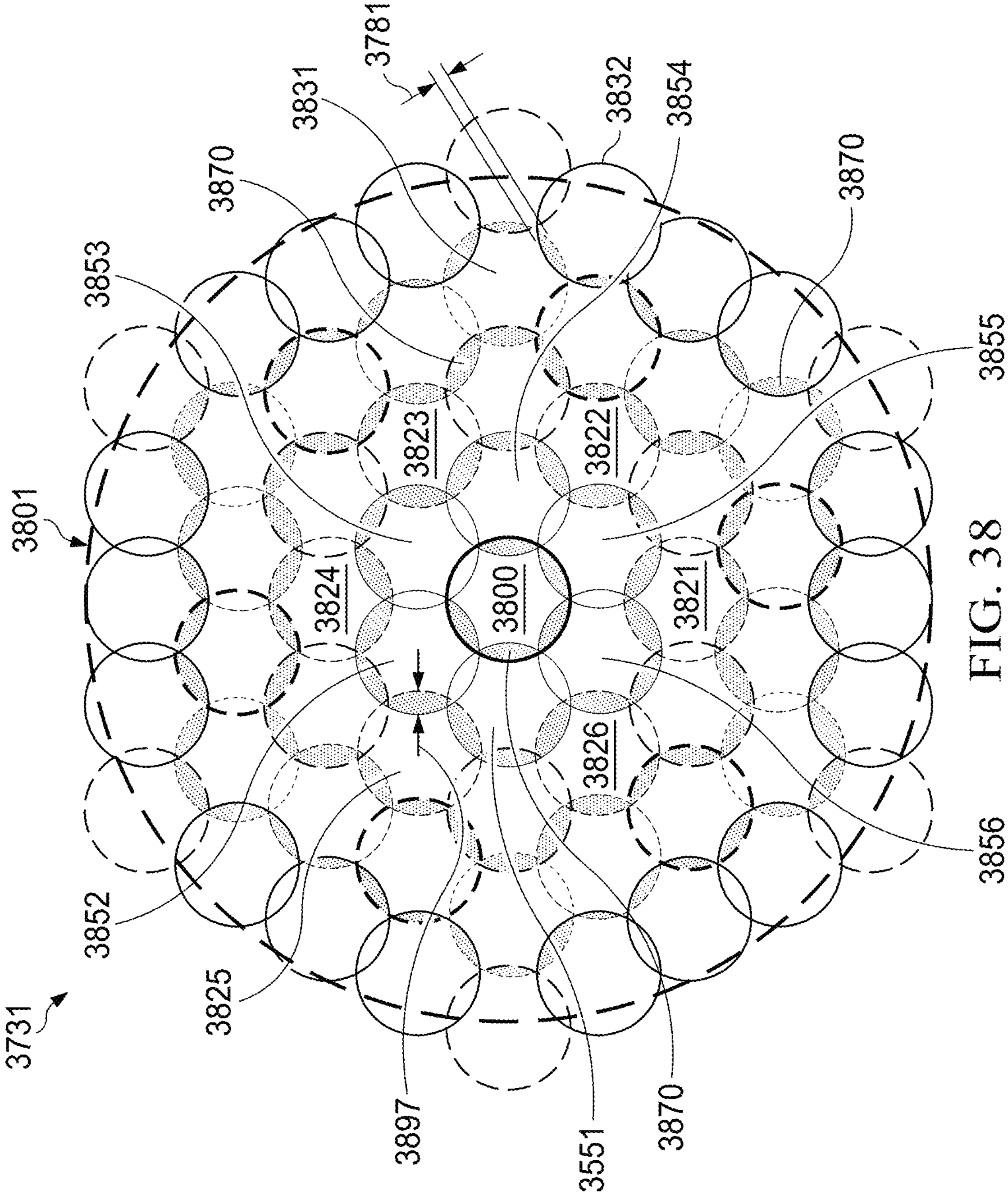
FIG. 38 is an illustration of a nearest to center scan with decreasing overlap in accordance with an illustrative embodiment.

Turning now to FIG. 38, an illustration of a nearest to center scan with decreasing overlap is depicted in accordance with an illustrative embodiment. In this example, center 3800 of the maximum of the uncertainty area 3801 is scanned using nearest to center scan 3731. Each circle in FIG. 38 represents the location of the beam spot for a laser beam that is moved to perform nearest to center scan 3731.

Further in this example, uncertainty area 3801 has a circular shape. In this example, nearest to center scan 3731 is a hexagonal scan that scans the area within the circular shape of uncertainty area 3801. Also, in this illustrative example, nearest to center scan 3731 includes locations that scans regions outside of uncertainty area 3801 to ensure that all of uncertainty area 3801 is scanned in these examples.

In this example, overlap 3870 for nearest to center scan 3731 decreases as the scan progresses. As depicted, overlap 3870 is greatest near center 3800 and is least at the perimeter of uncertainty area 3801.

As depicted, the locations with the same distance from center 3800 form a layer. In this illustrative example, a layer is not necessarily a continuous layer. In other words, the layer can be comprised of segments based on the distance of locations from center 3800.

In this example, center 3800 is a first layer that is the innermost layer. A second layer adjacent to center 3800 is formed by location 3851, location 3852, location 3853, location 3854, location 3855, and location 3856. These locations in the second layer all have the same distance from center 3800.

A third layer adjacent to the second layer is formed by location 3821, location 3822, location 3823, location 3824, location 3825, and location 3826. These locations in the third layer are all the same distance from center 3800.

In this example, overlap 3870 is uniform for locations in nearest to center scan 3731 that have the same distance from center 3800 of the uncertainty area. In other words, overlap 3870 for locations that have the same distance from center 3800 have the same overlap with locations in adjacent layers.

In these examples, overlap 3870 is between adjacent layers in nearest to center scan 3731. In other words, an adjacent layer is a layer in which a location in the layer overlaps with a location in another layer that is next to the adjacent layer. This adjacent layer can be a prior layer that has already been scanned or a subsequent layer that will be scanned.

For example, location 3852 and location 3825 are in adjacent layers to each other. Overlap 3870 between these two locations in the adjacent layers has width 3897. As another example, location 3831 is in a current layer while location 3832 is in an adjacent layer. In this example, overlap 3870 has width 3871. Width 3871 is smaller than width 3897.

In other words, the overlap 3870 between beam spots moving in nearest to center scan 3731 decreases as the scan progresses. The selection of overlap 3870 can be made in the same manner as overlap 2370 in FIG. 23.

Figure 39:
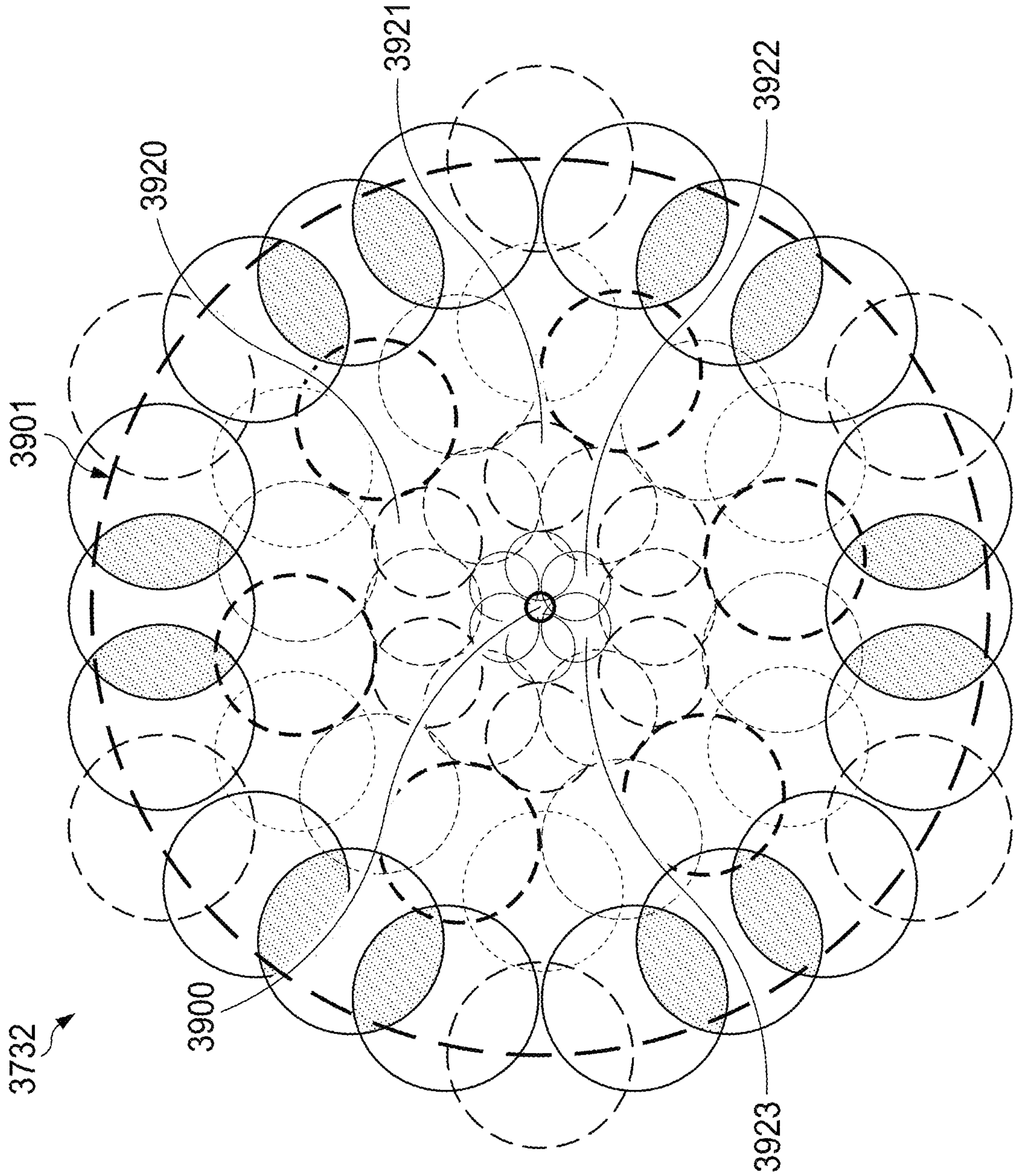
FIG. 39 is an illustration of a nearest to center scan with increasing beam divergence in accordance with an illustrative embodiment.

Next in FIG. 39, an illustration of a nearest to center scan with increasing beam divergence is depicted in accordance with an illustrative embodiment. In this example, center 3900 is the maximum of the uncertainty area 3901 scanned using nearest to center scan 3732. Each circle in FIG. 39 represents the location of the beam spot for a laser beam that is moved to perform nearest to center scan 3731.

In this depicted example, uncertainty area 3901 has a circular shape. In this example, nearest to center scan 3732 is a hexagonal scan that scans the area within the circular shape of uncertainty area 3901. Also, in this illustrative example, nearest to center scan 3732 includes locations that scans regions outside of uncertainty area 3801 to ensure that all of uncertainty area 3901 is scanned in these examples.

In this illustrative example, beam divergence decreases as nearest to center scan 3732 progresses. As depicted, the beam divergence increases during movement of the laser beam to scan uncertainty area 3901. In this example, the beam divergence at locations that have a same distance from center 3900 in uncertainty area 3901 one is uniform. In other words, the beam divergence is the same for locations with the same distance from center 3900.

For example, location 3920 and location 3921 are the same distance from center 3900. These two locations have the same beam divergence. Location 3922 and location 3923 both have the same distance from center 3900. These two locations also have the same beam divergence with respect to each other.

With this example, location 3922 and location 3923 are scanned prior to location 3920 and location 3921. In this example, location 3920 and location 3921 have larger beam divergence as compared to location 3922 and location 3923. The selection of beam divergence can be made in the same manner as the selection of beam divergence in FIG. 24.

Figure 40:
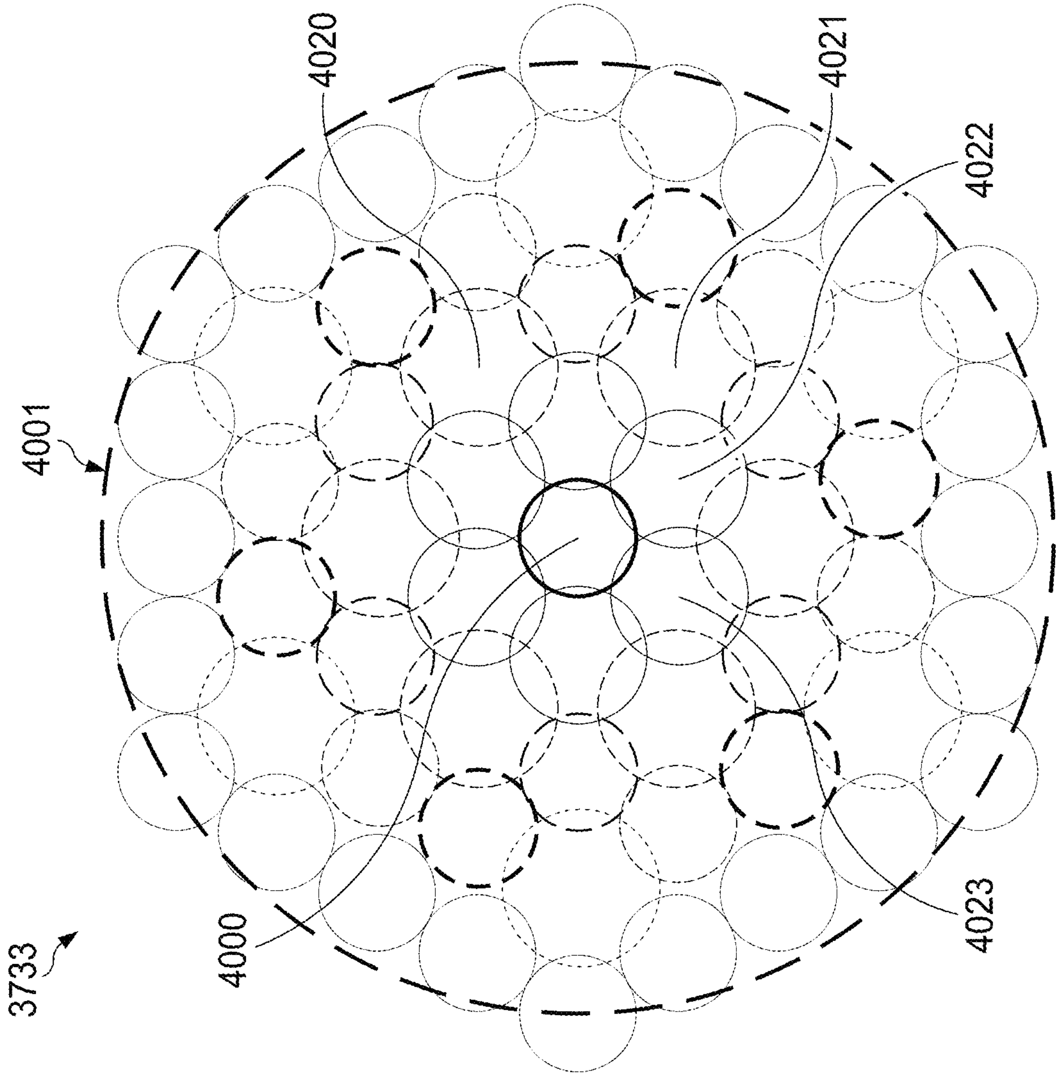
FIG. 40 is an illustration of a nearest to center scan with decreasing dwell time in accordance with an illustrative embodiment.

With reference now to FIG. 40, an illustration of a nearest to center scan with decreasing dwell time is depicted in accordance with an illustrative embodiment. In this illustrative example, center 4000 is the maximum of the uncertainty area 4001 scanned using nearest to center scan 3733. Each circle in FIG. 40 represents the location of the beam spot for a laser beam that is moved to perform nearest to center scan 3733.

In this depicted example, uncertainty area 4001 has a circular shape. In this example, nearest to center scan 3733 is a hexagonal scan that scans the area within the circular shape of uncertainty area 4001. Also, in this illustrative example, nearest to center scan 3733 includes locations that scans regions outside of uncertainty area 4001 to ensure that all of uncertainty area 4001 is scanned in these examples.

In this illustrative example, the dwell time decreases as nearest to center scan 3733 progresses. Further, in this example, the dwell time between locations having a same distance from center 4000 is uniform. In other words, these locations have the same dwell time.

For example, location 4020 and location 4021 are the same distance from center 4000. These two locations have the same dwell time. Location 4022 and location 4023 have the same distance from center 4000. These two locations have the same dwell time.

In this example, location 4020 and location 4021 are scanned later in nearest to center scan 3733 as compared to location 4022 and location 4022. Location 4020 and location 4021 are farther from center 4000 as compared to these other two locations. As a result, the likelihood that an object of interest is present is lower as compared to location 4022 and location 4023. Thus, these two locations have a shorter dwell time as compared to location 4022 and location 4023. The selection of dwell time can be made in the same manner as the selection of dwell time in FIG. 25.

Figure 41:
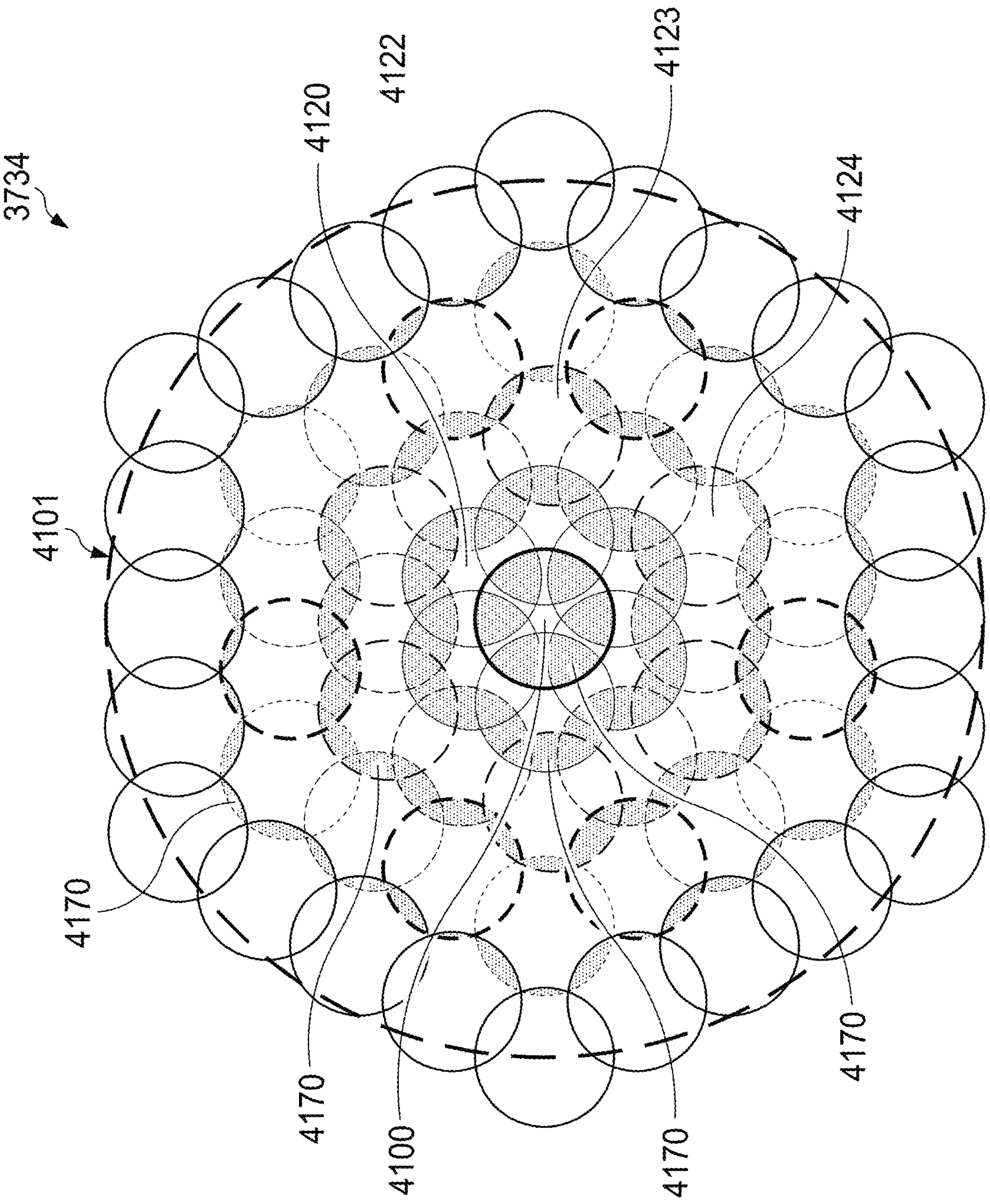
FIG. 41 is an illustration of a hybrid scan with decreasing overlap in accordance with an illustrative embodiment.

In FIG. 41, an illustration of a hybrid scan with decreasing overlap is depicted in accordance with an illustrative embodiment. In this depicted example, center 4100 is the maximum of the uncertainty area 4101 scanned using hybrid scan 3734. Each circle in FIG. 41 represents the location of the beam spot for a laser beam that is moved to perform hybrid scan 3734.

In this depicted example, uncertainty area 4101 has a circular shape. In this example, hybrid scan 3734 is a hexagonal scan that scans the area within the circular shape of uncertainty area 4101. Also, in this illustrative example, hybrid scan 3734 includes scanning locations that have regions outside of uncertainty area 4101 to ensure that all of uncertainty area 4101 is scanned in these examples.

In this example, overlap 4170 for hybrid scan 3734 decreases as the scan progresses. As depicted, overlap 4170 is greatest near center 4100 and is least at the perimeter of uncertainty area 4101.

In this example, overlap 4170 for locations in hybrid scan 3734 that have the same distance from center 4100 of the uncertainty area is uniform. In other words, the overlap between locations that have the same distance from center 4100 have the same overlap. In other words, overlap 4170 for locations that have the same distance from center 4100 have the same overlap with locations in adjacent layers.

Locations having the same distance from center 4100 form a layer in this example. For example, location 4120 and location 4122 have the same distance from center 4100 and are part of the same layer. As depicted, location 4123 and location 4124 both have the same distance from center 4100 and thus are part of the same layer. As with the example in FIG. 38, the overlap is between adjacent layers. The selection of overlap 4170 can be made in the same manner as overlap 2370 in FIG. 23.

Figure 42:
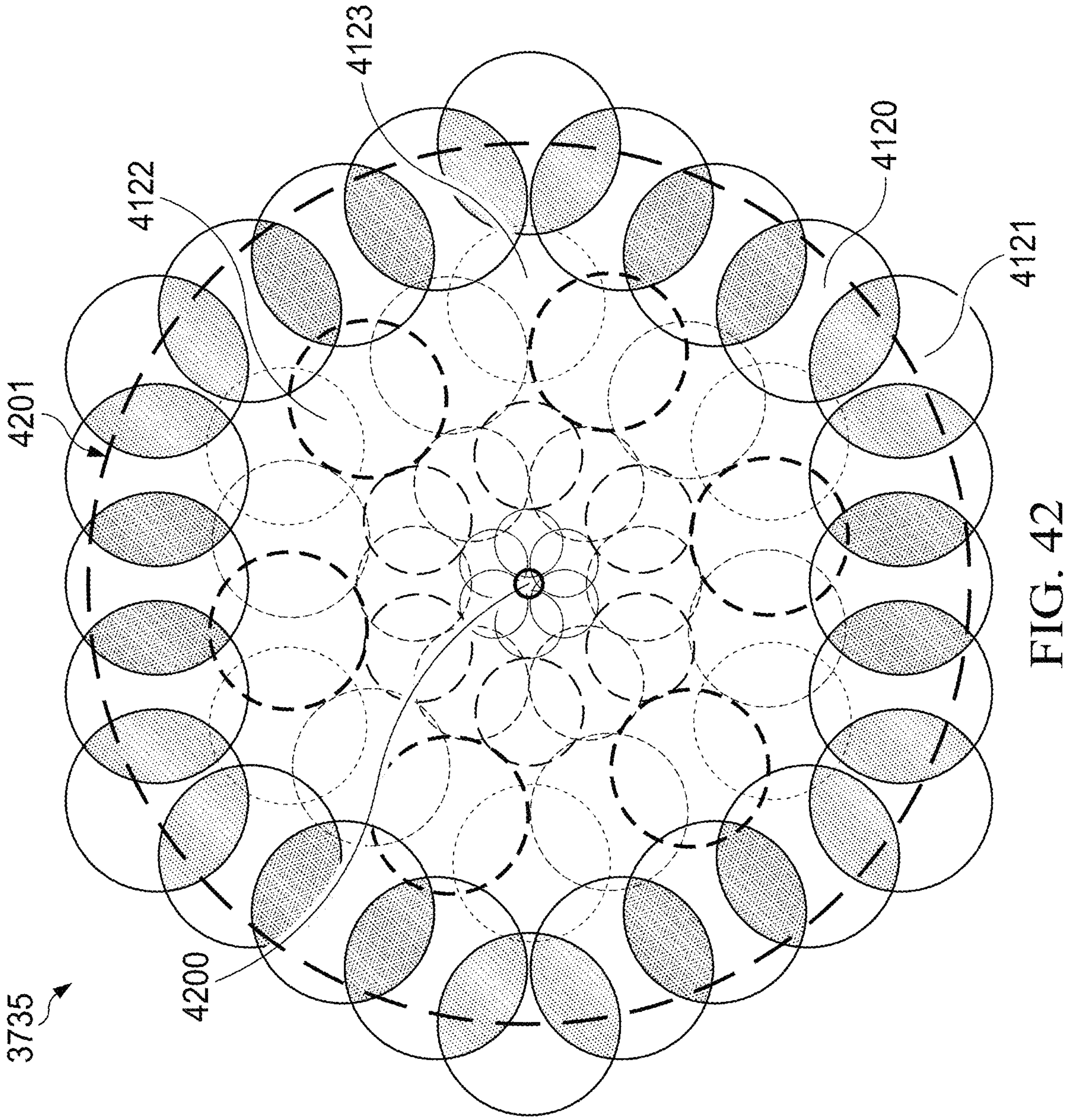
FIG. 42 is an illustration of a hybrid scan with increasing beam divergence in accordance with an illustrative embodiment.

With reference to FIG. 42, an illustration of a hybrid scan with increasing beam divergence is depicted in accordance with an illustrative embodiment. In this illustrative example, center 4200 is the maximum of the uncertainty area 4201 scanned using hybrid scan 3735. Each circle in FIG. 42 represents the location of the beam spot for a laser beam that is moved to perform hybrid scan 3735.

In this depicted example, uncertainty area 4201 has a circular shape. In this example, hybrid scan 3735 is a hexagonal scan that scans the area within the circular shape of uncertainty area 4201. Also, in this illustrative example, hybrid scan 3735 includes locations that scans regions outside of uncertainty area 4201 to ensure that all of uncertainty area 4201 is scanned in these examples.

In this illustrative example, beam divergence decreases as hybrid scan 3735 progresses. As depicted, the beam divergence increases during movement of the laser beam to scan uncertainty area 4201. In this example, the beam divergence at locations that have a same distance from center 4200 in uncertainty area 4201 is uniform. Thus, the beam divergence is the same for locations with the same distance from center 4100.

For example, location 4120 and location 4121 are the same distance from center 4100. These two locations have the same beam divergence. Location 3922 and location 3923 both have the same distance from center 3900. These two locations have the same beam divergence with respect to each other.

With this example, location 4122 and location 4123 are scanned prior to location 4120 and location 4121. In this example, location 4120 and location 4121 have larger beam divergence as compared to location 3922 and location 3923. The selection of beam divergence can be made in the same manner as the selection of beam divergence in FIG. 24.

Figure 43:
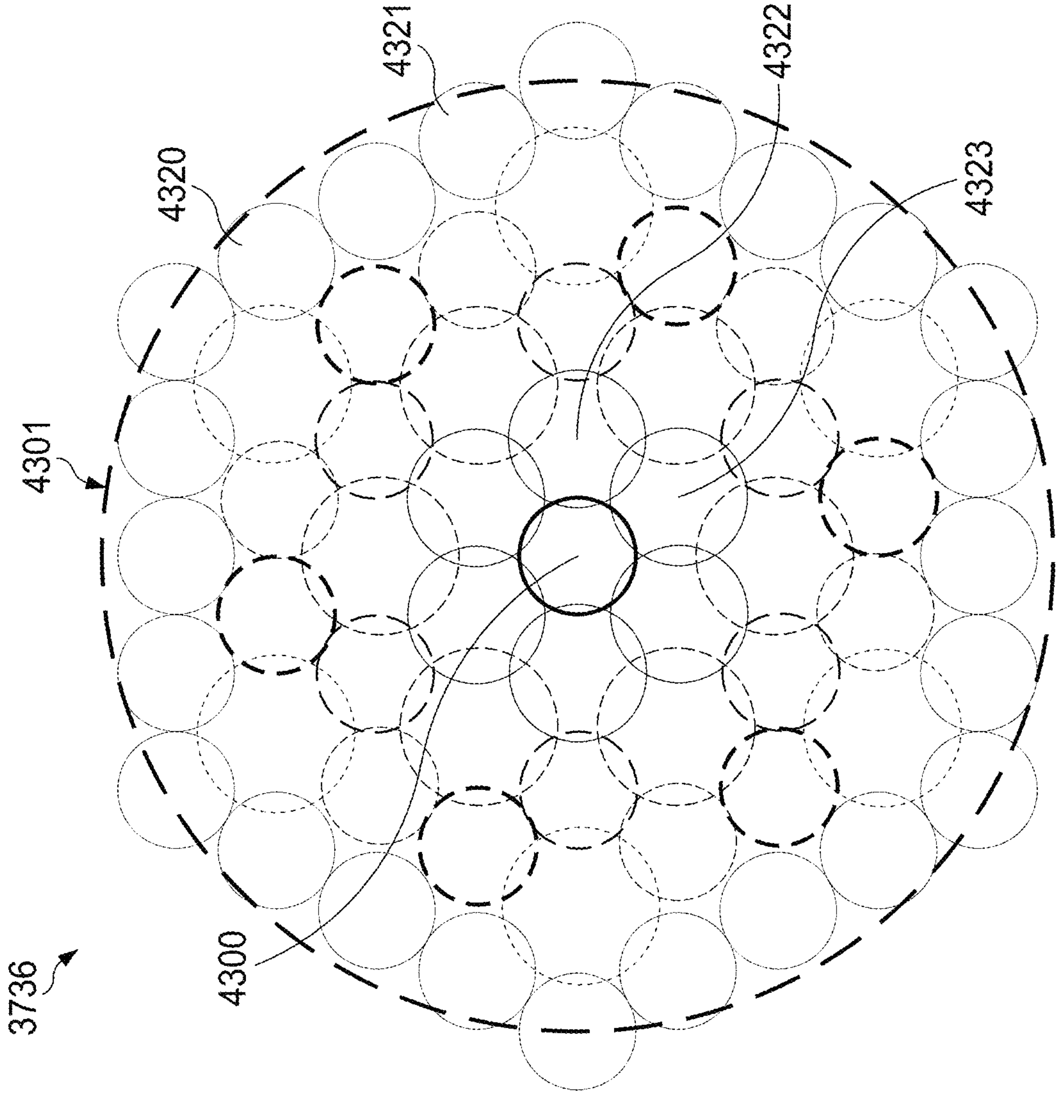
FIG. 43 is an illustration of a hybrid scan with decreasing dwell time in accordance with an illustrative embodiment.

With reference now to FIG. 43, an illustration of a hybrid scan with decreasing dwell time is depicted in accordance with an illustrative embodiment. In this illustrative example, center 4300 is the maximum of the uncertainty area 4301 scanned using hybrid scan 3736. Each circle in FIG. 43 represents the location of the beam spot for a laser beam that is moved to perform hybrid scan 3735.

In this example, uncertainty area 4301 has a circular shape. In this example, hybrid scan 3736 is a hexagonal scan that scans the area within the circular shape of uncertainty area 4301. Also, in this illustrative example, hybrid scan 3736 includes locations that scans regions outside of uncertainty area 4301 to ensure that all of uncertainty area 4301 is scanned in these examples.

In this illustrative example, the dwell time decreases as hybrid scan 3736 progresses. Further, in this example, the dwell time between locations having a same distance from center 4300 is uniform. These locations with the same distance have the same dwell time.

For example, location 4320 and location 4321 are the same distance from center 4300. These two locations have the same dwell time. Location 4322 and location 4323 have the same distance from center 4300. Thus, these two locations have the same dwell time.

In this example, location 4320 and location 4321 are scanned later in hybrid scan 3736 as compared to location 4322 and location 4323. Location 4320 and location 4321 are farther from center 4300. As a result, the likelihood that an object of interest is present is lower as compared to location 4022 and location 4023. Thus, these two locations have a shorter dwell time as compared to location 4022 and location 4023. The selection of dwell time can be made in the same manner as the selection of dwell time in FIG. 25.

The illustration of scans in FIGS. 37-43 has been presented for purposes of depicting an illustrative example. This illustration is not meant to limit the manner in which other illustrative examples can be implemented. For example, the uncertainty areas in these figures have been described as a hexagon. In other illustrative examples, other shapes can be used such as a circle, an octagon, or other shape with a radial symmetry.

Further, in performing the searches, the nearest to the center scans and hybrid scans can be further optimized in addition to changing a number of scan parameters during the movement of a laser beam. For example, locations in the scan identified as falling outside of the uncertainty area can be skipped.

Further, in other illustrative examples, other types of electromagnetic beams can be used in addition to the laser beam. For example, the electromagnetic beam used in the scans can be selected from a group comprising a radio frequency beam, a microwave beam, and other suitable types of electromagnetic signals that can be shaped into a beam. Further, these type of scans can also be used in receiving electromagnetic signals from an electromagnetic signal source.

Figure 44:
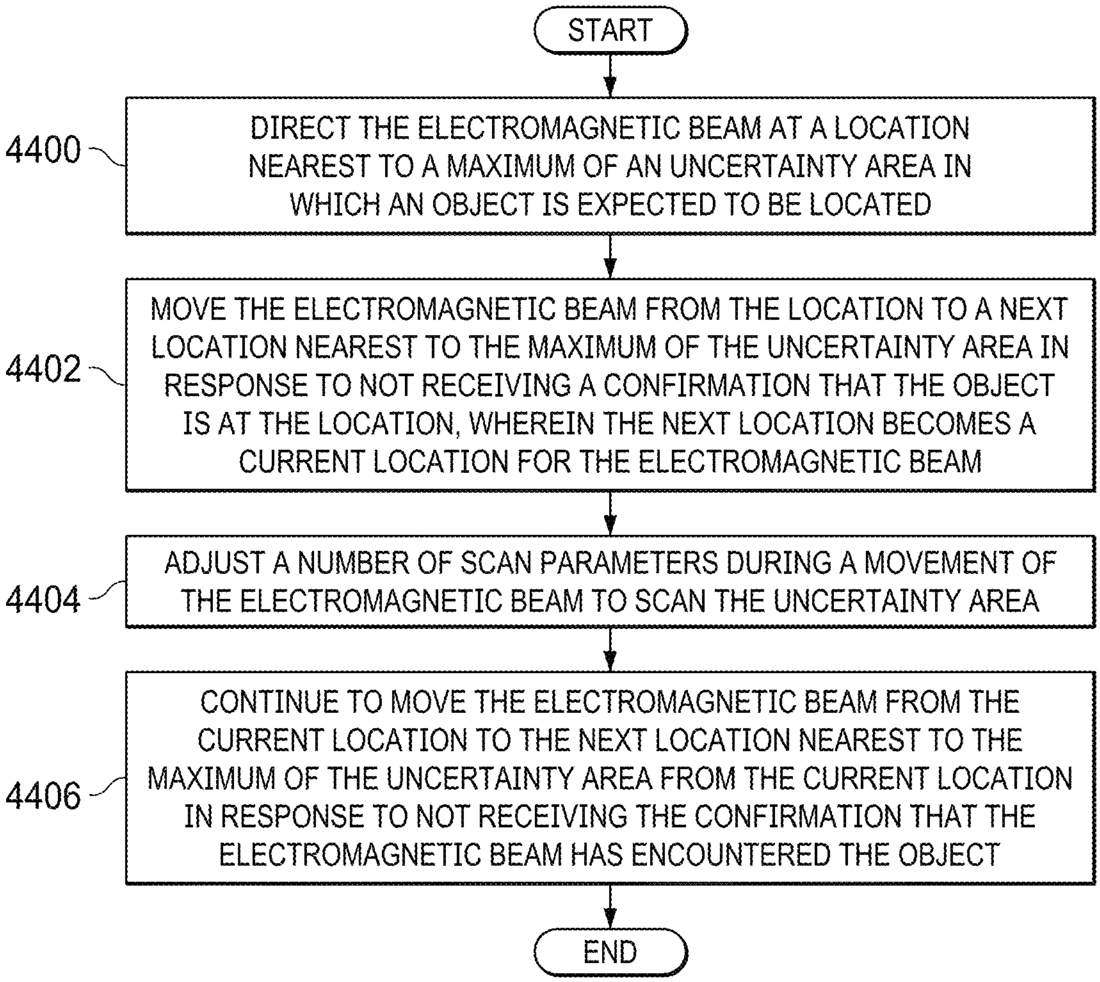
FIG. 44 is an illustration of a flowchart of a process for pointing an electromagnetic beam in accordance with an illustrative embodiment.

Turning to FIG. 44, an illustration of a flowchart of a process for pointing an electromagnetic beam is depicted in accordance with an illustrative embodiment. The process in FIG. 44 can be implemented in hardware, software, or both. When implemented in software, the process can take the form of program instructions that are run by one of more processor units located in one or more hardware devices in one or more computer systems. For example, the process can be implemented in controller 3514 in computer system 3512 in FIG. 35.

The process directs the electromagnetic beam at a location nearest to a maximum of an uncertainty area in which an object is expected to be located (operation 4400). The process moves the electromagnetic beam from the location to a next location nearest to the maximum of the uncertainty area in response to not receiving a confirmation that the object is at the location, wherein the next location becomes a current location for the electromagnetic beam (operation 4402).

The process adjusts a number of scan parameters during a movement of the electromagnetic beam to scan the uncertainty area (operation 4404). The process continues to move the electromagnetic beam from the current location to the next location nearest to the maximum of the uncertainty area from the current location in response to not receiving the confirmation that the electromagnetic beam has encountered the object (operation 4406). The process terminates thereafter.

Figure 45:
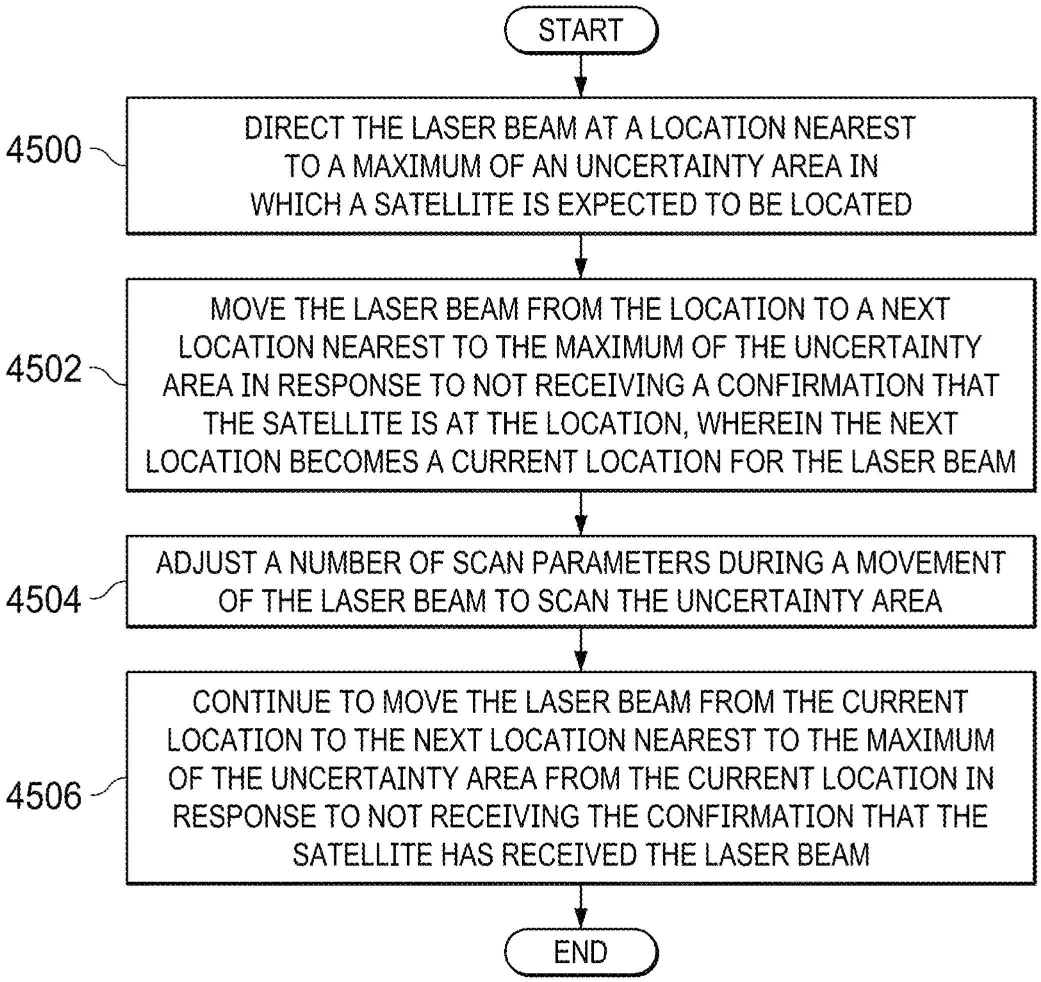
FIG. 45 is an illustration of a flowchart of a process for pointing a laser beam in accordance with an illustrative embodiment.

With reference next to FIG. 45, an illustration of a flowchart of a process for pointing a laser beam is depicted in accordance with an illustrative embodiment. The process in FIG. 45 can be implemented in hardware, software, or both. When implemented in software, the process can take the form of program instructions that are run by one of more processor units located in one or more hardware devices in one or more computer systems. For example, the process can be implemented in controller 3514 in computer system 3512 in FIG. 35.

The process directs the laser beam at a location nearest to a maximum of an uncertainty area in which a satellite is expected to be located (operation 4500). In one illustrative example, the uncertainty area is a nearest to maximum hexagonal scan. The process moves the laser beam from the location to a next location nearest to the maximum of the uncertainty area in response to not receiving a confirmation that the satellite is at the location, wherein the next location becomes a current location for the laser beam (operation 4502).

The process adjusts a number of scan parameters during a movement of the laser beam to scan the uncertainty area (operation 4504). The process continues to move the laser beam from the current location to the next location nearest to the maximum of the uncertainty area from the current location in response to not receiving the confirmation that the satellite has received the laser beam (operation 4506). The process terminates thereafter.

Figure 46:
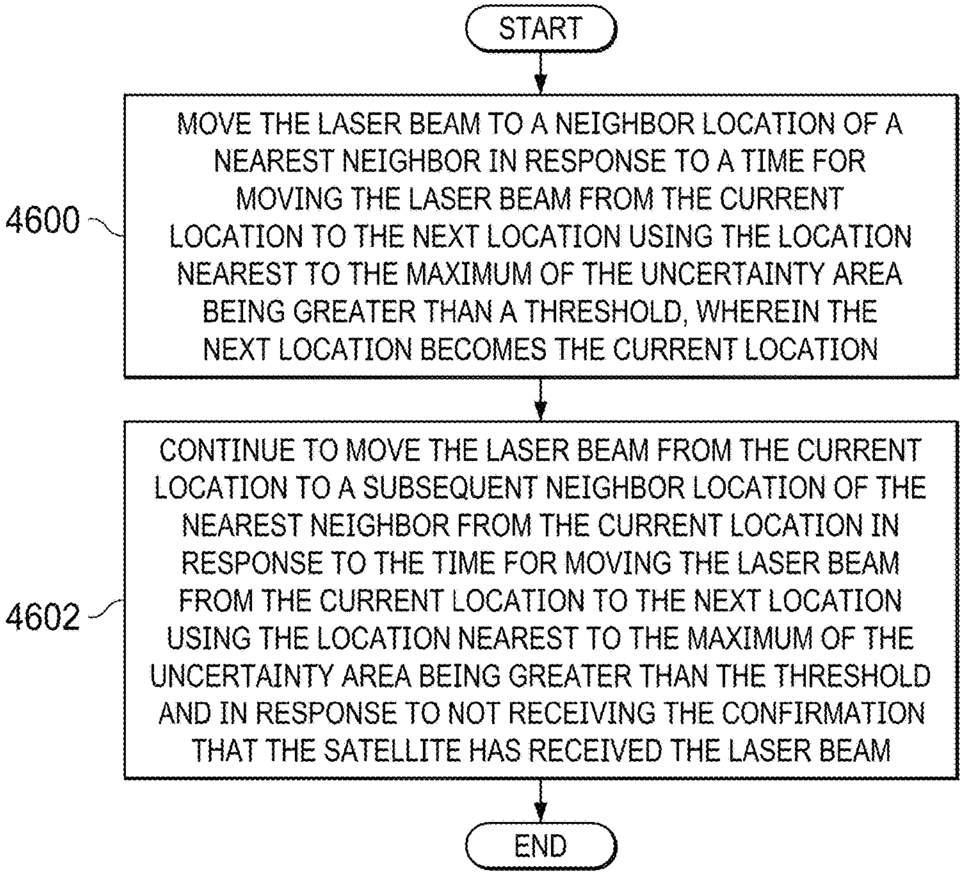
FIG. 46 is an illustration of a flowchart of a process for moving the laser beam in accordance with an illustrative embodiment.

With reference next to FIG. 46, an illustration of a flowchart of a process for moving the laser beam is depicted in accordance with an illustrative embodiment.

The process in this flowchart is an example of additional operations that can be performed with operations in FIG. 45. In this example, the process can move the laser beam to perform a hybrid scan.

The process moves the laser beam to a neighbor location of a nearest neighbor in response to a time for moving the laser beam from the current location to the next location using the location nearest to the maximum of the uncertainty area being greater than a threshold, wherein the next location becomes the current location (operation 4600). The process continues to move the laser beam from the current location to a subsequent neighbor location of the nearest neighbor from the current location in response to the time for moving the laser beam from the current location to the next location using the location nearest to the maximum of the uncertainty area being greater than the threshold and in response to not receiving the confirmation that the satellite has received the laser beam (operation 4602). The process terminates thereafter. In this flowchart, operation 4504 from FIG. 45 continues to be performed with these operations to adjust a number of scan parameters.

Figure 47:
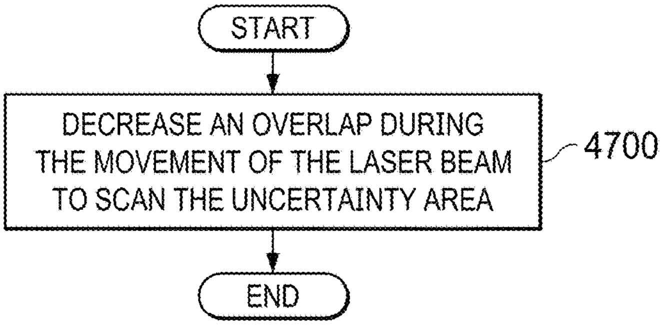
FIG. 47 is an illustration of a flowchart of a process for adjusting scan parameters in accordance with an illustrative embodiment.

With reference now to FIG. 47, an illustration of a flowchart of a process for adjusting scan parameters is depicted in accordance with an illustrative embodiment. The process in this flowchart is an example of an implementation for operation 4504 in FIG. 45.

The process decreases an overlap during the movement of the laser beam to scan the uncertainty area (operation 4700). The process terminates thereafter. In one illustrative example, the maximum of the uncertainty area is a center of an uncertainty area and wherein the overlap at locations that have a same distance from the maximum of the uncertainty area is uniform.

Figure 48:
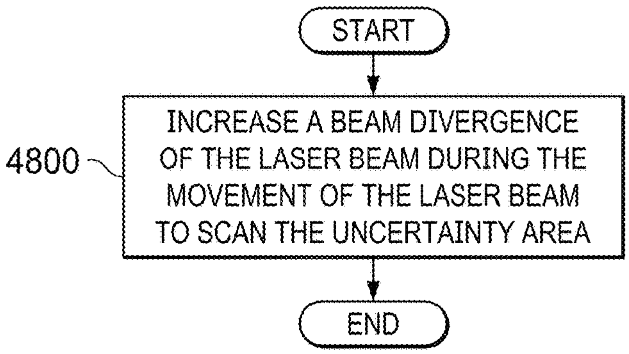
FIG. 48 is an illustration of a flowchart of a process for adjusting scan parameters in accordance with an illustrative embodiment.

Turning to FIG. 48, an illustration of a flowchart of a process for adjusting scan parameters is depicted in accordance with an illustrative embodiment. The process in this flowchart is an example of an implementation for operation 4504 in FIG. 45.

The process increases a beam divergence of the laser beam during the movement of the laser beam to scan the uncertainty area (operation 4800). The process terminates thereafter. In one illustrative example, the maximum of the uncertainty area is a center of an uncertainty area and wherein the beam divergence of the laser beam at locations that have a same distance from the maximum of the uncertainty area is uniform.

Figure 49:
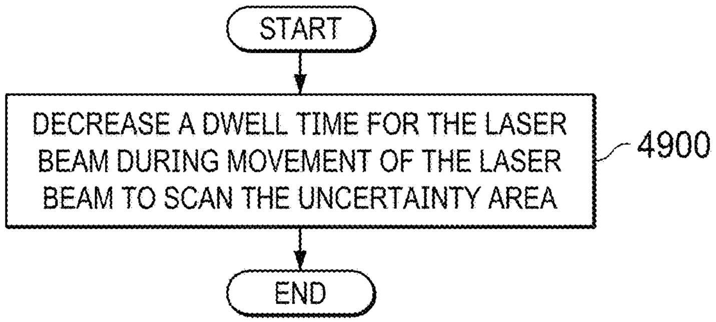
FIG. 49 is an illustration of a flowchart of a process for adjusting scan parameters in accordance with an illustrative embodiment.

Next in FIG. 49, an illustration of a flowchart of a process for adjusting scan parameters is depicted in accordance with an illustrative embodiment. The process in this flowchart is an example of an implementation for operation 4504 in FIG. 45.

The process decreases a dwell time for the laser beam during movement of the laser beam to scan the uncertainty area (operation 4900). The process terminates thereafter. In this example, the maximum of the uncertainty area is a center of an uncertainty area and wherein the dwell time of the laser beam at locations that have a same distance from the maximum of the uncertainty area is uniform.

Figure 50:
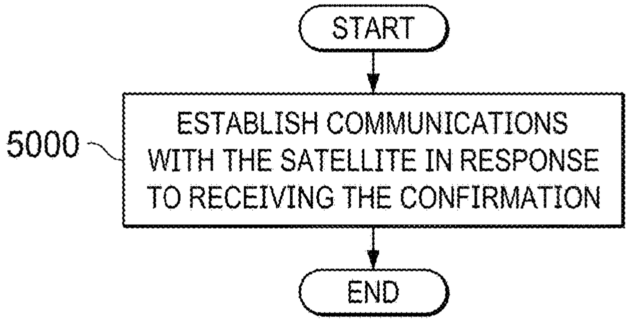
FIG. 50 is an illustration of a flowchart of a process for establishing communications in accordance with an illustrative embodiment.

With reference now to FIG. 50, an illustration of a flowchart of a process for establishing communications is depicted in accordance with an illustrative embodiment. The process in this flowchart is an example of an additional operation that can be performed with the operations in FIG. 45.

The process establishes communications with the satellite in response to receiving the confirmation (operation 5000). The process terminates thereafter.

The flowcharts and block diagrams in the different depicted embodiments in FIGS. 44-50 illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A laser beam transmission system comprising:

a laser beam system configured to transmit a laser beam; and a controller configured to control the laser beam system to:

direct the laser beam at a central location in a search area in which a satellite is expected to be located;

move the laser beam to a next location that is a nearest neighbor to the central location in response to not receiving a confirmation that the satellite is at the central location, wherein the next location becomes a current location for the laser beam;

adjust a number of scan parameters during a movement of the laser beam to scan the search area; and continue to move the laser beam from the current location to the next location that is the nearest neighbor to the current location in response to not receiving the confirmation that the satellite has received the laser beam, wherein the controller is configured to decrease an overlap during the movement of the laser beam to scan the search area, and wherein the controller is configured to decrease the overlap at each layer in concentric layers in the search area during the movement of the laser beam to scan the search area, and wherein the overlap at locations in a layer is uniform.

2. The laser beam transmission system of claim 1, wherein in adjusting the number of scan parameters, the controller is configured to:

increase a beam divergence of the laser beam during the movement of the laser beam to scan the search area.

3. The laser beam transmission system of claim 2, wherein in increasing the beam divergence, the controller is configured to:

increase the beam divergence of the laser beam at each layer in concentric layers in the search area during the movement of the laser beam to scan the search area, wherein the beam divergence of the laser beam at locations in a layer is uniform.

4. The laser beam transmission system of claim 1, wherein in adjusting the number of scan parameters, the controller is configured to:

decrease a dwell time for the laser beam during the movement of the laser beam to scan the search area.

5. The laser beam transmission system of claim 4, wherein in decreasing the dwell time, the controller is configured to:

decrease the dwell time for the laser beam at each layer in concentric layers in the search area during the movement of the laser beam to scan the search area, wherein the dwell time of the laser beam at locations in a layer is uniform.

6. The laser beam transmission system of claim 1, wherein the movement of the laser beam to scan the search area is in a form of a nearest neighbor hexagonal scan.

7. The laser beam transmission system of claim 1, wherein the controller is configured to:

establish communications with the satellite in response to receiving the confirmation.

8. The laser beam transmission system of claim 7, wherein the communications are selected from one of unidirectional communications and bidirectional communications.

9. The laser beam transmission system of claim 1, wherein the laser beam is selected from a group comprising a continuous laser beam and a pulsed laser beam.

10. The laser beam transmission system of claim 1, wherein the number of scan parameters is selected from at least one of an overlap, a beam divergence, or a dwell time.

11. An electromagnetic beam transmission system comprising:

an electromagnetic beam system configured to transmit an electromagnetic beam; and a controller configured to control the electromagnetic beam system to:

direct the electromagnetic beam at a central location in a search area in which an object is expected to be located;

move the electromagnetic beam to a next location that is a nearest neighbor to the central location in response to not receiving a confirmation that the object is at the central location, wherein the next location becomes a current location for the laser beam;

adjust a number of scan parameters during a movement of the electromagnetic beam to scan the search area; and continue to move the electromagnetic beam from the current location to the next location that is the nearest neighbor to the current location in response to not receiving the confirmation that the object has received the electromagnetic beam, wherein the controller is configured to decrease an overlap during the movement of the electromagnetic beam to scan the search area, and wherein the controller is configured to decrease the overlap at each layer in concentric layers in the search area during the movement of the electromagnetic beam to scan the search area, and wherein the overlap at locations in a layer is uniform.

12. The electromagnetic beam transmission system of claim 11, wherein the number of scan parameters is selected from at least one of an overlap, a beam divergence, or a dwell time.

13. The electromagnetic beam transmission system of claim 11, wherein the object is selected from a group comprising an uncooperative object, a platform, a mobile platform, a stationary platform, a land-based structure, an aquatic-based structure, a space-based structure, an aircraft, a vehicle controlled by an artificial intelligence system, a vehicle controlled by a neural network, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and an electromagnetic beam receiver.

14. A method for pointing a laser beam, the method comprising:

directing the laser beam at a central location in a search area in which a satellite is expected to be located;

moving the laser beam to a next location that is a nearest neighbor to the central location in response to not receiving a confirmation that the satellite is at the central location, wherein the next location becomes a current location for the laser beam;

adjusting a number of scan parameters during a movement of the laser beam to scan the search area; and continuing to move the laser beam from the current location to the next location that is the nearest neighbor to the current location in response to not receiving the confirmation that the object has received the laser beam, wherein adjusting the number of scan parameters comprises:

decreasing an overlap during the movement of the laser beam to scan the search area, and wherein decreasing the overlap comprises:

decreasing the overlap at each layer in concentric layers in the search area during the movement of the laser beam to scan the search area, and wherein the overlap at locations in a layer is uniform.

15. The method of claim 14, wherein in adjusting the number of scan parameters comprises:

increasing a beam divergence of the laser beam during the movement of the laser beam to scan the search area.

16. The method of claim 15, wherein increasing the beam divergence comprises:

increasing the beam divergence of the laser beam at each layer during the movement of the laser beam to scan the search area, wherein the beam divergence of the laser beam at locations in a layer is uniform.

17. The method of claim 14, wherein adjusting the number of scan parameters, the controller is configured to:

decrease a dwell time for the laser beam during the movement of the laser beam to scan the search area.

18. The method of claim 14, wherein decreasing the dwell time comprises:

decreasing the dwell time for the laser beam at each layer in concentric layers in the search area during the movement of the laser beam to scan the search area, wherein the dwell time of the laser beam at locations in a layer is uniform.

19. An electromagnetic beam receiver system comprising:

an electromagnetic signal receiver configured to receive electromagnetic signals; and a controller configured to control the electromagnetic signal receiver to:

move a field of view of the electromagnetic signal receiver to a central location in a search area in which an electromagnetic signal source is expected to be located;

move the field of view to a next location that is a nearest neighbor to the central location in response to not detecting the electromagnetic signals from the electromagnetic signal source at the central location, wherein the next location becomes a current location for the field of view;

adjust a number of scan parameters during a movement of the field of view to scan the search area; and continue to move the field of view from the current location to the next location that is the nearest neighbor to the current location in response to not detecting electromagnetic signals from the electromagnetic signal source, wherein the controller is configured to decrease an overlap during the movement of the electromagnetic beam to scan the search area, and wherein the controller is configured to decrease the overlap at each layer in concentric layers in the search area during the movement of the electromagnetic beam to scan the search area, and wherein the overlap at locations in a layer is uniform.

20. The electromagnetic beam receiver system of claim 19, wherein the electromagnetic signal source is selected from a group comprising an uncooperative object, a platform, a mobile platform, a stationary platform, a land-based structure, an aquatic-based structure, a space-based structure, an aircraft, a vehicle controlled by an artificial intelligence system, a vehicle controlled by a neural network, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility and a building.

* * * * *